US012693444B1

(12) United States Patent
Sun

(10) Patent No.: US 12,693,444 B1
(45) Date of Patent: Jul. 28, 2026

(54) SYSTEMS AND METHODS FOR QUALITY-CONTROLLING SEISMIC DATASETS

(71) Applicant: SAUDI ARABIAN OIL COMPANY, Dhahran (SA)

(72) Inventor: Yimin Sun, Den Hague (NL)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 19/208,923

(22) Filed: May 15, 2025

(51) Int. Cl.
| | | |
|---|---|---|
| *G01V 1/28* | (2006.01) | |
| *E21B 44/00* | (2006.01) | |
| *G01V 1/30* | (2006.01) | |

(52) U.S. Cl.
CPC .............. *G01V 1/282* (2013.01); *E21B 44/00* (2013.01); *G01V 1/303* (2013.01)

(58) Field of Classification Search
CPC ........ E21B 44/00; E21B 7/04; E21B 2200/20; G01V 1/282; G01V 1/301; G01V 1/303; G01V 1/307; G01V 1/00; G01V 1/24
See application file for complete search history.

(56) References Cited

U.S. PATENT DOCUMENTS

| | | | |
|---|---|---|---|
| 5,930,730 A | 7/1999 | Marfurt et al. | |
| 7,706,211 B2 * | 4/2010 | Bakulin ................. | G01V 1/303 |
| | | | 367/73 |
| 11,079,507 B2 * | 8/2021 | Song ..................... | G01V 1/325 |
| 11,467,305 B2 | 10/2022 | Lou et al. | |
| 11,531,129 B2 | 12/2022 | Ji et al. | |
| 12,158,558 B1 * | 12/2024 | Tian ......................... | G01V 1/50 |
| 12,174,328 B2 * | 12/2024 | Alali ..................... | G01V 1/308 |

(Continued)

FOREIGN PATENT DOCUMENTS

| | | | | |
|---|---|---|---|---|
| CN | 120722423 A | * | 9/2025 | |
| WO | WO-2025136438 A9 | * | 8/2025 | ............. G06N 3/047 |

OTHER PUBLICATIONS

Jousset, P. et al., "Fibre optic distributed acoustic sensing of volcanic events," nature communications, vol. 13, No. 1753, pp. 1-16, Mar. 31, 2022 (16 pages).

(Continued)

*Primary Examiner* — Daniel P Stephenson
(74) *Attorney, Agent, or Firm* — Osha Bergman Watanabe & Burton LLP

(57) ABSTRACT

A method for performing quality assessment of a seismic dataset. The method may include determining a first coherency distribution for a first calibration seismic dataset with a first quality rating and determining a second coherency distribution for a second calibration seismic dataset with a second quality rating. The method further includes determining a coherency threshold based on the first coherency distribution and the second coherency distribution and determining, based on the coherency threshold, a first quality indicator for the first calibration seismic dataset and a second quality indicator for the second calibration seismic dataset. The method further includes determining an application quality indicator for an application seismic dataset and determining, for the application seismic dataset, an application quality rating based on the application quality indicator, first quality indicator, second quality indicator, first quality rating and second quality rating.

20 Claims, 18 Drawing Sheets

(56) References Cited

U.S. PATENT DOCUMENTS

| | | | |
|---|---|---|---|
| 2015/0236668 A1* | 8/2015 | Poole | H03H 17/0248 |
| | | | 703/2 |
| 2017/0205531 A1* | 7/2017 | Berard | E21B 49/00 |
| 2017/0371070 A1* | 12/2017 | Teyssandier | G01V 13/00 |
| 2019/0302288 A1* | 10/2019 | Fu | G01V 1/301 |
| 2020/0241159 A1 | 7/2020 | Willis et al. | |
| 2023/0144892 A1* | 5/2023 | Fink | G01V 1/303 |
| | | | 702/16 |
| 2023/0184975 A1 | 6/2023 | Zhang et al. | |
| 2024/0061135 A1* | 2/2024 | El Ouair | G01V 1/345 |
| 2024/0125955 A1* | 4/2024 | He | G01V 1/42 |
| 2024/0329265 A1* | 10/2024 | Sun | G01V 1/282 |
| 2024/0378342 A1* | 11/2024 | Ruzhnikov | G06F 30/12 |
| 2025/0258310 A1* | 8/2025 | Halliday | G01V 1/303 |
| 2025/0314792 A1* | 10/2025 | Kumar | G01V 20/00 |

OTHER PUBLICATIONS

Sun, Y. et al., "Enhancing 3-D Land Seismic Data Using Nonlinear Beamforming Based on the Efficiency-Improved Genetic Algo-rithm," IEEE Transactions on Evolutionary Computation, vol. 26, No. 5, pp. 1192-1199, Oct. 2022 (8 pages).

Sun, Y. et al., "Accelerating the 2+2+1method for estimating local traveltime operators in nonlinear beamforming using GPU graphics cards," Journal of Geophysics and Engineering, vol. 19, No. 3, pp. 389-402, Apr. 13, 2022 (14 pages).

Porras, J. et al., "A semblance-based microseismic event detector for DAS data," Geophys. J. Int., vol. 236, pp. 1716-1727, Jan. 13, 2024 (12 pages).

Sun, Y. et al., "An efficiency-improved GPU algorithm for the 2+2+1 method in nonlinear beamforming," Journal of Geophysics and Engineering, vol. 21, No. 4, pp. 1138-1152, Apr. 22, 2014 (15 pages).

Stanek, F. et al., "Semblance for microseismic event detection," Geophys. J. Int., vol. 201, No. 3, pp. 1362-1369, Apr. 2, 2015 (8 pages).

Ehsaninezhad, L. et al., "Urban subsurface exploration improved by denoising of virtual shot gathers from distributed acoustic sensing ambient noise," Geophys. J. Int., vol. 237, No. 3, pp. 1751-1764, Apr. 11, 2024 (14 pages).

* cited by examiner

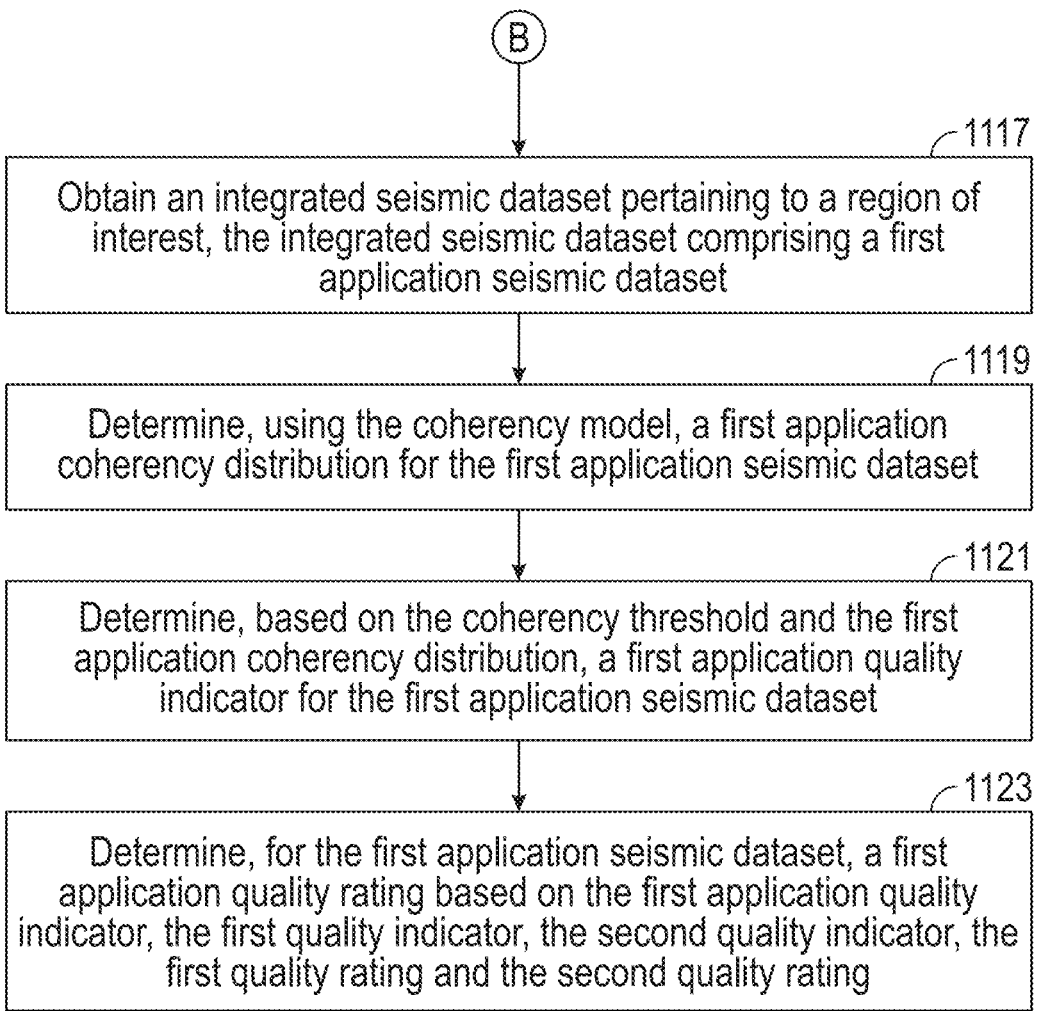

Ⓑ

1117

Obtain an integrated seismic dataset pertaining to a region of interest, the integrated seismic dataset comprising a first application seismic dataset

1119

Determine, using the coherency model, a first application coherency distribution for the first application seismic dataset

1121

Determine, based on the coherency threshold and the first application coherency distribution, a first application quality indicator for the first application seismic dataset

1123

Determine, for the first application seismic dataset, a first application quality rating based on the first application quality indicator, the first quality indicator, the second quality indicator, the first quality rating and the second quality rating FIG. 11 (Continued)

SYSTEMS AND METHODS FOR QUALITY-CONTROLLING SEISMIC DATASETS

BACKGROUND

Quality assessment is a necessary process occurring in various phases of seismic processing. In particular, quality assessment is generally performed during a seismic acquisition to ensure that the acquisition equipment is working properly and the acquired seismic data meets quality standards.

Performing quality assessment during a seismic acquisition presents numerous challenges, especially when using vertical seismic profile (VSP) equipment. For instance, a quality assessment procedure must be fast enough to determine potential issues in real-time. Furthermore, in conventional field conditions, computing power is usually limited and the power supply unstable. Additionally, some valuable information, such as pilot-sweep and ground force signals, is usually not available in real-time during a VSP acquisition.

Accordingly, there exists a need for a robust and efficient quality assessment method to assess VSP seismic datasets in real-time, despite the described limitations.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for performing quality assessment of a seismic dataset. The method includes obtaining a first calibration seismic dataset that includes a first quality rating, obtaining a second calibration seismic dataset that includes a second quality rating, and determining, using a coherency model, a first coherency distribution for the first calibration seismic dataset and a second coherency distribution for the second calibration seismic dataset. The method further includes determining a coherency threshold based on the first coherency distribution and the second coherency distribution, and determining, based on the coherency threshold and the first coherency distribution, a first quality indicator for the first calibration seismic dataset. The method still further includes determining, based on the coherency threshold and the second coherency distribution, a second quality indicator for the second calibration seismic dataset. The method also includes obtaining an integrated seismic dataset pertaining to a region of interest, the integrated seismic dataset including a first application seismic dataset, and conducting a quality assessment procedure. The quality assessment procedure includes determining, using the coherency model, a first application coherency distribution for the first application seismic dataset and determining, based on the coherency threshold and the first application coherency distribution, a first application quality indicator for the first application seismic dataset. The quality assessment procedure further includes determining, for the first application seismic dataset, a first application quality rating based on the first application quality indicator, the first quality indicator, the second quality indicator, the first quality rating and the second quality rating.

In one aspect, embodiments disclosed herein relate to a seismic processing system for performing quality assessment of a seismic dataset. The seismic processing system includes a seismic data storage reader, one or more computer processors connected to the seismic data storage reader, a computer memory and a seismic data storage writer. The seismic data storage reader is configured to receive, from a seismic data storage medium, a first calibration seismic dataset comprising a first quality rating and receive, from the seismic data storage medium, a second calibration seismic dataset comprising a second quality rating. The seismic data storage reader is further configured to receive, from the seismic data storage medium, an integrated seismic dataset pertaining to a region of interest, the integrated seismic dataset comprising a first application seismic dataset. The computer memory includes computer-executable instructions stored thereon that, when executed on the one or more computer processors, cause the one or more computer processors to perform steps. The steps include determining, using a coherency model, a first coherency distribution for the first calibration seismic dataset and determining, using the coherency model, a second coherency distribution for the second calibration seismic dataset. The steps further include obtaining a coherency threshold based on the first coherency distribution and the second coherency distribution. The steps further include determining, based on the coherency threshold and the first coherency distribution, a first quality indicator for the first calibration seismic dataset. The steps further include determining, based on the coherency threshold and the second coherency distribution, a second quality indicator for the second calibration seismic dataset and conducting a quality assessment procedure. The quality assessment procedure includes determining, using the coherency model, a first application coherency distribution for the first application seismic dataset and determining, based on the coherency threshold and the first application coherency distribution, a first application quality indicator for the first application seismic dataset. The quality assessment procedure further includes determining, for the first application seismic dataset, a first application quality rating based on the first application quality indicator, the first quality indicator, the second quality indicator, the first quality rating and the second quality rating. The seismic data storage writer is configured to output, to the seismic data storage medium, a quality assessment comprising the first application quality rating.

Other aspects and advantages of the claimed subject matter will be apparent from the following description and the appended claims.

DETAILED DESCRIPTION

Figure 1:
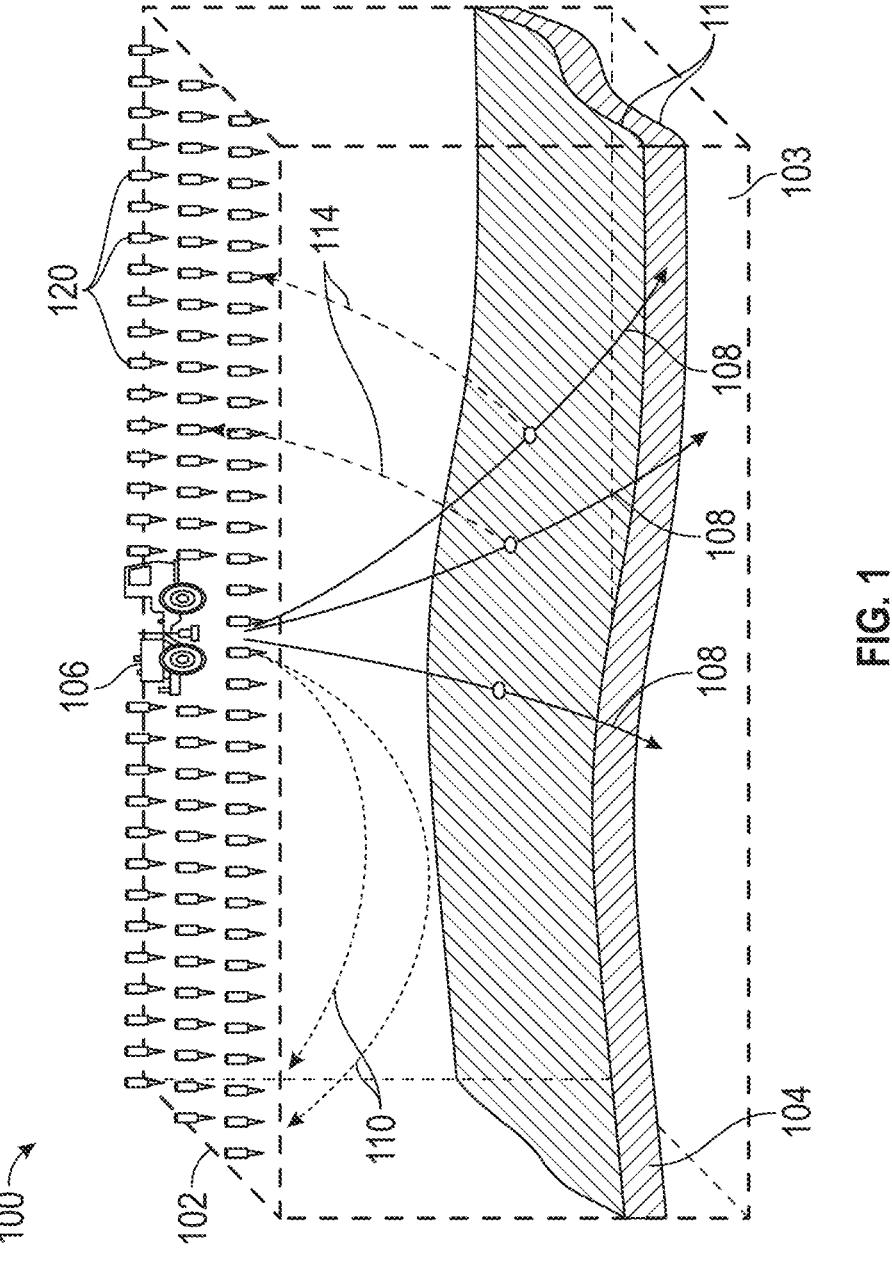
FIG. 1 depicts a seismic acquisition system in accordance with one or more embodiments disclosed herein.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. For example, a computer may reference two or more such computers.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

Terms such as "approximately," "about," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide. For example, these terms may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

It is to be understood that one or more of the steps shown in a flowchart may be omitted, repeated, and/or performed in a different order than the order shown. Accordingly, the scope disclosed herein should not be considered limited to the specific arrangement of steps shown in the flowchart.

Although multiple dependent claims are not introduced, it would be apparent to one of ordinary skill that the subject matter of the dependent claims of one or more embodiments may be combined with other dependent claims.

In the following description of FIGS. 1-17B, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an embodiment which may be implemented in addition to, in conjunction with, or in place of the embodiments described with regard to a corresponding like-named component in any other figure.

The term "seismic dataset" as used herein broadly means any dataset received and/or recorded as part of the seismic surveying process, or simulated, including particle displacement, velocity and/or acceleration, pressure and/or rotation, wave reflection, and/or refraction data. One with ordinary skill in the art will recognize that, in general, a seismic dataset may be inferred or otherwise derived from data received and/or recorded as part of a seismic surveying process. Thus, this disclosure may at times refer to a "seismic dataset and/or dataset derived therefrom," or equivalently simply to a "seismic dataset". Both terms are intended to include both a measured/recorded seismic dataset and such a derived dataset, unless the context clearly indicates that only one or the other is intended. A properly processed seismic dataset may aid in decisions as to if and where to drill for a drilling target. A seismic trace may be a time series, with samples at monotonically increasing times, or after some processing, a depth series with samples at monotonically increasing depths.

The terms "velocity model," "density model," "physical property model," or other similar terms as used herein refer to a numerical representation of the corresponding parameters characterizing subsurface regions. In some embodiments, the numerical representation may include an array of numbers, typically a 2-D or 3-D array, where each number represents the value of a physical property, such as velocity, density, or other physical property, at a point in, or a portion (cell) of, the subsurface. Each number may be called a "model parameter". A subsurface region may be conceptually divided into a plurality of discrete cells for computational purposes (i.e., discretized). For example, the spatial distribution of velocity may be modeled using constant-velocity units (layers) through which its ray paths, obeying or modeled according to Snell's law, can be traced. In other cases, the subsurface may be modeled as an array of tetrahedral or cuboidal cells.

Methods and systems are disclosed for assessing quality of seismic datasets using coherency metrics. Methods and systems disclosed provide a quality rating to one or more seismic datasets, based on quality ratings of calibration seismic datasets. The methods and system disclosed may further be used to determine a subsurface property, identify a drilling target in a subsurface and drill a well perforating the drilling target, among other uses. Advantageously, the methods and system disclosed may be run on computing machines readily available near seismic acquisition sites. Advantageously, the method and systems disclosed may be run in real-time while a seismic acquisition of the one or more seismic datasets is being performed.

FIG. 1 depicts a surface seismic acquisition system (100) configured to acquire surface seismic data pertaining to an acquisition region. In some applications, the acquisition region is a region of interest. The acquisition region includes an acquisition surface (102) and an acquisition subsurface (103). The acquisition subsurface (103) may contain a hydrocarbon reservoir (104). In general, seismic acquisition systems may be configured in a myriad of ways. Therefore, the surface seismic acquisition system (100) is not intended to be limiting with respect to the invention. The particular configuration of the seismic acquisition system equipment or location is merely intended as an illustration. In FIG. 1, the surface seismic acquisition system (100) is depicted as being on land, and a seismic source (106) is mounted on a land vehicle. In other examples, the surface seismic acquisition system (100) may be offshore, and the seismic source towed behind a seismic vessel.

The surface seismic acquisition system (100) may utilize the seismic source (106) on the acquisition surface (102) that, when fired, generates radiated seismic waves (108) into the acquisition subsurface (103). The radiated seismic waves (108) include pressure waves and shear waves. In one or more embodiments, the seismic source (106) fires at a certain location for a certain duration, then stops. During the surface seismic acquisition system (100), the seismic source (106) may fire multiple times, at different locations, hence illuminating the whole acquisition subsurface (103). In this disclosure, each activation of the seismic source (106), occurring at a distinct time, is also called a seismic source (106). Then, the surface seismic acquisition system (100) is said to have multiple seismic sources. Part of the radiated seismic waves (108) may return to the acquisition surface (102) as refracted seismic waves (110). Part of the radiated seismic waves (108) may be reflected by geological reflectors (112) and return to the acquisition surface (102) as reflected seismic waves (114).

At the acquisition surface (102), seismic receivers (120) detect signals of many kinds. Notable examples of signals received by the seismic receivers (120) include the refracted seismic waves (110) and the reflected seismic waves (114) that return to the acquisition surface (102). Examples of signals that may be detected by the seismic receivers (120)

further include waves that reflect multiple times within the acquisition subsurface (103), known as multiple reflections. Examples of signals that may be detected by the seismic receivers (120) further include signal that does not originate from the seismic source (106). Signal that does not originate from the seismic source (106) may be referred to as noise. Examples of noise that may be detected by the seismic receivers (120) include, depending on where the surface seismic acquisition system (100) is located, ground roll, engine noise, swell noise, propeller noise, equipment damage noise and interferences from a seismic source from another seismic acquisition system. Examples of seismic receivers (120) include geophones, hydrophones, or any combination thereof.

The seismic source (106) and seismic receivers (120) may be of various types. In one or more embodiments, the acquisition region is located onshore and the seismic source (106) is a seismic vibrator (e.g., mounted on a land vehicle) and the seismic receivers (120) are geophones. A land vehicle may carry the seismic source to different locations to complete the seismic acquisition. The geophones may also be moved at any time during the seismic acquisition, manually or another vehicle. In other embodiments, the acquisition region is located offshore, and the seismic source (106) is an array of air guns mounted on a seismic vessel. In these embodiments, during the seismic acquisition, the seismic source (106) is moved, i.e., towed to different locations via the motion of the seismic vessel. Additionally, the seismic receivers (120) may be geophones, hydrophones, or a combination thereof. The seismic receivers (120) may be located inside cables that are towed by the seismic vessel, or inside ocean bottom nodes (OBN). During a seismic acquisition using OBN, the OBN may be moved to different locations by a machine, such as a submarine vehicle. Generally, a geophone records a velocity of particles (e.g., soil or rock particles) that are moved by a seismic wave, such as a compressional wave or a shear wave, that reach the geophone. Generally, a hydrophone records a pressure of seismic waves that reaches the hydrophone. It is emphasized that the examples of seismic acquisition and equipment used for the seismic acquisition herein are given only as examples and should not be considered limiting. One with ordinary skill in the art will recognize that other examples of seismic acquisition and equipment used for the seismic acquisition may be used without departing from the scope of this disclosure.

The surface seismic data may present multiple seismic wave types. Seismic wave types may include compressional waves (hereinafter "P-waves"), shear waves (hereinafter "S-waves"), Rayleigh waves, and Love waves. Further, each seismic wave type within the surface seismic data may have traveled in multiple ways or directions. For example, P-waves and S-waves may have traveled towards the center of the earth and towards the acquisition surface (102). Subterranean features such as geological reflectors (112) may manifest within surface seismic data. Further, certain geological reflectors (112) may be interpreted as indicative of the existence of a hydrocarbon reservoir (104). For example, the apex of an anticline within the acquisition subsurface (103) may trap hydrocarbons. Thus, the manifestation of an anticline within surface seismic data may be interpreted as an indicator that a hydrocarbon reservoir (104) may exist within the acquisition subsurface (103). If the manifestation of a geological reflectors (112) is indicative of a hydrocarbon reservoir (104), a well may be drilled through the acquisition subsurface (103) to access and produce hydrocarbons from the hydrocarbon reservoir (104).

7

Figure 2:
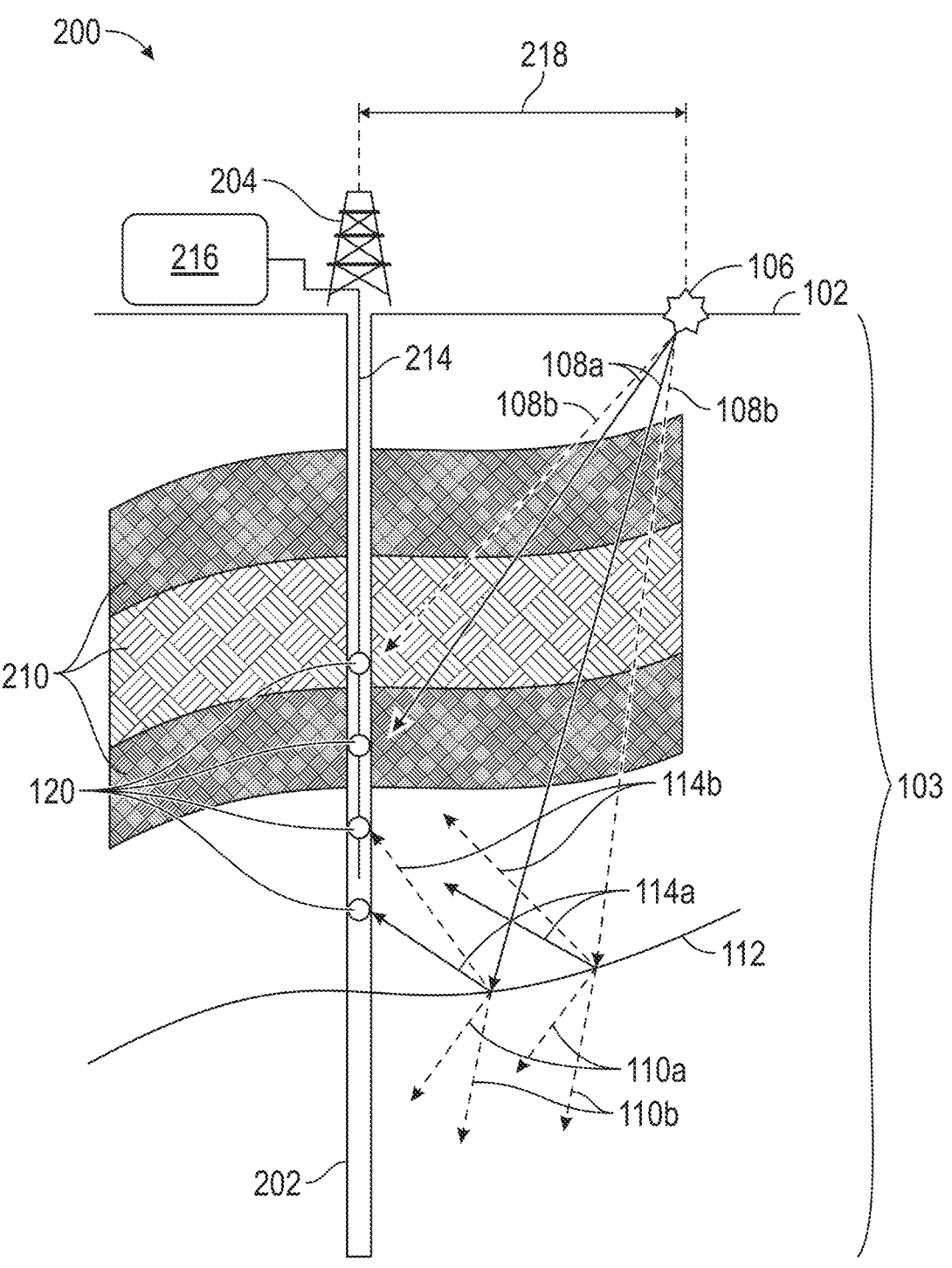
FIG. 2 depicts a seismic acquisition system in accordance with one or more embodiments disclosed herein.

A vertical seismic profiling (VSP) acquisition survey may be performed during or following the drilling of an extant well. FIG. 2 depicts a VSP acquisition system (200) at an extant well (202), in accordance with one or more embodiments. The extant well (202) may traverse a plurality of overburden layers (210) and geological reflectors (112). A VSP acquisition system (200) may use a VSP acquisition system to generate and record VSP data. The VSP acquisition system may include one or more seismic sources (106) and multiple seismic receivers (120). Each VSP acquisition system may be designed for one or more seismic source-seismic receiver configurations.

Configurations may include zero-offset VSP, offset VSP, walkaway VSP, walk-above VSP, and seismic-while-drilling VSP. Zero-offset VSP may use one or more stationary or static seismic sources (106) located near a drill rig (204) on the acquisition surface (102) and multiple seismic receivers (120) located within the extant well (202) (i.e., downhole). Offset VSP may use one or more static seismic sources (106) located some distance (218) away from the drill rig (204) on the acquisition surface (102) and multiple seismic receivers (120) downhole. Walkaway VSP may use one or more seismic sources (106) located on the acquisition surface (102) and multiple static seismic receivers (120) downhole. Walk-above VSP may use multiple static seismic sources (106) located on the acquisition surface (102) and multiple static seismic receivers (120) downhole. In this configuration, the seismic sources (106) are often directly above the seismic receivers (120) in a deviated extant well (not shown). Seismic-while-drilling VSP may use a drill bit as the seismic source (106) downhole with multiple static seismic receivers (120) on the acquisition surface (102). Thus, FIG. 2 may depict numerous types of VSP acquisition systems (200) such as offset VSP or walkaway VSP. Hereinafter, "VSP data" may be data collected using any VSP configuration.

In FIG. 2, the seismic receivers (120) are suspended to the drill rig (204) using a means of conveyance (214). The means of conveyance (214) may be a wireline cable, fiber optic cable, coil tubing, drill pipe, wired drill pipe, or any other conveyance (214) known to a person of ordinary skill in the art. The means of conveyance (214) provides mechanical support for the seismic receivers (120) in the extant well (202). Further, the means of conveyance (214) may provide electrical power to the seismic receivers (120), transmit data recorded by the seismic receivers (120) to a recording facility (216) on the acquisition surface (102), or both. In land operations, the recording facility (216) may be mounted within a truck. In sea operations, the recording facility (216) may be part of the drill rig (204), production platform, or ship.

Continuing with FIG. 2, the seismic source (106) generates radiated seismic waves (108a-b) each of which may propagate along a variety of paths. First, a radiated seismic wave (108a-b) may propagate directly through the acquisition subsurface (103) to the receiver (120). Second, a radiated seismic wave (108a-b) may propagate through the acquisition subsurface (103) and reflect at geological reflectors (112) as reflected seismic waves (114a-b). Third, a radiated seismic wave (108a-b) may propagate through the acquisition subsurface (103) and refract at geological reflectors (112) as refracted seismic waves (110a-b). Some radiated seismic waves, such as seismic waves (108a-b), reflected seismic waves (114a-b), and refracted seismic waves (110a-b) may be P-waves (108a, 114a, and 110a) and others may be S-waves (108b, 114b, and 110b). Further, refracted or reflected S-waves may convert, in part, to P-waves. Further still, refracted or reflected P-waves may convert, in part, to S-waves.

As previously described, surface seismic data and VSP data may present multiple seismic wave types, such as P-waves and S-waves, and multiple seismic wave directions, such as towards the center of the earth and towards the acquisition surface (102). Wavefield separation methods may be used to separate surface seismic data and VSP data by seismic wave type and/or seismic wave direction. For example, wavefield separation methods may be used to separate surface seismic data such that the surface seismic data only presents P-waves propagating downward. Further, wavefield separation methods may be used to separate VSP data such that the VSP data only presents P-waves. Wavefield separation methods include, but are not limited to, first break picking, median filtering, mean filtering, eigenvector filtering, masking filtering, Radon transform methods, or any combination of these methods. Further, wavefield separation methods may be performed in, but not limited to, the time-depth domain, frequency-wavenumber domain, and time-slowness domain.

In one or more embodiments, each seismic receiver (120) includes a recorder, that records the amplitudes of the signals detected by the seismic receiver (120) at a sequence of discreet times throughout the survey. The recorded amplitudes at each of these discreet times is called a sample. Then, for each seismic receiver (120), a seismic trace is defined. Therefore, a distinct seismic trace is formed, for each seismic source activation and for each seismic receiver (120). The seismic trace includes an ordered set of samples (i.e., a time series) that may begin at a time at which a seismic source starts firing and last for a predefined duration, $T_{max}$, known as the trace length. The distinct seismic trace includes a time series of signal amplitudes recorded at discreet times discretizing a time interval of length $T_{max}$. In some embodiments, the trace length $T_{max}$ is a fixed number of seconds. In some embodiments, the trace length $T_{max}$ is a fixed number selected between eight seconds and thirty seconds. The set of discreet times discretizing the time interval for a seismic trace is called a time sampling of the seismic trace. For simplicity, the time interval, for each seismic trace, is translated to the interval $[0, T_{max}]$, and each sample of the seismic trace is said occur at a certain time in the interval $[0, T_{max}]$. In one or more embodiments, the time sampling is regular for each seismic trace, meaning that the time elapsed between two consecutive discreet times is constant and called a sample rate.

The seismic traces acquired from a seismic acquisition form a seismic dataset. The trace length $T_{max}$ may vary for each seismic trace within the seismic dataset. In some embodiments, trace length $T_{max}$ is a same number for a subset of the seismic traces of the seismic dataset. In some embodiments, the trace length $T_{max}$ is a same number for all seismic traces of the seismic dataset. In some implementations, the seismic traces are extended or shortened by any method known in the art so that the resulting trace length is a pre-defined, unique number $T_{max}$. Shortening a seismic trace may be performed, for example, by truncating the seismic trace. Extending a seismic trace may be performed, for example, by padding the seismic trace.

A spatial region, such as the acquisition region, may be two-dimensional or three-dimensional. In a three-dimensional spatial region, a point may be referenced, for example, by three Cartesian spatial coordinates, (x, y, z), where z is a depth coordinate, also called a depth location, and (x, y) is a set of lateral coordinates, called a lateral location. In a two-dimensional spatial region, a point may be referenced, for example, by two Cartesian spatial coordinates, (x, z), where z is the depth coordinate, also called the depth location and the set of lateral coordinates includes a single coordinate, x, also called the lateral location. A point in a spatial region may be referenced by other coordinate systems known in the art, such as a three-dimensional cylindrical coordinate system or a two-dimensional polar coordinate system.

A seismic dataset may be processed for various purposes, including generating a velocity model of a spatial region or an image of seismic reflectors within the spatial region. Seismic reflectors may represent geological boundaries, such as boundaries between geological layers, boundaries between different pore fluids, faults, fractures or groups of fractures within the rock. Generally, processing a seismic dataset comprises a sequence of steps designed, without limitation, to do one or more of the following: correct for near surface effects; attenuate noise; compensate for irregularities in the seismic acquisition system geometry; calculate a depth velocity model; image reflectors in the subsurface; calculate a plurality of seismic attributes to characterize the acquisition subsurface (103), and aid in identifying drilling targets.

Figure 3:
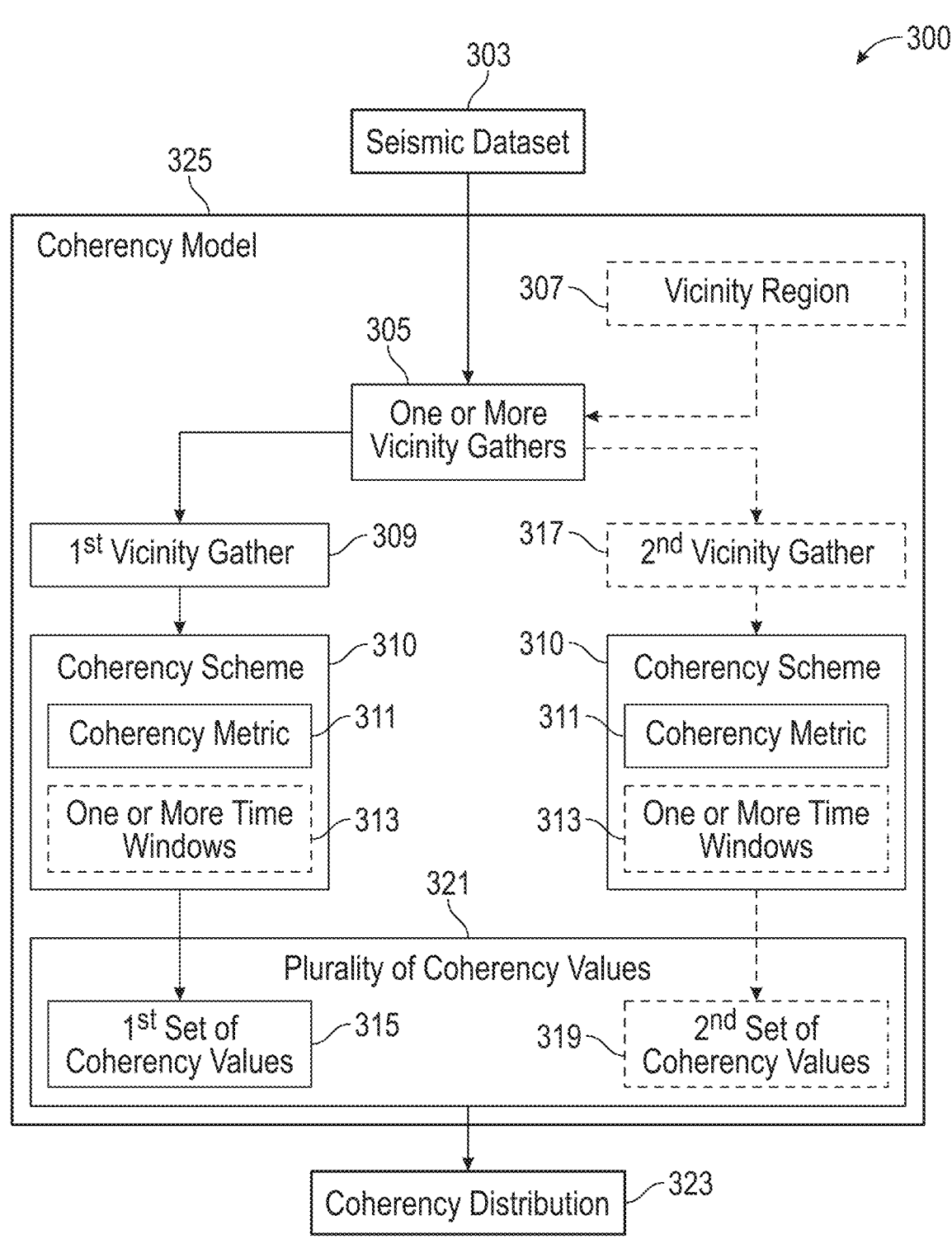
FIG. 3 depicts a workflow for determining a coherency distribution in accordance with one or more embodiments disclosed herein.

FIG. 3 depicts a system (300) for computing a coherency distribution (323) for a seismic dataset (303) using a coherency model (325). The seismic dataset (303) includes a plurality of seismic traces. The seismic dataset (303) may be obtained in many ways. In one or more embodiments, the seismic dataset (303) is acquired using a seismic acquisition system, such as the surface seismic acquisition system (100) in FIG. 1 or the VSP acquisition system (200) in FIG. 2. It follows that in some embodiments, the seismic dataset (303) is a surface seismic dataset while in other embodiments, the seismic dataset (303) is a VSP dataset. In some embodiments, the seismic dataset (303) is extracted from a database of existing seismic data, rather than acquired. In some embodiments, the seismic dataset (303) is a single seismic gather in a format known in the art, such as a shot gather, a common midpoint gather, or a common receiver gather. In other embodiments, the seismic dataset (303) includes a plurality of seismic gathers. The seismic dataset (303) needs not be sorted and in further embodiments, the seismic traces of the seismic dataset (303) are not sorted as seismic gathers.

The seismic dataset (303) pertains to a spatial region, such as the acquisition region in FIG. 1. The spatial region includes a spatial surface and a spatial subsurface. Each point of the spatial region is located by a depth location and a lateral location. Each seismic trace of the seismic dataset (303) corresponds to a seismic source and a seismic receiver. For any seismic trace, a lateral location may be defined in many ways. In some implementations, the lateral location of a seismic trace is defined as a lateral location of the seismic source of the seismic trace. In such implementations, seismic traces from a same shot gather may have the same lateral location. In other implementations, the lateral location of the seismic trace is defined as a lateral location of the seismic receiver of the seismic trace. In other implementations, the lateral location of the seismic trace is defined as a midpoint between the lateral location of the source location of the seismic trace and the lateral location of the seismic receiver of the seismic trace. In some embodiments, the seismic dataset (303) is a VSP seismic dataset including one or more VSP shot gathers, with seismic receivers positioned perfectly vertically. In such scenarios, the seismic receivers for a same VSP shot gather may have the same lateral location. In such scenarios, the seismic traces of a same VSP shot gather may have the same lateral location if the lateral location of a seismic trace is defined by one of the following a), b), or c): a) the lateral location of the seismic source of the seismic trace; b) the lateral location of the seismic receiver of the seismic trace; c) the midpoint between the lateral location of the seismic source of the seismic trace and the lateral location of the seismic receiver of the seismic trace.

The lateral locations of all the seismic traces of the seismic dataset (303) discretize the spatial surface. In FIG. 3, the seismic traces of the seismic dataset (303) are arranged into one or more vicinity gathers (305). Seismic traces within a same vicinity gather among the one or more vicinity gathers (305) are said to be neighboring seismic traces. The one or more vicinity gathers (305) can be defined in many ways. In some implementations, the seismic traces of the seismic dataset (303) are arranged as a set of one or more seismic gathers, such as shot gathers, receiver gathers, or common mid-point (CMP) gathers, and the vicinity gathers are defined as the seismic gathers themselves. In such implementations, each vicinity gather is defined as a distinct seismic gather. Each distinct seismic gather defines a distinct vicinity gather. For instance, in some embodiments, the seismic traces of the seismic dataset (303) are arranged as shot gathers and each vicinity gather is defined as a distinct shot gather of the seismic dataset (303). Specifically, in some embodiments, the seismic dataset (303) is a VSP seismic dataset arranged as one or more VSP shot gathers, and each vicinity gather is defined as a distinct VSP shot gather of the seismic dataset (303). An example implementation where vicinity gathers are defined as the VSP shot gathers of a VSP seismic dataset is provided later in this disclosure.

In other embodiments, each vicinity gather is a set of seismic traces having a lateral location within a common spatial vicinity. A spatial vicinity can be defined in many ways. In some implementations, a spatial vicinity is defined using a vicinity region (307). The vicinity region (307) is intended to provide a shape to a spatial vicinity. The vicinity region (307) is a contour of the spatial surface. If the spatial surface is two-dimensional, examples of a vicinity region (307) include a circle, a rectangle, or a polygon of any shape. If the spatial surface is one-dimensional, examples of the vicinity region include a line segment.

In one or more embodiments, a distinct spatial vicinity with the same shape as the vicinity region (307) is formed around the lateral location of each seismic trace of the seismic dataset (303). In such embodiments, there are as many spatial vicinities as the number of seismic traces in the seismic dataset (303). For instance, in some embodiments, the vicinity region (307) is an aperture region. As a first example of an aperture region, the vicinity region (307) may be defined as a circle of radius r. A given spatial vicinity is then defined as circle of radius r, centered at a given seismic trace lateral location. The vicinity gather includes the given seismic trace and all the seismic traces with a lateral location within a radius r of the given seismic trace's lateral location. In some embodiments, the radius r is called an aperture around the given seismic trace. The given vicinity gather is said to be centered at the given seismic trace.

As a second example of an aperture region, the vicinity region (307) may be defined as a rectangle of length $r_1$ and width $r_2$. A given spatial vicinity is then defined as a rectangle, of length $r_1$ and width $r_2$, centered at a given seismic trace lateral location. The vicinity gather includes the given seismic trace and all the seismic traces with a lateral location within a rectangle, of length $r_1$ and width $r_2$ around the given seismic trace's lateral location. In some embodiments, the length $r_1$ and width $r_2$ are said to form a rectangular aperture around the given seismic trace. The given vicinity gather is said to be centered at the given seismic trace. It is noted that in implementations where the vicinity region (307) is an aperture region, a given seismic trace belongs to multiple vicinity gathers. For instance, if a first vicinity gather, centered at a first seismic trace, includes, at least, a second seismic trace, then a second vicinity gather, centered at the second seismic trace, reciprocally includes the first seismic trace. The first seismic trace and the second seismic trace both belong to the first vicinity gather and second vicinity gather.

A lateral space variable is denoted as $X^L$ (i.e.: $X^L=(x, y)$ if the spatial surface is two dimensional or $X^L=x$ if the spatial surface is one dimensional). Generally, the vicinity region (307), of any shape, (i.e., not necessarily circular or rectangular), has a centroid $$X_0^L.$$

A spatial vicinity, centered at a centroid $X^L$, is defined as a set of points inside an area obtained by translating the vicinity region (307) from $$X_0^L$$

to $X^L$. Thus, a spatial vicinity has the same shape as the vicinity region (307). In one or more embodiments, one or more centroids $$X_i^L$$

are selected in the spatial surface, for i=1, . . . , m, for a certain number of centroids m≥1. For each centroid $$X_i^L,$$

a spatial vicinity $R_i$ is defined by translating the vicinity region (307) from $$X_0^L \text{ to } X_i^L.$$

Thus, one or more spatial vicinities, $R_i$ are generated, for i=1, . . . , m. The m spatial vicinities form m vicinity gather(s) $G_i$, for i=1, . . . , m. Each vicinity gather, $G_i$, includes all the seismic traces with a lateral location within the spatial vicinity $R_i$, for =1, . . . , m. In some implementations, including implementations in which the vicinity region (307) is an aperture region, m is equal to the number of seismic traces of the seismic dataset (303) and each centroid $$X_i^L$$

is a lateral location of a distinct seismic trace. In such implementations, a distinct spatial vicinity is formed around the spatial location of each seismic trace of the seismic dataset (303). Accordingly, one vicinity gather is formed for each seismic trace of the seismic dataset (303), each given vicinity gather corresponds to a given seismic trace, each given vicinity gather includes the given seismic traces and its neighboring seismic traces. The spatial vicinities may be defined in other ways without departing from the scope of this disclosure.

A first vicinity gather (309) is sent to a coherency scheme (310) in order to compute a first set of coherency values (315). The coherency scheme (310) includes a coherency metric (311) and one or more time windows (313). As previously stated, a seismic trace pertaining to the first vicinity gather (309) includes a time series of signal amplitudes recorded at discreet times discretizing the time interval $[0,T_{max}]$. Denoting $n_w{\geq}1$ as the number of time windows, each time window, enumerated by the subscript i, is an interval $W_i=[T_{i,min},T_{i,max}]$, where $T_{i,min}$ and $T_{i,max}$ are two numbers such that $0<T_{i,max}-T_{i,min}{\leq}T_{max}$, for all $i{\leq}n_w$.

In some implementations, the one or more time windows (313) include only one time window $W_1=[T_{1,min},T_{1,max}]$. In some implementations, the one or more time windows (313) include only one time window $W_1=[T_{1,min},T_{1,max}]$ that occupies the whole interval $[0,T_{max}]$, which means that $T_{1,min}=0$ and $T_{1,max}=T_{max}$. In some implementations, the one or more time windows (313) include a plurality of time windows of a constant window size T, which means that $n_w>1$ and $T_{i,max}-T_{i,min}=T$, for i=1, . . . , $n_w$. In such embodiments, the one or more time windows (313) are said to form a sliding time window. In some implementations of a sliding time window, the centers of the time windows $W_i$ are evenly spaced by a constant stride denoted as $T_s$. In such implementations, $n_w>1$, $T_{i,max}-T_{i,min}=T$, for $i{\leq}n_w$ and $T_{i+1,max}-T_{i,max}=T_s$ for $i<n_w$. As a specific example, a sliding time window with a constant stride may be formed using a record length of $T_{max}=28$ s, a constant window size of T=50 ms and a constant stride of $T_s=25$ ms. In this specific example, the one or more time windows (313) include $n_w=1118$ time windows $W_i$, for i=1, . . . , 1118, each time window $W_i$ defined, in milliseconds, by $T_{i,min}=(i-1){\times}25$ and $T_{i,max}=50+(i-1){\times}25$. In this specific example, the union of the one or more time windows (313) covers the whole time interval $[0,T_{max}]$. Furthermore, because the stride is less than the window size in this specific example, every two consecutive time windows $W_i$ and $W_{i+1}$ overlap.

In other embodiments, more than two consecutive time windows may overlap. As a specific example, the one or more time windows (313) may be composed of the three time windows [0,1000 ms], [0,2000 ms] and $[0,T_{max}]$. In other embodiments, the one or more time windows (313) do not overlap. As a first specific example of non-overlapping time windows, the one or more time windows (313) may be composed of the three time windows [0,1000 ms], [2000 ms,3000 ms] and [4000 ms,$T_{max}$]. As a second specific example of non-overlapping time windows, the one or more time windows (313) may form a sliding time window with constant window size and constant stride where the constant stride is greater than the constant window size, in accordance with some embodiments. It is further noted that the union of the one or more time windows (313) need not cover the whole time interval $[0,T_{max}]$. As a specific example in which $T_{max}=10000$ ms, the one or more time windows (313) may be composed of the two time windows [0,1000 ms] and [3000 ms, 5000 ms]. In some implementations, the one or more time windows (313) vary laterally. In such embodiments, the one or more time windows (313) are functions of the lateral space variable $X^L$. The boundaries $T_{i,min}$ and $T_{i,max}$ are functions of $X^L$, for i=1, . . . , $n_w$. For instance, in one or more embodiments, the one or more time windows (313) may be defined based on a horizon H, that may vary laterally. As a specific example, the one or more time windows may be composed of the three laterally variable time windows [H–50 ms, H+50 ms], [H–50 ms, H+1000 ms] and [H–50 ms,$T_{max}$].

The coherency metric (311) is configured to receive, as input, an input set of seismic traces and an input time window and return, as output, a coherency value. The coherency value measures a similarity between the input set of seismic traces based the input time window. For each distinct time window among the one or more time windows (313), a distinct coherency value is computed as an output of the coherency metric (311). Thus, for a first time window among the one or more time windows (313), a first coherency value $c_{1,1}$ associated with the first vicinity gather (309) and the first coherency value $c_{1,1}$ is computed by inputting, to the coherency metric (311), the seismic traces of the first vicinity gather (309) and the first time window. Generally, for each $j \le n_w$, a $j^{th}$ coherency value $c_{1,j}$ associated with the first vicinity gather (309) and the $j^{th}$ time window, is computed using the coherency metric (311) with the seismic traces of the first vicinity gather (309) and the $j^{th}$ time window as inputs, resulting in $n_w$ coherency values, $c_{1,j}$, $1 \le j \le n_w$, associated with the first vicinity gather (309). The $n_w$ coherency values associated with the first vicinity gather (309) form the first set of coherency values (315).

In some embodiments, the one or more vicinity gathers (305) include a unique vicinity gather, which is the first vicinity gather (309). In such embodiments, the system (300) must be implemented with $n_w \ge 2$ time windows and the first set of coherency values (315) forms a plurality of coherency values (321). In other embodiments, the one or more vicinity gathers (305) include a plurality of vicinity gathers. A second vicinity gather (317) is sent to the coherency scheme (310). For each $j \le n_w$, a $(n_w+j)^{th}$ coherency value $c_{2,j}$, associated with the second vicinity gather (317) and the $j^{th}$ time window is computed using the coherency metric (311) with the seismic traces of the second vicinity gather (317) and the $j^{th}$ time window as inputs, resulting in $n_w$ coherency values, $c_{2,j}$, $1 \le j \le n_w$, associated with the second vicinity gather (317). The resulting m coherency values associated with the second vicinity gather (317) form a second set of coherency values (319). Generally, denoting $n_g$ as the number of vicinity gathers within the one or more vicinity gathers (305), $n_w$ coherency values associated with each of the $n_g$ vicinity gathers are computed using the coherency scheme (310). For each $i \le n_g$, for each $j \le n_w$, a $((i-1)(n_w+j))^{th}$ coherency value $c_{i,j}$, associated with the $i^{th}$ vicinity gather and the $j^{th}$ time window, is computed using the coherency metric (311) with the seismic traces of the $i^{th}$ vicinity gather and the $j^{th}$ time window as inputs, resulting in $n_w$ coherency values associated with the $i^{th}$ vicinity gather. The resulting $n_w$ coherency values associated with the $i^{th}$ vicinity gather form a $i^{th}$ set of coherency values, for each $i \le n_g$. The process results in $n_g$ sets of $n_w$ coherency values, $c_{i,j}$, for $1 \le i \le n_g$, $1 \le j \le n_w$, that form the plurality of coherency values (321). Each coherency value $c_{i,j}$ is associated with the $i^{th}$ vicinity gather and the $j^{th}$ time window, for $1 \le i \le n_g$, $1 \le j \le n_w$.

The coherency metric (311) is configured to measure the similarity between the seismic traces of a vicinity gather based on a time window. The coherency metric (311) may be defined in many ways. Examples of a coherency metric (311) include a semblance. In one or more embodiments, a semblance associated with a vicinity gather G and a time window W is defined by:

$$S = \frac{1}{n} \frac{\int_W \left( \sum_{l=1}^n \mathcal{T}_l(t + \Delta t_l) \right)^2 dt}{\int_W \left( \sum_{l=1}^n \mathcal{T}_l(t + \Delta t_l) \right)^2 dt}. \qquad \text{EQ. 1}$$

In EQ. 1, n denotes the number of seismic traces included in the vicinity gather G. Each seismic trace of the vicinity gather G includes a time series. For each $l \le n$, a time series of a $l^{th}$ seismic trace of the vicinity gather G is denoted as $\mathcal{T}_l$. For each $l \le n$, a time variant function $\tilde{\mathcal{T}}_l$ is defined as an interpolation of the $l^{th}$ time series $\mathcal{T}_l$. Advantageously, the time sampling need not be the same for the different seismic traces $\mathcal{T}_l$, for $1 \le l \le n$. The centroid of the convex envelope of the lateral locations of all the seismic traces within the vicinity gather G is denoted as $X^G$. In EQ. 1, the average time shift $\Delta t_l$ is an approximate travel time difference between a first travel time and a second travel time. The first travel time is a travel time of a seismic wave traveling from the seismic source of the $l^{th}$ seismic trace to the seismic receiver of the $l^{th}$ seismic trace. The second travel time is a travel time of a seismic wave traveling from the seismic source of the $l^{th}$ seismic trace to a fictitious seismic receiver. The fictitious seismic receiver has a lateral location of $X^G$ and a depth location equal to the depth location of the seismic receiver of the $l^{th}$ seismic trace.

The average time shifts $\Delta t_l$, $l \le n$, may be defined in many ways. In some embodiments, an estimate of the average time shifts $\Delta t_l$ is computed. For instance, for $l \le n$, an estimate of the average time shift $\Delta t_l$ may be computed based on an estimated velocity of seismic waves in the spatial subsurface and a difference between the lateral locations of the $l^{th}$ seismic trace and a fictitious seismic trace. The fictitious seismic trace has a source location equal to the source location of the $l^{th}$ seismic trace. The fictitious seismic trace has a seismic receiver lateral location of $X^G$ and a seismic receiver depth location equal to the depth location of the seismic receiver of the $l^{th}$ seismic trace. In some embodiments, the estimated velocity is a velocity model of the spatial subsurface. In other embodiments, the estimated velocity is an average of the velocity model in any region encompassing the lateral locations of the seismic traces of the vicinity gather G. In further embodiments, the estimated velocity is an average of the velocity model in any region encompassing the source locations and the seismic receiver locations of the seismic traces of the vicinity gather G.

In some implementations, the average time shifts $\Delta t_l$ are scanned within a range of values, rather than being computed. In such implementations, the average time shifts $\Delta t_l$ are assumed to vary on a pre-defined time shift interval $[\Delta t_{min}, \Delta t_{max}]$. Denoting $\Delta t = \{\Delta t_l, 1 \le n\} = (\Delta t_1, \ldots, \Delta t_n)$ as the set of average time shifts for all traces in the vicinity gather G, the semblance may be defined as the superior boundary of EQ. 1 for $\Delta t \in [\Delta t_{min}, \Delta t_{max}]^n$:

$$S = \sup_{\Delta t \in [\Delta t_{min}, \Delta t_{max}]^n} \left( \frac{1}{n} \frac{\int_W \left( \sum_{l=1}^n \tilde{\mathcal{T}}_l(t + \Delta t_l) \right)^2 dt}{\int_W \sum_{l=1}^n \tilde{\mathcal{T}}_l(t + \Delta t_l)^2 dt} \right). \qquad \text{EQ. 2}$$

In some implementations, the time shift interval $[\Delta t_{min}, \Delta t_{max}]$ is discretized into a set of $n_p$ discreet time shift values $\Delta t^1, \ldots, \Delta t^{n_p}$ such that $\Delta t^1 = \Delta t_{min}$, $\Delta t^{n_p} = \Delta t_{max}$ and $\Delta t^p < \Delta t^{p+1}$, for all $p < n_p$. In such implementations, the semblance may be defined as a maximum of EQ. 1 for $\Delta t_l$ varying along the discreet time shift values:

$$S = \max_{\Delta t \in (\Delta t^1, \ldots, \Delta t^{n_p})^n} \left( \frac{1}{n} \frac{\int_W \left( \sum_{i=1}^n \tilde{\mathcal{T}}_i(t + \Delta t_i) \right)^2 dt}{\int_W \sum_{i=1}^n \tilde{\mathcal{T}}_i(t + \Delta t_i)^2 dt} \right). \qquad \text{EQ. 3}$$

Advantageously, a result of EQ. 3 may be computed using a grid search for the discreet time shift values $\Delta t^1, \ldots, \Delta t^{n_p}$. By contrast, the supremum in EQ. 2 is to be found across continuous values for the average time shifts $\Delta t_l$.

Interpolation of the time series $\mathcal{T}_l$ to $\tilde{\mathcal{T}}_l$ can be defined in many ways. Examples of interpolation methods of $\mathcal{T}_l$ to $\tilde{\mathcal{T}}_l$ include, for example but not limited to, a step interpolation, a Lagrange linear interpolation, a polynomial interpolation and a B-Splines interpolation. Two examples of interpolation methods are described herein for a time series $\mathcal{T}_l$ with a number of samples denoted as $n_s$. The sample times of the time series $\mathcal{T}_l$ are denoted as $t_k$ and defined so that $t_1 \leq 0$, $t_{n_s} \leq T_{max}$ and $t_k < t_{k+1}$ for $1 \leq k < n_s$. The value of the time series $\mathcal{T}_l$ at sample time $t_k$ is denoted as $\mathcal{T}_l(t_k)$. Denoting $I_k$ as the interval $[t_k, t_{k+1}]$ [for $1 < k < n_s$, $I_1 =] -\infty$, $t_2$ [and $I_{n_s} = [t_{n_s}, +\infty[$, a left-step interpolation is a first example interpolation method, defined by:

$$\tilde{\mathcal{T}}_i(t) = \sum_{k=1}^{n_s} \mathcal{T}_i(t_k) \mathbb{1}_{I_k}(t), \qquad \text{EQ. 4}$$

for any real number t. In EQ. 4, $\mathbb{1}_{I_k}$ is the indicator function on the interval $I_k$, meaning that $\mathbb{1}_{I_k}(t) = 1$ if $t \in I_k$ and $\mathbb{1}_{I_k}(t) = 0$ if $t \notin I_k$. The fact that the intervals $I_k$ are semi-open on their right boundary ensures that the time t in EQ. 4 only belongs to a single interval $I_k$. Accordingly, all but one of the terms of the sum in EQ. 4 vanish. The only term that does not vanish is the unique term $\mathcal{T}_l(t_k) \mathbb{1}_{I_k}(t)$ such that $t \in I_k$. Accordingly, for each $k < n_s$, the value $\tilde{\mathcal{T}}_l(t)$ is constantly equal to $\mathcal{T}_l(t_k)$ on the interval $I_k$ and changes to $\mathcal{T}_l(t_{k+1})$ at time $t_{k+1}$. As a second example interpolation method, a Lagrange linear interpolation is defined as $$\tilde{\mathcal{T}}_i(t) = \sum_{k=1}^{n_s-1} \left( \mathcal{T}_i(t_k) + \frac{t - t_k}{t_{k+1} - t_k} (\mathcal{T}_i(t_{k+1}) - \mathcal{T}_i(t_k)) \right) \mathbb{1}_{I_k}(t), \qquad \text{EQ. 5}$$

for any real number t.

Two specific embodiments of a semblance involving the left-step interpolation from EQ. 4 are given in EQs. 6 and 7, assuming that the times series $\mathcal{T}_l$ have the same number of samples $n_s$, the same sample times $t_k$ and a regular time sampling, with sample rate $r = t_{k+1} - t_k$ for a constant positive number r, for all $k < n_s$. Assuming that the average time shifts $\Delta t_l$ are computed as multiples of r to form in EQ. 1, a first embodiment of a semblance involving the left-step interpolation from EQ. 4 is obtained from EQ. 1 as:

$$S = \frac{1}{n} \frac{\sum_{t_k \in W} \left( \sum_{i=1}^n \mathcal{T}_i(t_k + \Delta t_i) \right)^2}{\sum_{t_k \in W} \sum_{i=1}^n \mathcal{T}_i(t_k + \Delta t_i)^2}. \qquad \text{EQ. 6}$$

A second embodiment of a semblance involving the left-step interpolation from EQ. 4 is defined assuming that the average time shifts $\Delta t_l$ are scanned over an interval $[\Delta t_{min}, \Delta t_{max}]$, rather than being computed. The interval $[\Delta t_{min}, \Delta t_{max}]$ is discretized into a set of $n_p$ discreet time shift values, $\Delta t^1, \ldots, \Delta t^{n_p}$ in a similar fashion to EQ. 3. Further assuming that the discreet time shift values are all multiples of r, the second embodiment of a semblance involving the left-step interpolation from EQ. 4 is obtained from EQ. 3 as:

$$S = \max_{\Delta t \in (\Delta t^1, \ldots, \Delta t^{n_p})^n} \left( \frac{1}{n} \frac{\int_W \left( \sum_{i=1}^n \mathcal{T}_i(t_k + \Delta t_i) \right)^2 dt}{\int_W \sum_{i=1}^n \mathcal{T}_i(t_k + \Delta t_i)^2 dt} \right). \qquad \text{EQ. 7}$$

Examples of a coherency metric (311) further include a cross-correlation. The cross-correlation can be defined in many ways. A first example cross-correlation is defined by:

$$Xor = \frac{1}{n^2} \sum_{l=1}^n \sum_{q=1, q \neq p}^n \int_W \tilde{\mathcal{T}}_l(t) \tilde{\mathcal{T}}_q(t + \Delta t_l) dt, \qquad \text{EQ. 8}$$

where the average time shifts $\Delta t_l$ define lags of the cross-correlation. To define second example cross-correlation, it is assumed that the times series $\mathcal{T}_l$ have the same number of samples $n_s$, the same sample times $t_k$ and a regular time sampling, with sample rate $r = t_{k+1} - t_k$. It is further assumed that the average time shifts $\Delta t_l$ are computed as multiples of r, for example, using a velocity model. Using the left-step interpolation from EQ. 4, a second example cross-correlation is defined as a specific embodiment of EQ. 8:

$$Xor = \frac{1}{n^2} \sum_{t_k \in W} \sum_{l=1}^n \sum_{q=1, q \neq p}^n \mathcal{T}_l(t_k) \mathcal{T}_q(t_k + \Delta t_l). \qquad \text{EQ. 9}$$

To define a third example cross-correlation, the average time shifts $\Delta t_l$ are assumed vary as $n_p$ discreet time shift values, $\Delta t^1, \ldots, \Delta t^{n_p}$, that are all multiples of r and discretize an interval $[\Delta t_{min}, \Delta t_{max}]$, in a similar fashion to EQ. 6. A third example cross-correlation is then defined as a maximum cross-correlation in the following sense:

$$Xor = \max_{\Delta t \in (\Delta t^1, \ldots, \Delta t^{n_p})^n} \left( \frac{1}{n^2} \sum_{t_k \in W} \sum_{l=1}^n \sum_{q=1, q \neq p}^n \mathcal{T}_l(t_k) \mathcal{T}_q(t_k + \Delta t_l) \right). \qquad \text{EQ. 10}$$

In further implementations, the coherency metric (311) is a combination of two or more of the formulas from EQs. 1-3 and 6-10.

It is emphasized that the example coherency metrics given by EQs. 1-3 and 6-10 are given only as examples and should not be considered limiting. One with ordinary skill in the art will readily appreciate that other examples of coherency metrics may be used as the coherency metric (311) without departing from the scope of this disclosure.

A coherency distribution (323) is determined based on the plurality of coherency values (321). The coherency distribution (323) may be determined in many ways. In some embodiments, the coherency distribution (323) is the plurality of coherency values (321). In other implementations, the plurality of coherency values (321) is normalized as a plurality of normalized coherency values and the coherency distribution (323) is the plurality of normalized coherency values.

Normalizing the plurality of coherency values (321) can be done using various normalization methods. Examples of normalization methods known in the art for obtaining a plurality of normalized coherency values, $$c'_{i,j},$$

from the plurality of coherency values (321), $c_{i,j}$, for $1 \leq i \leq n_g$, $1 \leq j \leq n_w$, include:

$$\text{Min-max scaling: } c'_{i,j} = \frac{c_{i,j} - c^{min}}{c^{max} - c^{min}}, \qquad \text{EQ. 11}$$

$$\text{Scaling to unit: } c'_{i,j} = \frac{c_{i,j}}{\|c\|}, \qquad \text{EQ. 12}$$

$$\text{Standard scaling: } c'_{i,j} = \frac{c_{i,j} - \overline{c}}{s}. \qquad \text{EQ. 13}$$

In EQ. 11, $c^{min}$ is the smallest of the coherency values among the plurality of coherency values (321), $c^{max}$ is the largest of the coherency values among the plurality of coherency values (321). In EQ. 12, $\|c\|$ denotes a norm of the plurality of coherency values (321) written as a vector, such as a $l^1$-norm or a $l^2$-norm. In EQ. 13, $$\overline{c} = \frac{\sum_{i=1}^{n_g} \sum_{j=1}^{n_w} c_{i,j}}{n_g n_w}$$

is the average coherency value and $$S = \sqrt{\frac{\sum_{i=1}^{n_g} \sum_{j=1}^{n_w} (c_{i,j} - \overline{c})^2}{n_g n_w - 1}}$$

is the sample standard deviation of the plurality of coherency values (321). The examples normalization methods given in EQs. 11-13 should be considered as non-limiting. Other normalization methods may be used without departing from the scope of this disclosure.

In some implementations, the plurality of coherency values (321) or the plurality of normalized coherency values is binned into a plurality of binned coherency values, using a plurality of coherency bins. The coherency distribution (323) is then defined as the plurality of binned coherency values. The coherency distribution (323) may be plotted and observed on a graph. Examples of graph for plotting and observing the coherency distribution (323) known in the art include a density plot, such as a histogram and a kernel density estimate. The values of the density plot, for each coherency value over the range of the coherency distribution (323), is an approximate or exact weight of the coherency value within the coherency distribution (323). In some implementations, the density plot may be normalized to have a maximum value of 1. The coherency scheme (310), the set of operations configured to form the one or more vicinity gathers (305), compute the plurality of coherency values (321) and the coherency distribution (323) form the coherency model (325).

Figure 4:
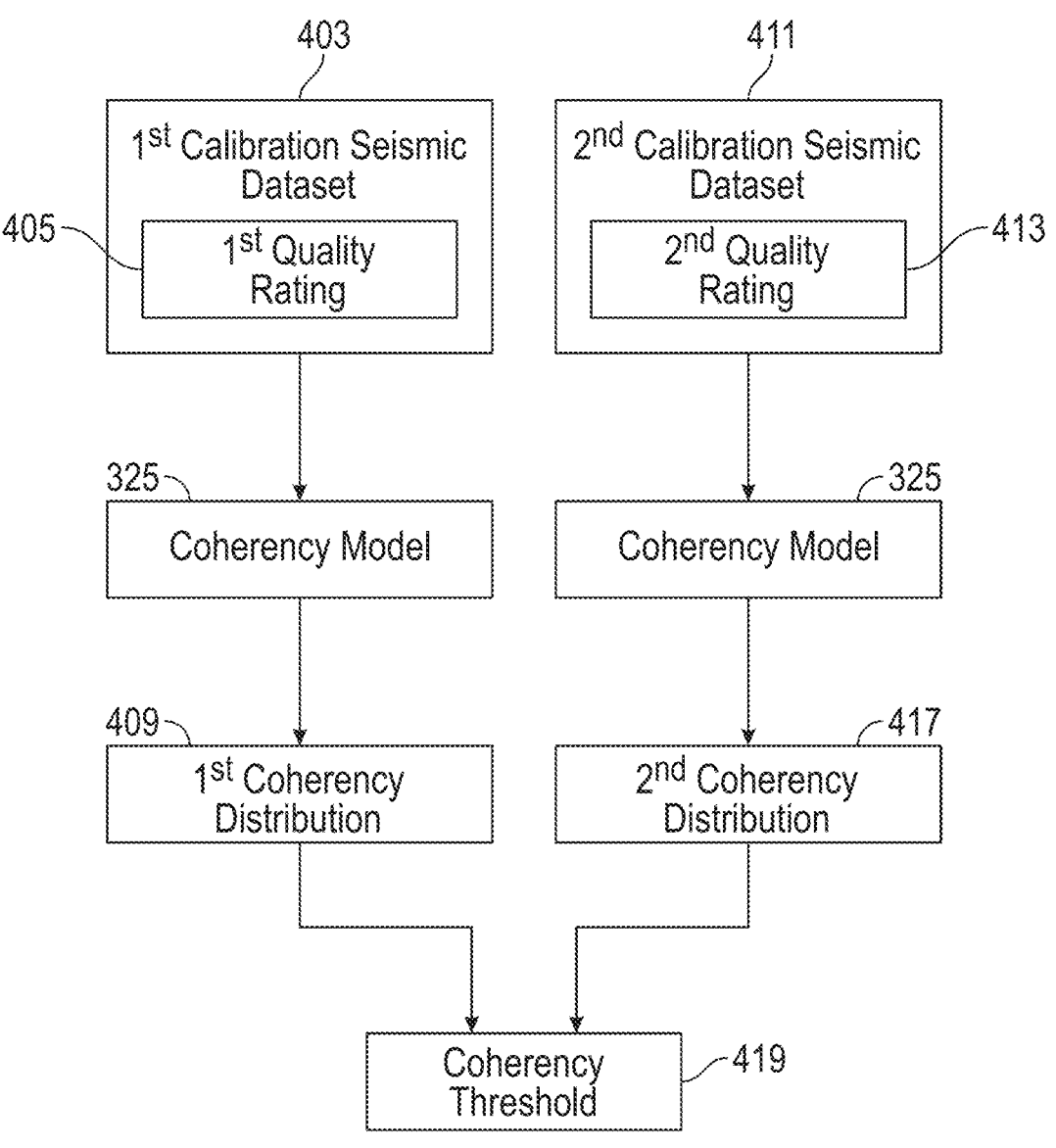
FIG. 4 depicts a box diagram for determining a coherency threshold seismic acquisition system in accordance with one or more embodiments disclosed herein.

FIG. 4 depicts a system for determining a coherency threshold separating two seismic datasets. A first seismic dataset, called a first calibration seismic dataset (403), includes, in a similar fashion to the seismic dataset (303) in FIG. 3, a first plurality of seismic traces. The first calibration seismic dataset (403) may be obtained in many ways. In one or more embodiments, the first calibration seismic dataset (403) is acquired using a seismic acquisition system, such as the surface seismic acquisition system (100) in FIG. 1 or the VSP acquisition system (200) in FIG. 2. It follows that in some embodiments, the first calibration seismic dataset (403) is a surface seismic dataset while in other embodiments, the first calibration seismic dataset (403) is a VSP dataset. In one or more embodiments, the first calibration seismic dataset (403) is extracted from a database of existing seismic data, rather than acquired. In some embodiments, the first calibration seismic dataset (403) is stored on a seismic data storage medium. The seismic data storage medium may include various data storage supports, such as a tape, a disk, a flash memory, or any combination thereof. In some embodiments, the first calibration seismic dataset (403) is accessed using a seismic data storage reader configured to read from the seismic data storage medium. The seismic data storage reader may be of many types, depending on the format of the seismic data storage medium. In some implementations, the seismic data storage reader includes a tape reader, a disk reader, a flash memory reader, or any combination thereof. In some embodiments, the first calibration seismic dataset (403) is a single seismic gather in a format known in the art, such as a shot gather, a common midpoint gather or a common receiver gather. In other embodiments, the first calibration seismic dataset (403) includes a plurality of seismic gathers. The first calibration seismic dataset (403) needs not be sorted and in further embodiments, the first plurality of seismic traces is not sorted as seismic gathers.

The first calibration seismic dataset (403) further includes a first quality rating (405). The first quality rating (405) indicates a quality of the first calibration seismic dataset (403). The first quality rating (405) may be of several formats. In some implementations, the first quality rating (405) is a binary indicator, such as an integer equal to 0 or 1, a Boolean equal to "True" or "False", or a textual binary indicator equal to "high-quality" or "low-quality." In other implementations, the first quality rating (405) is a numerical score, such as any numerical value between 0 and 10. The first quality rating (405) may be defined in many ways. In one or more embodiments, a skilled person, such as a data scientist or a geophysicist, performs a quality control procedure of the first calibration seismic dataset (403) and manually assigns the first quality rating (405).

Quality control procedures may include, for example, a signal-to-noise analysis. Signal-to-noise analysis may include a qualitative visual analysis, such as a visual assessment of a noise level. As a first example, the first quality rating (405) may be defined as a binary indicator equal to "high-quality", if the skilled person concludes, based on experience, that the noise level is low, or "low-quality" if the skilled person concludes, based on experience, that the noise level is high. As a second example, the first quality rating (405) may be defined as a numerical score between 0 and 10 by the skilled person, based on experience, where a low score means a high level of noise and a high score means a low level of noise. Signal-to-noise analysis may further include a quantitative analysis, based on an amplitude of the noise detected by the skilled person. In a similar was as the qualitative signal-to-noise analysis, the first quality rating (405) may be defined as a binary indicator or a numerical score based on the experience of the skilled person at determining whether the noise amplitude is considered as low or high. In one or more embodiments, the skilled person compares the amplitude of the noise with a pre-defined noise-amplitude threshold and concludes whether the noise is high or low based on whether the amplitude of the noise is less than or greater than the noise-amplitude threshold. The signal-to-noise analysis may be performed in various domains known in the art, such as a shot domain or a common midpoint domain. In some embodiments, the signal-to-noise analysis is performed on a stack of the first calibration seismic dataset (403).

Examples of quality control procedures for determining the first quality rating (405) further include an observation of a frequency spectrum of at least part of the first calibration seismic dataset (403). The frequency spectrum may be compared with frequencies expected for the first calibration seismic dataset (403). The first calibration seismic dataset (403) may be assigned a first quality rating of "low-quality" or "high-quality" based on this comparison. The observation of the frequency spectrum may be performed in various domains known in the art, such as a shot domain or a common midpoint domain. In some embodiments, the observation of a frequency spectrum is performed on a stack of the first calibration seismic dataset (403). Examples of quality control for determining the first quality rating (405) further include an assessment of the acquisition equipment. For instance, in some embodiments, recording may fail due to a temporary electrical issue with a seismic receiver. If the recoding of a seismic trace fails, the first calibration seismic dataset (403) may be assigned a first quality rating of "low-quality", in accordance with one or more embodiments.

In some embodiments, the determination of the first quality rating (405) is based on artificial intelligence, such as the use of a deep neural network. In some embodiments, the skilled person makes use of one or more of visualization software, seismic processing software and a data labeling tool in order to determine and assign the first quality rating (405). It is emphasized that the example quality control procedures for determining the first quality rating (405) are given only as examples and should not be considered limiting. One with ordinary skill in the art will readily appreciate that other procedures may be used without departing from the scope of this disclosure.

In a similar fashion to the first calibration seismic dataset (403), a second calibration seismic dataset (411) may be obtained in many ways. In one or more embodiments, the second calibration seismic dataset (411) is acquired using a seismic acquisition system, such as the surface seismic acquisition system (100) in FIG. 1 or the VSP acquisition system (200) in FIG. 2. It follows that in some embodiments, the second calibration seismic dataset (411) is a surface seismic dataset while in other embodiments, the second calibration seismic dataset (411) is a VSP dataset. In one or more embodiments, the second calibration seismic dataset (411) is extracted from a database of existing seismic data, rather than acquired. In some embodiments, the second calibration seismic dataset (411) is stored on the seismic data storage medium and accessed using the seismic data storage reader. It is noted that the first calibration seismic dataset (403) and the second calibration seismic dataset (411) need not be of the same type. For instance, in some implementations, the first calibration seismic dataset (403) may be a VSP dataset and the second calibration seismic dataset (411) may be a surface seismic dataset. However, since the first calibration seismic dataset (403) and the second calibration seismic dataset (411) are intended to be compared, it may be advantageous for the first calibration seismic dataset (403) and the second calibration seismic dataset (411) to be of the same type. Advantageously, the first calibration seismic dataset (403) and the second calibration seismic dataset (411) may both be VSP datasets. Advantageously, the first calibration seismic dataset (403) and the second calibration seismic dataset (411) may both be surface seismic datasets.

In a similar fashion to the first calibration seismic dataset (403), the second calibration seismic dataset (411) further includes a second quality rating (413). The second quality rating (413) has the same format as the first quality rating (405) so that the first quality rating (405) and second quality rating (413) are comparable. If the first quality rating (405) is a first binary indicator, the second quality rating (413) is a second binary indicator configured to take the same two values as the first binary indicator. If the first quality rating (405) is a first numerical score, the second quality rating (413) is a second numerical score with the same domain as the first numerical score. The second quality rating (413) must have a different value from the first quality rating (405). As a first example, assume that the first quality rating (405) and the second quality rating (413) are both textual binary indicators with "low-quality" and "high-quality" as possible values. Then, if the first quality rating (405) is equal to "low-quality", the second quality rating (413) must be equal to "high-quality." Conversely, if the first quality rating (405) is equal to "high-quality", the second quality rating (413) must be equal to "low-quality." As a second example, assume that the first quality rating (405) and the second quality rating (413) are both numerical scores between 0 and 10. Then, the first quality rating (405) and the second quality rating (413) must be two different numbers between 0 and 10.

The coherency model (325), depicted in FIG. 3, is applied to the first calibration seismic dataset (403) and returns, as output, a first coherency distribution (409). Thus, in some embodiments, the values of the first coherency distribution (409) are normalized, or binned, or both. In the same way, a second coherency distribution (415) is determined for the second calibration seismic dataset (411) using the coherency model (325). Thus, in some embodiments, the values of the second coherency distribution (415) are normalized, or binned, or both. It is noted using normalized coherency values to determine the first coherency distribution (409) and the second coherency distribution (415) may offer an advantage of comparability. The first coherency distribution (409) and second coherency distribution (415) are usually not comparable unless the first calibration seismic dataset (403) and second calibration seismic dataset (411) have similar amplitude ranges. If determined from normalized coherency values, the first coherency distribution (409) and second coherency distribution (415) may be comparable regardless of the amplitude ranges of the first calibration seismic dataset (403) and second calibration seismic dataset (411).

A coherency threshold (419) is determined based on the first coherency distribution (409) and the second coherency distribution (417). The coherency threshold (419) is intended to separate the first calibration seismic dataset (403) and the second calibration seismic dataset (411) based on their respective coherency distributions. The coherency threshold (419) may be defined in many ways. In some implementations, the coherency threshold (419) is determined based on a visual selection. A first graph of the first coherency distribution (409) is plotted and observed on a first visual support, such as a screen or a piece of paper. A second graph of the second coherency distribution (417) is plotted and observed on a second visual support. Advantageously, the first visual support and the second visual support may be a same visual support, on which the first graph and the second graph are plotted and observed simultaneously.

The coherency threshold (419) may be defined in many ways by performing a visual inspection of the first graph and the second graph. In some implementations, the first graph is a density plot of the first coherency distribution (409) and the second graph is a density plot of the second coherency distribution (417). A first peak may be observed at a first maximizing location on the first graph and a second peak may be observed at a second maximizing location on the second graph. Then, the coherency threshold (419) may be selected as any value between the first maximizing location and the second maximizing location. In some implementations, the coherency threshold (419) is selected as a value that seems visually close to a midpoint between the first maximizing location and the second maximizing location, according to an experience of a skilled person performing the visual selection. The result of a visual selection is qualitative and may depend on the skilled person performing the visual selection.

In other implementations, the coherency threshold (419) is computed using a statistical method. For instance, the coherency threshold (419) may be computed as a midpoint between a first mode of the first coherency distribution (409) and a second mode the second coherency distribution (417), a midpoint between a first median of the first coherency distribution (409) and a second median the second coherency distribution (417) or a midpoint between a first mean of the first coherency distribution (409) and a second mean the second coherency distribution (417). Advantageously, the statistical method is quantitative as the first and second mode, first and second median and first and second mean can be computed exactly using a forward formula. The result of the statistical method is independent of the skilled person performing the statistical method. The statistical method may be automated and programmed on a computing system, such as a computer or a calculator.

In further implementations, the coherency threshold (419) is computed by solving an optimization problem that aims at maximally separating the first coherency distribution (409) and the second coherency distribution (417). In such implementations, the coherency threshold (419) is computed such that a modulus of a difference between a proportion of values of the first coherency distribution (409) that are less than the coherency threshold (419) and a proportion of values of the second coherency distribution (417) that are less than the coherency threshold (419) is maximum. In other words, denoting Th as a candidate coherency threshold, a proportion of values of the first coherency distribution (409) that are less than the candidate coherency threshold is denoted as $P_1(c<Th)$. Furthermore, a proportion of values of the second coherency distribution (417) that are less than the candidate coherency threshold is denoted as $P_2(c<Th)$. Then, the coherency threshold (419) may be computed as a number Th* such that $$\text{for all } Th, |P_1(c<Th^*)-P_2(c<Th^*)| \geq |P_1(c<Th)-P_2(c<Th)|. \qquad \text{EQ. 14}$$

Finding Th* satisfying EQ. 14 may be done by using, for example, a grid search based on the candidate coherency threshold Th.

Figure 5:
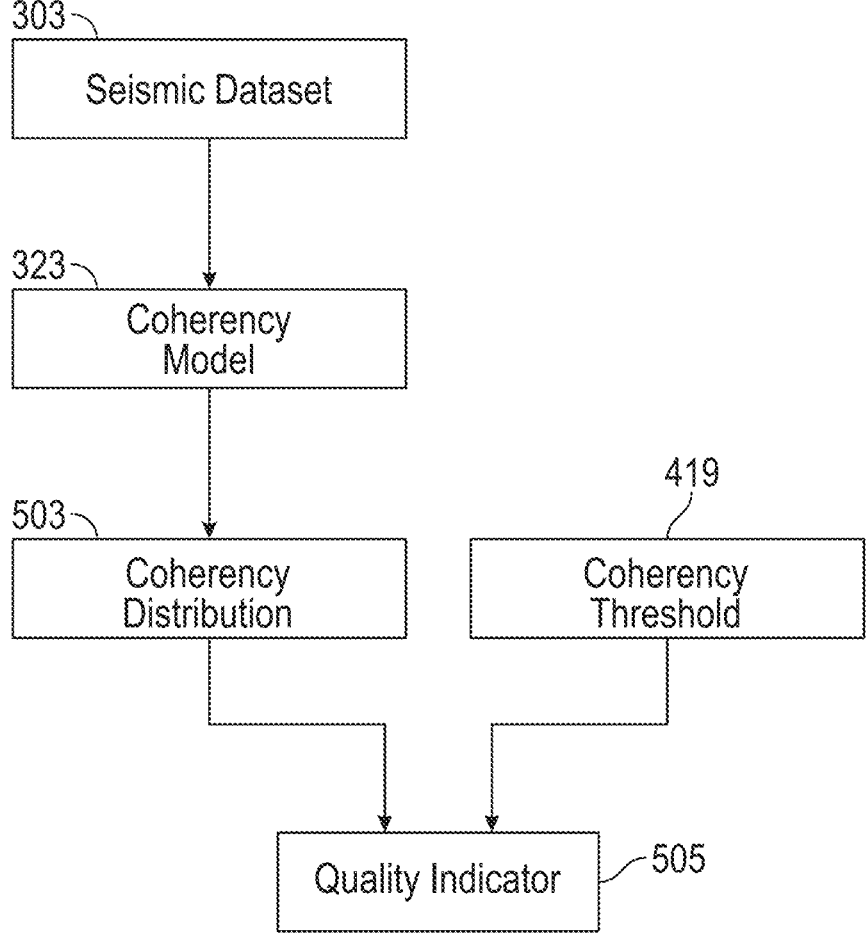
FIG. 5 depicts a box diagram for determining a quality indicator in accordance with one or more embodiments disclosed herein.

FIG. 5 depicts a scoring system for determining a quality indicator (505) for a seismic dataset. As performed by the system (300) in FIG. 3, the seismic dataset (303) is sent to the coherency model (325) that returns, as output, the coherency distribution (503). A quality indicator (505) is computed for the seismic dataset (303), based on the coherency distribution (503) and the coherency threshold (419). The coherency threshold (419) is obtained, for example, using the system in FIG. 4. In some implementations, for instance, if the coherency distribution (503) is composed of normalized coherency values, the coherency threshold (419) is a real number between 0 and 1. The quality indicator (505) is a real number indicative of a quality of the seismic dataset (303). In some embodiments, a coherency value that is less than the coherency threshold (419) is considered as low, while a coherency value greater than or equal to the coherency threshold (419) is considered as high.

In that regard, in some implementations, the quality indicator (505) is a proportion of coherency values, among the coherency distribution (503), that are less than the coherency threshold (419). In such implementations, a value of 0.5 or more for the quality indicator (505) may indicate that the majority of the coherency values among the coherency distribution (503) are low. In such implementations, a value of 0.5 or more for the quality indicator (505) may indicate that the quality of the seismic dataset (303) is low. In such implementations, a value of less than 0.5 for the quality indicator (505) may indicate that the majority of the coherency values among the coherency distribution (503) are high. In such implementations, a value of less than 0.5 for the quality indicator (505) may indicate that the quality of the seismic dataset (303) is high.

In some implementations, the quality indicator (505) is a proportion of coherency values, among the coherency distribution (503), that are less than or equal to the coherency threshold (419). In such implementations, a value of more than 0.5 for the quality indicator (505) may indicate that the majority of the coherency values of the coherency distribution (323) are low and hence the quality of the seismic dataset (303) is low. In such implementations, a value of 0.5 or less for the quality indicator (505) may indicate that the majority of the coherency values of the coherency distribution (323) are high and hence the quality of the seismic dataset (303) is high.

In some implementations, the quality indicator (505) is a proportion of coherency values, among the coherency distribution (503), that are more than the coherency threshold (419). In such implementations, a value of 0.5 or more for the quality indicator (505) may indicate that the majority of the coherency values of the coherency distribution (323) are high. In such implementations, a value of 0.5 or more for the quality indicator (505) may indicate that the quality of the seismic dataset (303) is high. In such implementations, a value of less than 0.5 for the quality indicator (505) may indicate that the majority of the coherency values of the coherency distribution (323) are low. In such implementations, a value of less than 0.5 for the quality indicator (505) may indicate that the quality of the seismic dataset (303) is low.

In some implementations, the quality indicator (505) is a proportion of coherency values, among the coherency distribution (503), that are greater than or equal to the coherency threshold (419). In such implementations, a value of more than 0.5 for the quality indicator (505) may indicate that the majority of the coherency values of the coherency distribution (323) are high. In such implementations, a value of more than 0.5 for the quality indicator (505) may indicate that the quality of the seismic dataset (303) is high. In such implementations, a value of 0.5 or less for the quality indicator (505) may indicate that the majority of the coherency values among the plurality of coherency values (321) are low. In such implementations, a value of 0.5 or less for the quality indicator (505) may indicate that the quality of the seismic dataset (303) is low.

Figure 6:
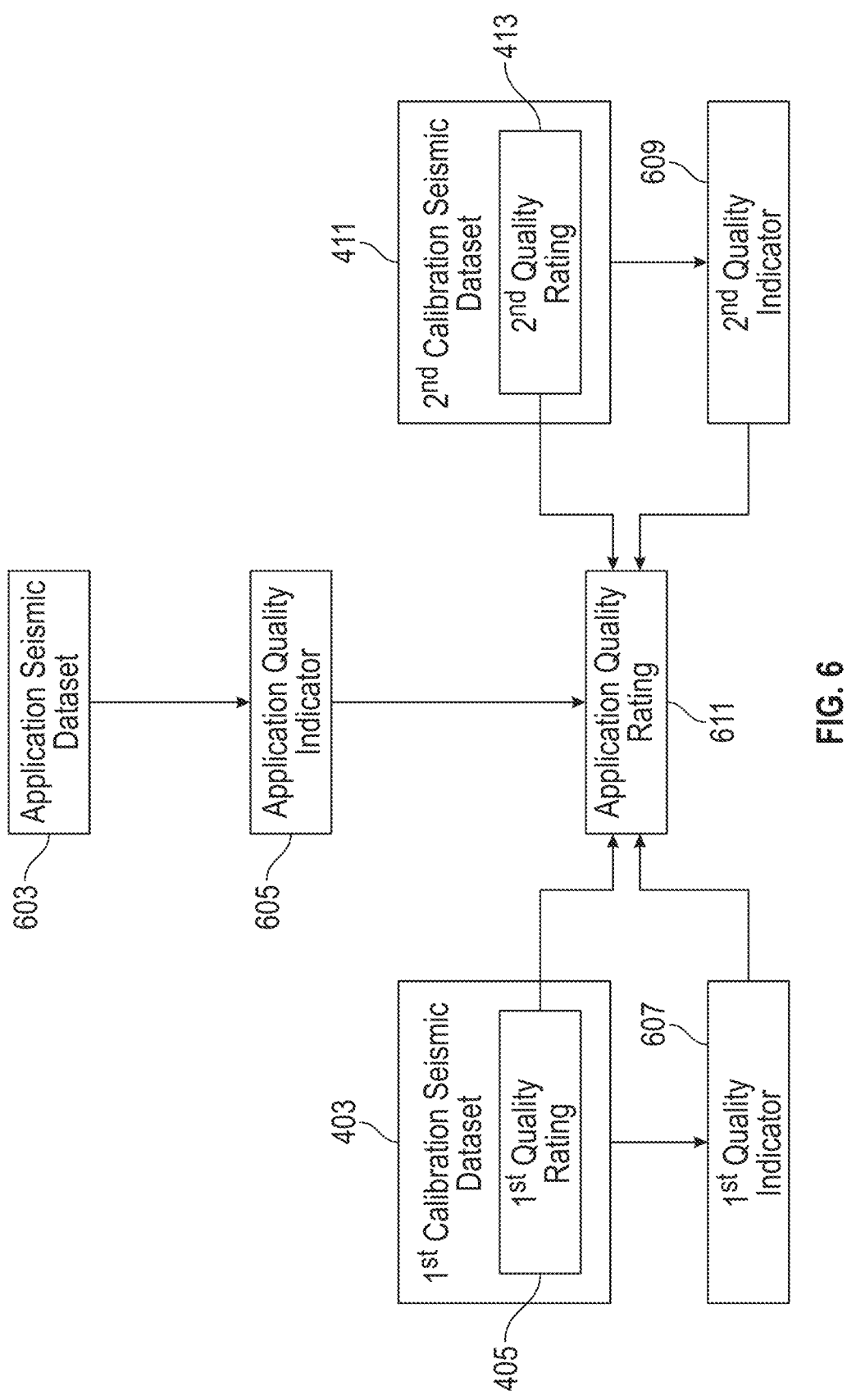
FIG. 6 depicts a box diagram for determining a quality rating in accordance with one or more embodiments disclosed herein.

FIG. 6 depicts a system for determining, based on the first quality rating (405) of the first calibration seismic dataset (403) and the second quality rating (413) of the second calibration seismic dataset (411), a quality rating for a seismic dataset to be assessed, called an application seismic dataset (603). The first calibration seismic dataset (403) and the second calibration seismic dataset (411) are used in the system in FIG. 4 to determine the coherency threshold (419). The application seismic dataset (603) includes, in a similar fashion to the seismic dataset (303) in FIG. 3, an application plurality of seismic traces. The application seismic dataset (603) may be obtained in many ways. In one or more embodiments, the application seismic dataset (603) is acquired using a seismic acquisition system, such as the surface seismic acquisition system (100) in FIG. 1 or the VSP acquisition system (200) in FIG. 2. It follows that in some embodiments, the application seismic dataset (603) is a surface seismic dataset while in other embodiments, the application seismic dataset (603) is a VSP dataset. In one or more embodiments, the application seismic dataset (603) is extracted from a database of existing seismic data, rather than acquired. In some embodiments, the application seismic dataset (603) is a single seismic gather in a format known in the art, such as a shot gather, a common midpoint gather or a common receiver gather. In other embodiments, the application seismic dataset (603) includes a plurality of seismic gathers. The application seismic dataset (603) need not be sorted and in further embodiments, the first plurality of seismic traces is not sorted as seismic gathers.

The application seismic dataset (603), the first calibration seismic dataset (403) and the second calibration seismic dataset (411) need not be of the same type. A few examples are described herein. In some embodiments, the application seismic dataset (603) is a VSP dataset, while each of the first calibration seismic dataset (403) and the second calibration seismic dataset (411) is a surface seismic dataset. Yet, in other embodiments, each of the application seismic dataset (603), the first calibration seismic dataset (403) and the second calibration seismic dataset (411) is a VSP dataset. In further embodiments, each of the application seismic dataset (603), the first calibration seismic dataset (403) and the second calibration seismic dataset (411) is a surface seismic dataset.

Furthermore, the application seismic dataset (603), the first calibration seismic dataset (403) and the second calibration seismic dataset (411) need not have the same structure. A few examples are described herein. In some embodiments, the application seismic dataset (603) is composed of a single shot gather, while each of the first calibration seismic dataset (403) and the second calibration seismic dataset (411) include a plurality of shot gathers. In other embodiments, each of the application seismic dataset (603), the first calibration seismic dataset (403) and the second calibration seismic dataset (411) include a single shot gather. In further embodiments, each of the application seismic dataset (603), the first calibration seismic dataset (403) and the second calibration seismic dataset (411) includes a plurality of shot gathers. As a specific example, the application seismic dataset (603) may be a VSP dataset composed of a single VSP shot gather, while each of the first calibration seismic dataset (403) and the second calibration seismic dataset (411) are VSP datasets that include a plurality of VSP shot gathers.

A first quality indicator (607) is obtained for the first calibration seismic dataset (403) using the scoring system from FIG. 5. A second quality indicator (609) is obtained for the first calibration seismic dataset (403) using the scoring system from FIG. 5. A quality rating, called an application quality rating (611), is determined for the application seismic dataset (603) using a quality assessment protocol. The quality assessment protocol includes computing a quality indicator, called an application quality indicator (605), for the application seismic dataset (603) using the scoring system from FIG. 5. The quality assessment protocol further includes determining the application quality rating (611) based on the application quality indicator (605), the first quality rating (405), the first quality indicator (607), the second quality rating (413) and the second quality indicator (609). The application quality rating (611) may be determined in many ways. In some implementations, a first distance, denoted as $d_1$, is computed between the application quality indicator (605), denoted as $I_a$, and the first quality indicator (607), denoted as $I_1$. A second distance, denoted as $d_2$, is computed between the application quality indicator (605) and the second quality indicator (609), denoted as $I_2$. The first distance and second distance may be computed as any mathematical distance. For instance, the first distance and second distance may be defined as $d_1 = |I_a - I_1|$ and a second distance computed as $d_2 = |I_a - I_2|$, respectively.

In implementations where the first quality rating (405) and second quality rating (413) are binary indicators, the application quality rating (611) may be assigned either the value of the first quality rating (405) or the value of the second quality rating (413) based on the first distance and second distance. For instance, in some implementations, the application quality rating (611) is assigned the value of the first quality rating (405) if $d_1 \leq d_2$, or the value of the second quality rating (413) if $d_1 > d_2$. As a specific example, if the first quality rating (405) and second quality rating (413) are textual binary indicators equal to "low-quality" or "high-quality", four mutually exclusive scenarios may occur: if the first quality rating (405) is equal to "high-quality" and the second quality rating (413) is equal to "low-quality", then a first or a second scenario may occur; in the first scenario, $d_1 \leq d_2$. Then, the application quality rating (611) is assigned the value "high-quality"; in the second scenario, $d_1 > d_2$. Then, the application quality rating (611) is assigned the value "low-quality." If the first quality rating (405) is equal to "low-quality" and the second quality rating (413) is equal to "high-quality", then a third or a fourth scenario may occur; in the third scenario, $d_1 \leq d_2$. Then, the application quality rating (611) is assigned the value "low-quality"; in the fourth scenario, $d_1 > d_2$. Then, the application quality rating (611) is assigned the value "high-quality".

In other implementations, the application quality rating (611) is assigned the value of the first quality rating (405) if $d_1 < d_2$, or the value of the second quality rating (413) if $d_1 \geq d_2$. As a specific example, if the first quality rating (405) and second quality rating (413) are textual binary indicators equal to "low-quality" or "high-quality", four mutually exclusive scenarios may occur: if the first quality rating (405) is equal to "high-quality" and the second quality rating (413) is equal to "low-quality", then a first or a second scenario may occur; in the first scenario, $d_1 < d_2$. Then, the application quality rating (611) is assigned the value "high-quality"; in the second scenario, $d_1 \geq d_2$. Then, the application quality rating (611) is assigned the value "low-quality." If the first quality rating (405) is equal to "low-quality" and the second quality rating (413) is equal to "high-quality", then a third or a fourth scenario may occur; in the third scenario, $d_1 < d_2$. Then, the application quality rating (611) is assigned the value "low-quality"; in the fourth scenario, $d_1 \geq d_2$. Then, the application quality rating (611) is assigned the value "high-quality".

In implementations where the first quality rating (405) and second quality rating (413) are numerical scores, the application quality rating (611) may be computed as an average of the value of the first quality rating (405) and the value of the second quality rating (413) based on the first distance and second distance. More precisely, the application quality rating (611) may be computed as a weighted average, where the weights give an advantage to the first quality rating (405) if $d_1 < d_2$ or an advantage to second quality rating (413) if $d_1 > d_2$. For instance, in some implementations, denoting $R_1$ as the first quality rating (405) and $R_2$ as the second quality rating (413), the application quality rating (611), denoted as $R_a$, may be defined as $$R_a = \frac{d_2}{d_1 + d_2} R_1 + \frac{d_1}{d_1 + d_2} R_2. \qquad \text{EQ. 15}$$

In other implementations, the application quality rating (611) may be defined as a harmonic mean:

$$R_a = \frac{1/d_1}{1/d_1 + 1/d_2} R_1 + \frac{1/d_2}{1/d_1 + 1/d_2} R_2. \qquad \text{EQ. 16}$$

It is emphasized that the example methods for computing the application quality rating (611) discussed herein are given only as examples and should not be considered limiting. One with ordinary skill in the art will recognize that other methods for computing the application quality rating (611) may be used without departing from the scope of this disclosure.

Figure 7:
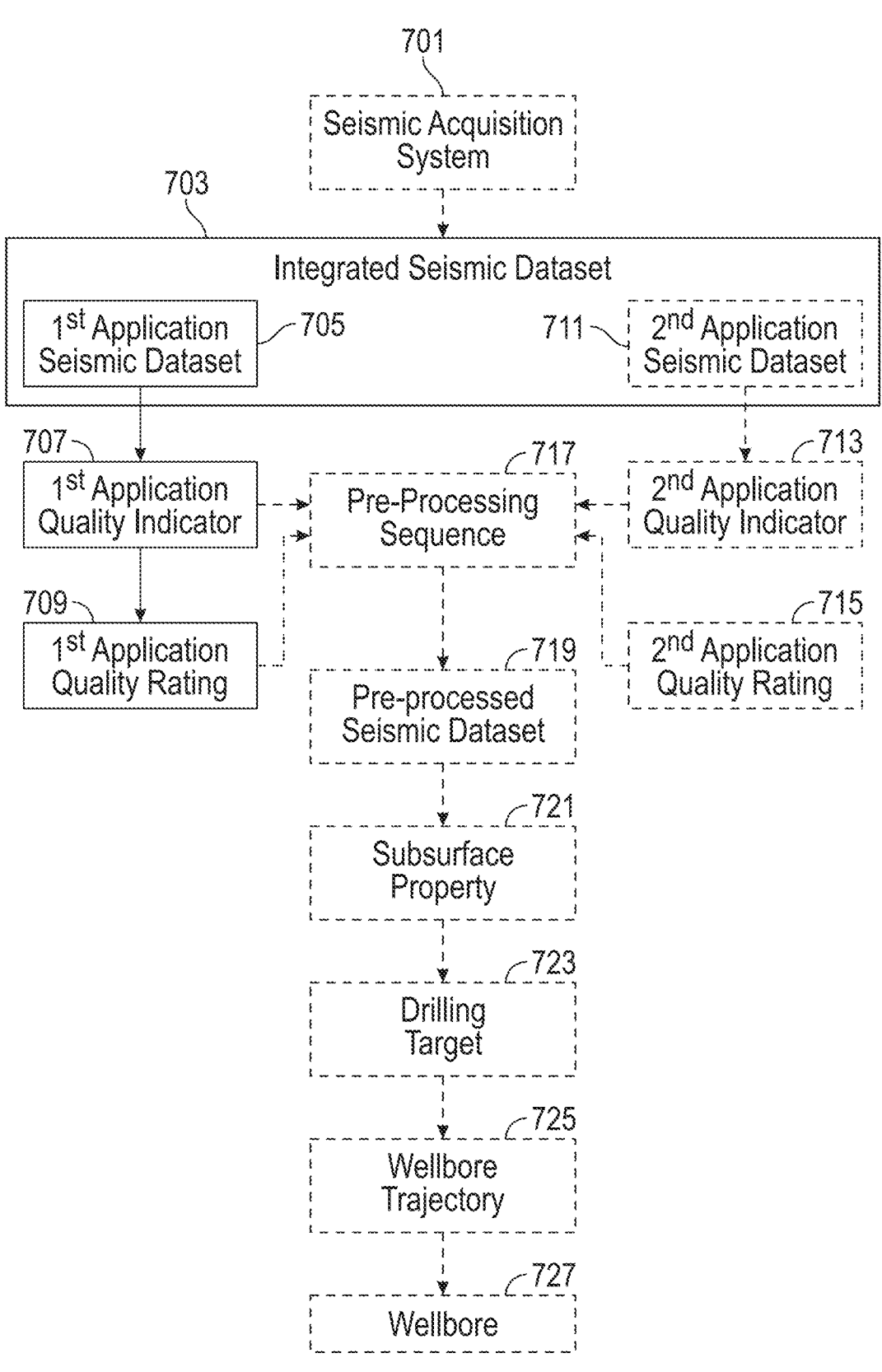
FIG. 7 depicts a system for identifying and drilling through a drilling target in accordance with one or more embodiments disclosed herein.

FIG. 7 depicts a system for identifying and drilling through a drilling target based on the system from FIG. 6. A seismic dataset, called an integrated seismic dataset (703) pertains to a region of interest. The region of interest includes a subsurface of interest. The integrated seismic dataset (703) may be obtained in many ways in a similar fashion to the application seismic dataset (603) from FIG. 6. In one or more embodiments, the integrated seismic dataset (703) is acquired using a seismic acquisition system (701), such as the surface seismic acquisition system (100) in FIG. 1 or the VSP acquisition system (200) in FIG. 2. In such embodiments, the acquisition region is the region of interest. It follows that in some embodiments, the integrated seismic dataset (703) is a surface seismic dataset while in other embodiments, the integrated seismic dataset (703) is a VSP dataset. In one or more embodiments, the integrated seismic dataset (703) is extracted from a database of existing seismic data, rather than acquired. In some embodiments, the integrated seismic dataset (703) is stored on the seismic data storage medium and accessed using the seismic data storage reader. In some embodiments, the integrated seismic dataset (703) is a single seismic gather in a format known in the art, such as a shot gather, a common midpoint gather or a common receiver gather. In other embodiments, the integrated seismic dataset (703) includes a plurality of seismic gathers.

The integrated seismic dataset (703) includes a first application seismic dataset (705). In some implementations, the first application seismic dataset (705) is the integrated seismic dataset (703). In some implementations, the integrated seismic dataset (703) includes a plurality of shot gathers and the first application seismic dataset (705) is a first shot gather of the integrated seismic dataset (703). The first application seismic dataset (705) includes a first plurality of application seismic traces. A quality assessment procedure is conducted for the integrated seismic dataset (703). The quality assessment procedure includes performing the quality assessment protocol for the first application seismic dataset (705). As such, the quality assessment procedure includes computing a quality indicator, called a first application quality indicator (707), for the first application seismic dataset (705) using the scoring system in FIG. 5. The quality assessment procedure further includes computing a quality rating, called a first application quality rating (709), for the first application seismic dataset (705) using the system in FIG. 6, based on the first application quality indicator (707), the first quality rating (405), the first quality indicator (607), the second quality rating (413) and the second quality indicator (609). A quality assessment is formed for the integrated seismic dataset (703), resulting from the quality assessment procedure. The quality assessment includes the first application quality rating (709). As stated, in some embodiments, the first application seismic dataset (705) is the integrated seismic dataset (703). In other implementations, the integrated seismic dataset (703) further includes a second application seismic dataset (711). In such implementations, the quality assessment procedure further includes computing a second application quality indicator (713) for the second application seismic dataset (711) using the scoring system in FIG. 5. The quality assessment procedure further includes determining a second application quality rating (715) for the second application seismic dataset (711) using the system from FIG. 6. In some implementations, the first application seismic dataset (705) is a first shot gather of the integrated seismic dataset (703) and the second application seismic dataset (711) is a second shot gather of the integrated seismic dataset (703). The quality assessment further includes the second application quality rating (715).

In fact, the quality assessment protocol may be repeated multiple times. In one or more embodiments, the integrated seismic dataset (703) includes $n_D \geq 2$ application seismic datasets, which, in some cases, are $n_D$ distinct shot gathers, and possibly $n_D$ distinct VSP shot gathers. In such embodiments, the quality assessment procedure includes performing the quality assessment protocol for each of the $n_D$ application seismic datasets. For each $n \leq n_D$, an $n^{th}$ application quality indicator is computed for the $n^{th}$ application seismic dataset using the scoring system in FIG. 5, resulting in $n_D$ application quality indicators. For each $n \leq n_D$, an $n^{th}$ application quality rating is computed for the $n^{th}$ application seismic dataset using the system in FIG. 6, based on the $n^{th}$ application quality indicator, the first quality rating (405), the first quality indicator (607), the second quality rating (413) and the second quality indicator (609), resulting in $n_D$ application quality ratings. Generally, the quality assessment includes the $n_D$ application quality ratings. In one or more embodiments, the quality assessment is output to the seismic data storage medium using a seismic data storage writer. The seismic data storage writer may be of many types, depending on the format of the seismic data storage medium. In some implementations, the seismic data storage writer includes a tape writer, a disk writer, a flash memory writer, or any combination thereof.

The quality assessment protocol for the $n_D$ application seismic datasets may be performed sequentially, one of the $n_D$ application seismic datasets at a time. The quality assessment protocol for the $n_D$ application seismic datasets may also be performed in parallel while multiple processors perform, simultaneously, the quality assessment protocol for more than two of the $n_D$ application seismic datasets. In some embodiments, the $n_D$ application seismic datasets are acquired sequentially during a seismic acquisition of the integrated seismic dataset (703). In such scenarios, the quality assessment protocol for any $n^{th}$ application seismic dataset may be performed as soon as the $n^{th}$ application seismic dataset has been acquired and made available, for $n \le n_D$. There may be no need to wait until the whole integrated seismic dataset (703) has been acquired. In such scenarios, the quality assessment procedure is said to be conducted in real-time. Also, in some embodiments, the computing power required by the quality assessment procedure is attainable on computing machines readily available near an acquisition site of the integrated seismic dataset (703). Thus, in some embodiments, the quality assessment procedure is conducted in real-time on a computing machine located near the acquisition site of the seismic acquisition of the integrated seismic dataset (703).

In some implementations, the integrated seismic dataset (703) undergoes pre-processing (717) based on the $n_D$ application quality ratings. The integrated seismic dataset (703) is transformed, through pre-processing (717), into the pre-processed seismic dataset (719). In one or more embodiments, the pre-processed seismic dataset (719) is output to the seismic data storage medium using the seismic data storage writer. Pre-processing (717) can be done in many ways. In some implementations, each of the $n_D$ application quality ratings is a binary indicator equal to "high-quality" or "low-quality". In such implementations, pre-processing may include, for each low-quality application dataset, applying one or more pre-processing steps to the $n^{th}$ application seismic dataset. In other implementations, each of the $n_D$ application quality ratings is a numerical score. In such implementations, pre-processing (717) may include, for application dataset with a low quality rating less than a certain pre-defined quality threshold, applying one or more pre-processing steps.

The one or more pre-processing steps, applied to an $n^{th}$ application seismic dataset, may be defined in many ways. In some implementations, the one or more pre-processing steps include discarding the $n^{th}$ application seismic dataset. Examples of the one or more pre-processing steps further include, but are not limited to, noise attenuation procedures, multiple reflection attenuation, ghost wavefield elimination, re-datuming, shot and seismic receiver depth correction, frequency filtering, and spectral shaping. Some of the one or more pre-processing steps may be done in different domains, such as the shot domain, seismic receiver domain, or CMP domain. Some of the pre-processing steps may be done multiple times and repeated in different domains, such as the shot domain, receiver domain, or CMP domain. Generally, pre-processing (717) is done according to pre-processing parameters. In one or more embodiments, the pre-processing parameters are obtained by doing a grid search. A grid search consists of scanning a plurality of values for one or more pre-processing parameters and selecting the values for one or more pre-processing parameters that produce the most desirable result according to some quality control criteria.

A non-exhaustive list of quality criteria is provided herein. An example of a first quality control criterion for a noise attenuation procedure is that the seismic noise be attenuated as much as possible without attenuating the signal coming from the reflected or refracted waves. In some scenarios, satisfying the first quality criterion is achieved by selecting a minimum noise attenuation threshold, selecting a maximum signal attenuation threshold, and selecting pre-processing parameters satisfying two denoising conditions. The first denoising condition is that the attenuated noise is above the minimum noise attenuation threshold. The second denoising condition is that the signal coming from the reflected and refracted waves is attenuated less than the maximum signal attenuation threshold. A second example of a quality control criterion for a spectral shaping procedure is that the seismic traces of the pre-processed seismic dataset (719) have an amplitude frequency spectrum as flat as possible without increasing the amplitude of noise too much. In some scenarios, satisfying the second quality control criterion is achieved by selecting a maximum frequency deviation threshold, selecting a maximum noise boosting threshold, and selecting pre-processing parameters verifying two shaping conditions. A first shaping condition is that the frequencies of the seismic traces of the pre-processed seismic dataset (719) do not vary by more than the maximum frequency deviation threshold. A second shaping condition is that the difference of the amplitude of the noise after spectral shaping and the amplitude of the noise before spectral shaping is less than the noise boosting threshold.

In one or more embodiments, the one or more pre-processing steps make use of artificial intelligence (AI). Examples of AI models that may be used to perform a pre-processing step include classification algorithms, such as a decision tree, a support vector machine (SVM), or a neural network that flags seismic traces that need to undergo a certain pre-processing step. Examples of AI models that may be used to perform a pre-processing step further include regression models, or neural networks that receive one or more input seismic traces as inputs and return, as output, an updated version of one or more input seismic traces after noise attenuation. It is emphasized that the examples of pre-processing steps and quality controls discussed herein are given only as examples and should not be considered limiting. One with ordinary skill in the art will recognize that other examples of the one or more pre-processing steps and quality control criteria may be used without departing from the scope of this disclosure.

A subsurface property (721) is obtained for the subsurface of interest, based on the pre-processed seismic dataset (719). The subsurface property (721) may be of various types and include one or more elements. In some implementations, the subsurface property (721) includes a seismic image of the subsurface of interest. The seismic image may be two-dimensional or three-dimensional. In some implementation, the last dimension of the seismic image represents a depth. In other implementations, the last dimension of the seismic image represents time. In some implementations, the seismic image is computed using an imaging algorithm that receives the pre-processed seismic dataset (719) and a velocity model as inputs. In some implementations, the imaging algorithm is a migration algorithm. One with ordinary skill in the art will recognize that a full discussion of every type of migration applicable to computing the seismic image is not possible nor required to describe the systems and methods in this disclosure. For illustration purposes, a brief discussion and summary of a Kirchhoff migration, a reverse-time migration (RTM) and a beam migration, are provided herein.

A Kirchhoff migration algorithm is designed to find all the possible reflecting locations, within the subsurface of interest, where reflected seismic waves recorded in a seismic trace might have reflected. The possible reflecting locations are based on the times at which the reflected seismic waves are recorded on the seismic trace. The possible reflecting locations where reflected seismic waves might have reflected may indicate positions of seismic reflectors in the subsurface of interest. A beam migration algorithm is designed to find all the possible reflecting locations, within the subsurface of interest, from where the reflected seismic waves recorded in a set of a predefined number of seismic traces from adjacent seismic receivers might have reflected. The possible reflecting locations are based on the times at which the reflected seismic waves are recorded on each seismic trace within the set of seismic traces from adjacent seismic receivers. The possible reflecting locations where reflected seismic waves might have reflected may indicate locations of seismic reflectors in the subsurface of interest. By including a set of seismic traces from adjacent seismic receivers as input, beam migration receives information of a delay with which the reflected seismic waves arrive at each adjacent seismic receiver. The delay may indicate an inclination of the seismic reflectors in the subsurface of interest. A RTM algorithm includes simulating the propagation of a downgoing wavefield through the subsurface of interest from the seismic source locations using a wave equation, and simulating the backpropagation in time, of an upgoing wavefield recorded at seismic receiver locations, through the subsurface of interest using a wave equation. Then, an imaging condition may indicate locations of seismic reflectors within the subsurface of interest by matching locations where the downgoing wavefield meets the upgoing wavefield. It is emphasized that the example migrations described herein are given only as examples and should be considered non-limiting. Other types of migration or imaging algorithms may be used to determine the seismic image without departing from the scope of this disclosure.

In some embodiments, the subsurface property (721) includes an extracted wavelet from the pre-processed seismic dataset (719). The extracted wavelet may be used analyzing rock properties of the acquisition subsurface. The extracted wavelet may further be used as a source in a wave equation propagator, such as a forward modeling algorithm. The forward modeling algorithm, with the extracted wavelet, may be used, for example, to generate the seismic image using RTM or generate a velocity model using full-waveform inversion known in the art. The subsurface property (721) may further include the rock properties, the velocity model, an acoustic impedance or any subset thereof, obtained from the extracted wavelet.

The subsurface property (721) may further include information that assists in the understanding, processing, and interpretation of the pre-processed seismic dataset (719). For instance, in some embodiments, the subsurface property (721) may include an identification of a multiple reflection or a discrimination between a pressure wave and a shear wave. In some embodiments, the subsurface property (721) may be used in combination with an auxiliary dataset pertaining to the region of interest. For instance, the extracted wavelet, from the pre-processed seismic dataset (719), may be used to migrate the auxiliary seismic dataset, or generate a velocity model using seismic data from the auxiliary dataset. In such cases, the subsurface property (721) may include an auxiliary seismic image obtained by migrating the auxiliary dataset or the velocity model generated using seismic data from the auxiliary dataset. Furthermore, in some scenarios, the pre-processed seismic dataset (719) is a VSP dataset and the auxiliary seismic dataset is a surface seismic dataset. Analyzing the travel time of geophysical features seen on both the pre-processed seismic dataset (719) and the auxiliary seismic dataset may help separate primary reflections from multiple reflections and separate pressure waves from shear waves. It is emphasized that the example subsurface properties described above are given only as examples and should not be considered limiting. One with ordinary skill in the art will readily appreciate that other examples of subsurface properties may be used as the subsurface property (721) without departing from the scope of this disclosure.

In one or more embodiments, a drilling target (723) is identified based on the subsurface property (721). The drilling target (723) may be of many types. Examples of a drilling target include a potential reservoir of a natural resource, an injection site for a material into the subsurface of interest and an extraction site of a material from the subsurface of interest. Examples of potential reservoirs of a natural resource include a potential hydrocarbon reservoir. Examples of injection sites for a material into the subsurface of interest include a water injection site, where water is to be injected in order to alter a pressure of the subsurface of interest. Examples of extraction sites of a material from the subsurface of interest include a region in the subsurface of interest where rock is to be extracted in order to be analyzed. The drilling target (723) may be identified using, at least, an interpretation workstation that allows geoscientists to analyze the subsurface property (721). In some embodiments, the geoscientists form, or are part of, an exploration team. Examples of geoscientists include, but are not limited to, geologists, geophysicists and interpreters.

In order to identify the drilling target (723), the geoscientists may perform various interpretation tasks. In some implementations, the subsurface property (721) includes a seismic image and the interpretation tasks include interpreting key geological horizons within the seismic image, that delimit stratigraphic layers, boundaries, and structural features of the acquisition subsurface. Examples of interpretation tasks further include computing seismic attributes of the seismic image, such as a frequency, a gradient, an envelope, and a coherency. Results of the interpretation tasks may allow the geoscientists to locate the drilling target (723). In some embodiments, the geoscientists produce one or more of a map of the drilling target (723), properties of the drilling target (723) and properties of the region of interest. Examples of properties of the drilling target (723) include, but are not limited to, a distribution of a material in a vicinity of the drilling target (723), a rock property for a rock composing the drilling target (723), a volume of the material in the vicinity of the drilling target (723), a performance of the drilling target (723), and a risk assessment associated with perforating the drilling target (723). Properties of the region of interest include rock properties, such as a porosity, resistivity and permeability. Properties of the region of interest further include a stratigraphy of the acquisition subsurface.

In one or more embodiments, a decision is made to drill a wellbore (727) perforating the drilling target (723). For this purpose, a wellbore trajectory (725) is planned, guided by the drilling target (723). The wellbore trajectory (725) extends from the surface of the Earth to the drilling target (723). In some embodiments, the wellbore trajectory (725) is constrained by surface limitations, such as a hazardous terrain, availability and configuration of drilling equipment, and layout of natural or man-made islands. Additionally, the locations of potential or preexisting drilling sites may be considered. In one or more embodiments, the decision drill a wellbore (727) is taken by stakeholders in an industry or a governmental entity. Examples of stakeholders include, but are not limited to, geoscientists, geologists, a natural resource company management and a government partici- pant. In some implementations, the wellbore trajectory (725) is based on properties of the drilling target, properties of the region of interest, or both. After the wellbore trajectory (725) is planned, the wellbore (727) is drilled, perforating the drilling target (723).

Figure 8:
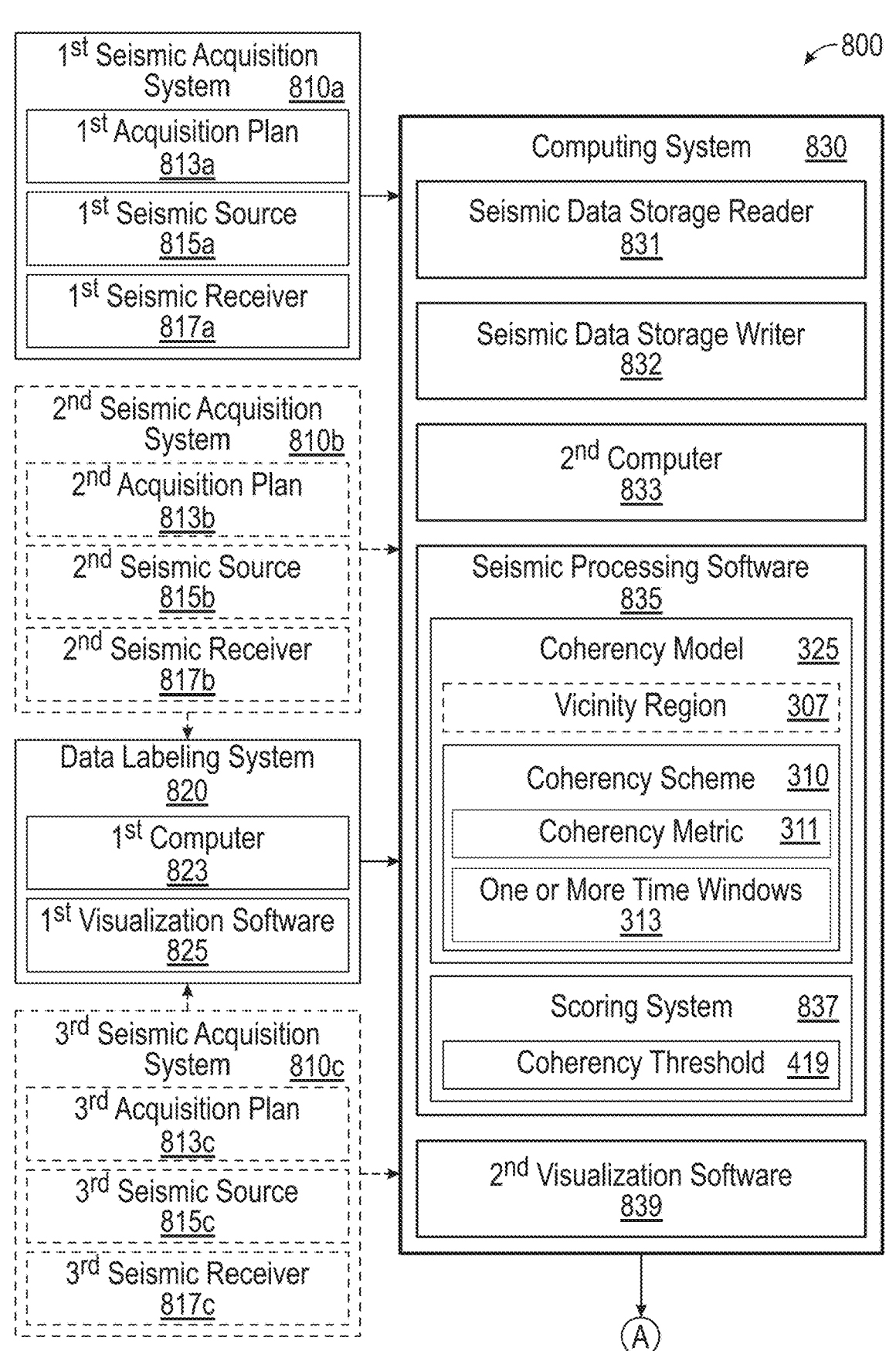
FIG. 8 depicts a system for acquiring seismic data, identifying and drilling through a drilling target in accordance with one or more embodiments disclosed herein.
Figure 8:
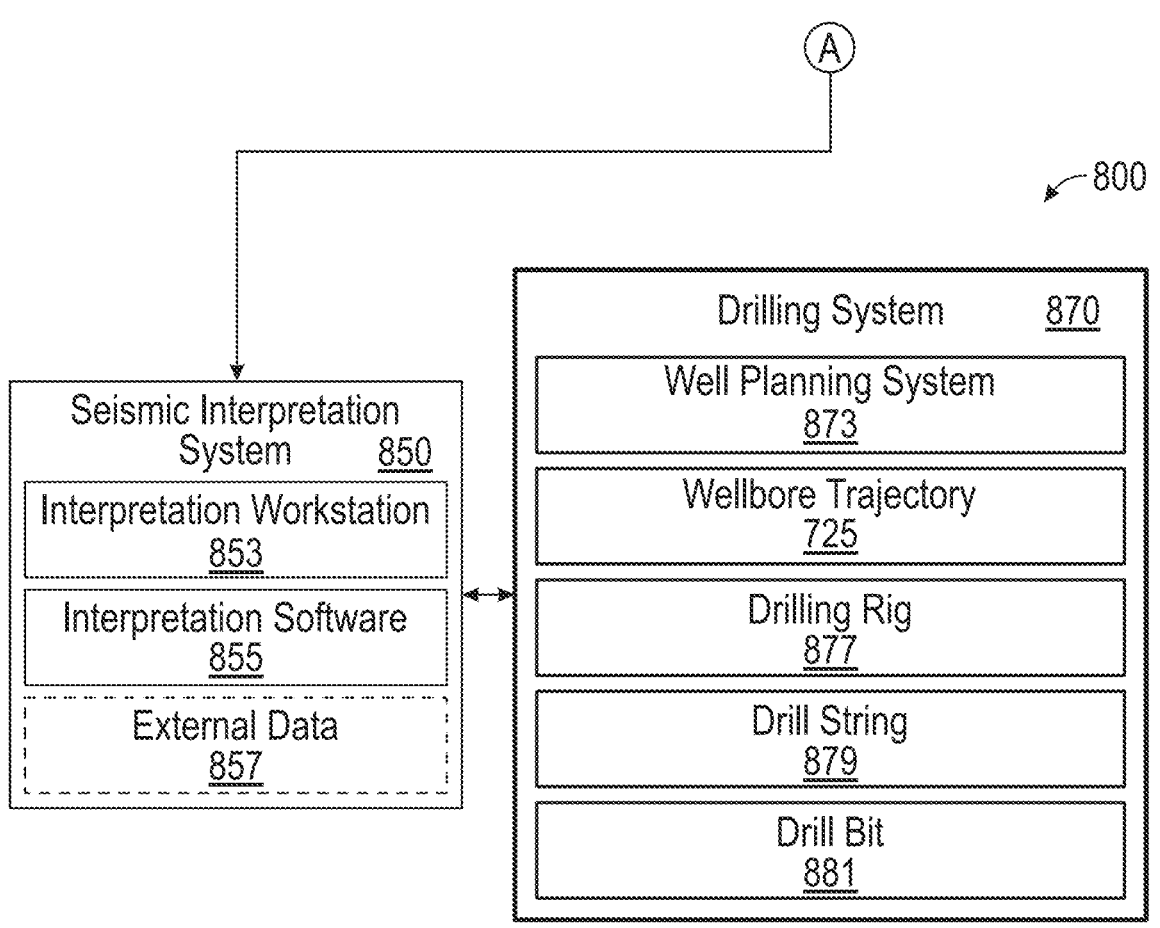

FIG. 8 depicts a system (800) for identifying and drilling through a drilling target, in accordance with one or more embodiments. For brevity, a full description of components and/or elements depicted in FIG. 8 is not provided anew for those components and/or elements that have been previously described with reference to the preceding figures. The sys- tem (800) includes a first seismic acquisition system (810a), a data labeling system (820), a computing system (830), a seismic interpretation system (850) and a drilling system (870). The first seismic acquisition system (810a) is con- figured in a similar fashion to the surface seismic acquisition system (100) or the VSP acquisition system (200). The first seismic acquisition system (810a) is designed to perform a first seismic acquisition. The first seismic acquisition is designed to acquire the integrated seismic dataset (703) depicted in FIG. 7, pertaining to a region of interest. The region of interest is the acquisition region for the first seismic acquisition system (810a), that includes an acqui- sition surface and an acquisition subsurface. The region of interest includes a surface of interest, which is the acquisi- tion surface. The region of interest further includes a sub- surface of interest, which is the acquisition subsurface. In FIG. 8, the integrated seismic dataset (703) includes a plurality of shot gathers. The integrated seismic dataset (703) includes $n_D \geq 2$ application seismic datasets, each of the $n_D \geq 2$ application seismic datasets being a distinct shot gathers of the integrated seismic dataset (703).

The first seismic acquisition system (810a) includes first seismic sources (815a), configured in a similar fashion to the seismic sources (106) in FIGS. 1 and 2. The first seismic acquisition system (810a) further includes first seismic receivers (817a), configured in a similar fashion to the seismic receivers (120) in FIGS. 1 and 2. The first seismic acquisition system (810a) is deployed according to an acquisition plan (813a) that defines the first seismic acqui- sition. The acquisition plan (813a) may include various components. Examples of components of the acquisition plan (813a) include positions of first seismic sources (815a) and positions of first seismic receivers (817a). The first seismic sources (815a) and the first seismic receivers (817a) are positioned in a way that the region of interest is illumi- nated by seismic waves emitted by the first seismic sources (815a) and that seismic data recorded by the first seismic receivers (817a) may be used to image the subsurface of interest. Examples of components of the acquisition plan (813a) may further include a list of equipment to be used to perform the first seismic acquisition, a timeline for the first seismic acquisition, a description of the region of interest, a topographic map of the surface and a description of a personnel needed to perform the first seismic acquisition.

In some implementations, the system (800) further includes a second seismic acquisition system (810b), con- figured to acquire the first calibration seismic dataset (403) from FIG. 4. However, in other implementations, the first calibration seismic dataset (403) is obtained from a database, rather than the second seismic acquisition system (810b). Similarly to the first seismic acquisition system (810a), the second seismic acquisition system (810b) may be a surface seismic acquisition system, such as the one depicted in FIG. 1, or a VSP acquisition system, such as the one depicted in FIG. 2. Similarly to the first seismic acquisition system (810a), the second seismic acquisition system (810b) includes a second seismic acquisition plan (813b), second seismic sources (815b) and second seismic receivers (817b).

In some implementations, the system (800) further includes a third seismic acquisition system (810c), config- ured to acquire the second calibration seismic dataset (411) from FIG. 4. However, in other implementations, the second calibration seismic dataset (411) is obtained from a database, rather than the third seismic acquisition system (810c). Similarly to the first seismic acquisition system (810a), the third seismic acquisition system (810c) may be a surface seismic acquisition system, such as the one depicted in FIG. 1, or a VSP acquisition system, such as the one depicted in FIG. 2. Similarly to the first seismic acquisition system (810a), the third seismic acquisition system (810c) includes a third seismic acquisition plan (813c), third seismic sources (815c) and third seismic receivers (817c). As previously stated, in some implementations, each of the integrated seismic dataset (703), first calibration seismic dataset (403) and second calibration seismic dataset (411) is a VSP dataset. Furthermore, in one or more embodiments, two or more of the first seismic acquisition system (810a), second seismic acquisition system (810b) and third seismic acqui- sition system (810c) are a same seismic acquisition system.

The data labeling system (820) is used to assign the first quality rating (405) to the first calibration seismic dataset (403) and the second quality rating (413) to the second calibration seismic dataset (411). As stated, the first quality rating (405) and the second quality rating (413) may be determined, for example, by a skilled person, such as a data scientist or geophysicist, by performing a quality control procedure, such as a signal-to-noise analysis or spectral analysis. The data labeling system includes a first visualiza- tion software (825) to allow the skilled person to visualize the first calibration seismic dataset (403) and the second calibration seismic dataset (411) in order to perform a visual quality control procedure. The data labeling system (820) further includes a first computer (823) configured to run the first visualization software (825). In some scenarios, the computer is further configured to perform steps of the quality control procedure for determining the first quality rating (405) and the second quality rating (413). Examples of steps of the quality control procedure include, a quanti- tative signal-to-noise analysis, computing an amplitude spectrum and sorting seismic traces. In some implementa- tions, the first computer (823) includes a data labeling tool that is used to determine and assign the first quality rating (405) and the second quality rating (413).

In the system (800), the integrated seismic dataset (703), first calibration seismic dataset (403) and second calibration seismic dataset (411) are stored on a seismic data storage medium. The computing system (830) includes a seismic data storage reader (831) configured to read the integrated seismic dataset (703), first calibration seismic dataset (403) and second calibration seismic dataset (411) from the data storage medium. The seismic data storage reader (831) may be of many types, depending on the format of the seismic data storage medium. In some implementations, the seismic data storage reader (831) includes a tape reader, a disk reader, a flash memory reader, or any combination thereof.

The computing system (830) further includes seismic processing software (835). The seismic processing software (835) is configured to perform seismic processing tasks. The seismic processing software (835) is configured to compute the coherency threshold (419) using the first calibration seismic dataset (403) and second calibration seismic dataset (411), in accordance with the system in FIG. 4. The computing system (830) further includes a second visualization software (839) configured to visualize a graph of the first coherency distribution (409) and a graph of the second coherency distribution (417). The second visualization software (839) may include various functions allowing for observing general-purpose one-dimensional or multi-dimensional datasets, such as seismic traces, velocity fields, or any attributes extracted from seismic traces or velocity fields. In one or more embodiments, visualization software includes quality control tools, such as algorithms to compute a frequency spectrum, compute a frequency-wavenumber spectrum, sort seismic traces into various domains, compare two different datasets, or compute statistics on seismic data or a velocity model. In one or more embodiments, visualization software further includes processing tools, such as frequency filters, and algorithms to scale amplitudes of seismic traces, smooth depth velocity models, or interpolate velocity fields. In some implementations, the first visualization software (825) and second visualization software (839) are a same visualization software. In some implementations, the computing system (830) further includes the data labeling system (820).

The seismic processing software (835) includes the coherency model (325) from FIG. 3 and a scoring system (837) based on the coherency threshold (419), such as the scoring system depicted in FIG. 5. The coherency model (325) includes the coherency scheme (310), including the coherency metric (311) and the one or more time windows (313). In some implementations, the coherency model (325) further includes the vicinity region (307) that may be used to form the one or more vicinity gathers (305). The seismic processing software (835) is further configured to receive the integrated seismic dataset (703) from the first seismic acquisition system (810*a*). The seismic processing software (835) is further configured to conduct the quality assessment procedure. As such, the seismic processing software (835) is configured to compute, for each $n \leq n_D$, a $n^{th}$ application quality indicator for the $n^{th}$ application seismic dataset using the scoring system (837). The seismic processing software (835) is further configured to determine, for each $n \leq n_D$, an $n^{th}$ application quality rating for the $n^{th}$ application seismic dataset, resulting in $n_D$ application quality ratings. The $n_D$ application quality ratings are output to the seismic data storage medium using a seismic data storage writer (832). The seismic data storage writer (832) may be of many types, depending on the format of the seismic data storage medium. In some implementations, the seismic data storage writer (832) includes a tape writer, a disk writer, a flash memory writer, or any combination thereof.

The seismic processing software (835) is further configured to determine the pre-processed seismic dataset (719) by conducting the pre-processing (717) of the integrated seismic dataset (703) based on the $n_D$ application quality ratings.

As previously stated, pre-processing (717) can be done in many ways and may include, in some implementations, applying one or more pre-processing steps to some of the application seismic datasets based on their application quality ratings. As previously stated, the one or more pre-processing steps may include, for a given application seismic dataset, discarding the given application seismic dataset. Example of the one or more pre-processing steps may further include noise attenuation procedures, multiple reflection attenuation, ghost wavefield elimination, re-datuming, shot and seismic receiver depth correction, frequency filtering, and spectral shaping. The seismic processing software (835) may further include sorting algorithms for sorting seismic traces into different domains. In some implementations, the pre-processed seismic dataset (719) is output to the seismic data storage medium using the seismic data storage writer (832).

The seismic processing software (835) is used for determining the subsurface property (721). As stated, the subsurface property (721) may include, for example, one or more of a seismic image of the subsurface of interest, a velocity model, an extracted wavelet, rock properties, an acoustic impedance and a seismic anisotropy. The subsurface property (721) may further include an identification of a multiple reflection or a discrimination between a pressure wave and a shear wave. In some implementations, an auxiliary seismic dataset is used, in addition to the pre-processed seismic dataset (719), for determining the subsurface property (721). In some implementations, the subsurface property (721) is output to the seismic data storage medium using the seismic data storage writer (832).

In one or more embodiments, the computing system (830) makes use of artificial intelligence (AI) to perform some of the processing tasks. The seismic processing software (835) may further include one or more imaging algorithms configured to determine a seismic image based on the pre-processed seismic dataset (719). As previously stated, examples of imaging algorithms include migration algorithms. Examples of migration algorithms include a Kirchhoff migration, a reverse-time migration (RTM), and a beam migration. In some implementations, the subsurface property (721) includes the seismic image. The seismic processing software (835) may further include velocity model building tools that may be used for generating a velocity model, based on the pre-processed seismic dataset (719). In some implementations, the subsurface property (721) includes the velocity model. Examples of velocity model building tools known in the art include, but are not limited to, a residual moveout (RMO) tomography, a full waveform inversion (FWI), and velocity edition algorithms. Examples of velocity edition algorithms include velocity smoothing algorithms, velocity interpolation algorithms, and mathematical operators for obtaining or modifying the velocity model arbitrarily.

The seismic processing software (835) is hosted and run on a second computer (833), included in the computing system (830). The second computer (833) includes one or more computer processors configured to perform the operations of the seismic processing software (835), including the operations performed in the systems in FIGS. 3-6. The second computer (833) includes a computer memory. The computer memory includes computer-executable instructions that, when executed by the one or more computer processors, cause the one or more computer processors to perform the operations of the seismic processing software (835). In some implementations, the first computer (823) and second computer (833) are a same machine.

One with ordinary skill in the art will acknowledge that the examples of components or functions of the seismic processing software (835) and second visualization software (839) described herein, including seismic trace processing tools, migration algorithms and velocity model building tools are intended to promote clear discussion and should not be considered fixed or limiting. The seismic processing software (835) may include fewer or additional components from the above-described components without departing from the scope of this disclosure.

The seismic interpretation system (850) is configured to receive, at least, the subsurface property (721) from the computing system (830). The seismic interpretation system (850) is used by geoscientists to analyze the subsurface property (721). In some implementations, the seismic interpretation system (850) is configured to read from the seismic data storage medium. The seismic interpretation system (850) includes an interpretation workstation (853) that allows geoscientists to visualize the subsurface property (721). Seismic interpreters may use interpretation software (855), hosted and run on the interpretation workstation (853), to perform various interpretation tasks previously described in this disclosure. In some implementations, the subsurface property (721) includes a seismic image and the interpretation tasks include interpreting key geological horizons within the seismic image. In that respect, the interpretation software (855) may be equipped with various horizon picking tools, such as, for example, a hand-picking tool that allows a seismic interpreter to draw lines on the seismic image and an automatic horizon tracking algorithm. An automatic horizon tracking algorithm allows an interpreter to pick a geological event at a limited number of discreet points, called seed points, in the seismic image and then let the automatic horizon tracking algorithm track the geological event from these seed points, resulting in a horizon. In some embodiments, the interpretation software (855) further includes an artificial intelligence model that receives a depth image as input and returns, as output, a horizon, or a piece of a horizon.

Examples of interpretation tasks further include computing seismic attributes of the seismic image, such as a frequency, a gradient, an envelope, or a coherency. The interpretation workstation (853) may further include peripherals such as a monitor, a keyboard, a mouse, and a graphic tablet that enable efficient interaction between seismic interpreters to interact with the interpretation software (855).

Results of the interpretation tasks may enable geoscientists to identify the drilling target (723) depicted in FIG. 7. In one or more embodiments, identifying the drilling target (723) is further be based on external data (857). Examples of external data (857) include well-log data, geological knowledge, and other geophysical information of the region of interest. As stated, the drilling target (723) may be of many types. Examples of a drilling target include a potential reservoir of a natural resource, an injection site for a material into the subsurface of interest and an extraction site of a material from the subsurface of interest.

In one or more embodiments, properties of the drilling target (723) are determined using the subsurface property (721). In embodiments where the drilling target is a potential hydrocarbon reservoir, examples of properties of the drilling target (723) that may be determined for the potential hydrocarbon reservoir include, but are not limited to, a hydrocarbon distribution within the potential hydrocarbon reservoir, reservoir rock properties, a volume of hydrocarbon within the potential hydrocarbon reservoir, a performance of the potential hydrocarbon reservoir, and a risk assessment. As previously explained in this disclosure, a decision may be made to drill a wellbore (727) perforating the drilling target (723). In one or more embodiments, the decision to drill the wellbore (727) depends on the properties of the drilling target (723). Further, in some embodiments, the decision drill the wellbore (727) is taken by stakeholders in an industry or a governmental entity. Examples of stakeholders include, but are not limited to, seismic interpreters, geologists, a natural resource company management and a government participant.

Following the decision to drill the wellbore (727), a description of the drilling target (723), properties of the drilling target (723), and other results of the interpretation tasks, such as a structural mapping of the subsurface of interest, are sent to a well planning system (873). The well planning system (873) is part of a drilling system (870). The well planning system (873) is structured to plan the wellbore trajectory (725), guided by the drilling target (723). The well planning system (873) is structured to communicate with the seismic interpretation system (850). As previously described, the wellbore trajectory (725) extends from the surface of the Earth to the drilling target (723). The well planning system (873) includes analysis tools, such as computer processors and visualization software. In some embodiments, the well planning system (873) makes use of the seismic interpretation system (850). The well planning system (873) further includes analysts that determine the wellbore trajectory (725). The well planning system (873) may further include a database, in which geographical and geo-political information is stored about the location of the drilling target (723).

The well planning system (873) further assists drilling engineers and teams in making strategic decisions to optimize the wellbore trajectory (725) and placement, to design the casing, and to avoid geohazards, based on geological formations and structural complexities. In some embodiments, the wellbore trajectory (725) may further be constrained by surface limitations, such as suitable locations for the surface position of the wellhead, availability and configuration of drilling ships, and the layout of natural or man-made islands. Additionally, the locations of potential or preexisting drilling rigs may be considered. Drilling equipment is then installed around the entrance of the wellbore trajectory (725) in order to perform a drilling operation to perforate the drilling target (723). Drilling equipment may include a drill bit (881) that perforates the subsurface of interest. Drilling equipment may further include a drilling rig (877) to suspend a drill string (879), the drill bit (881) mounted on a downhole or distal end of the drill string (879). Greater details surrounding drilling operations are described later in this disclosure.

Figure 9:
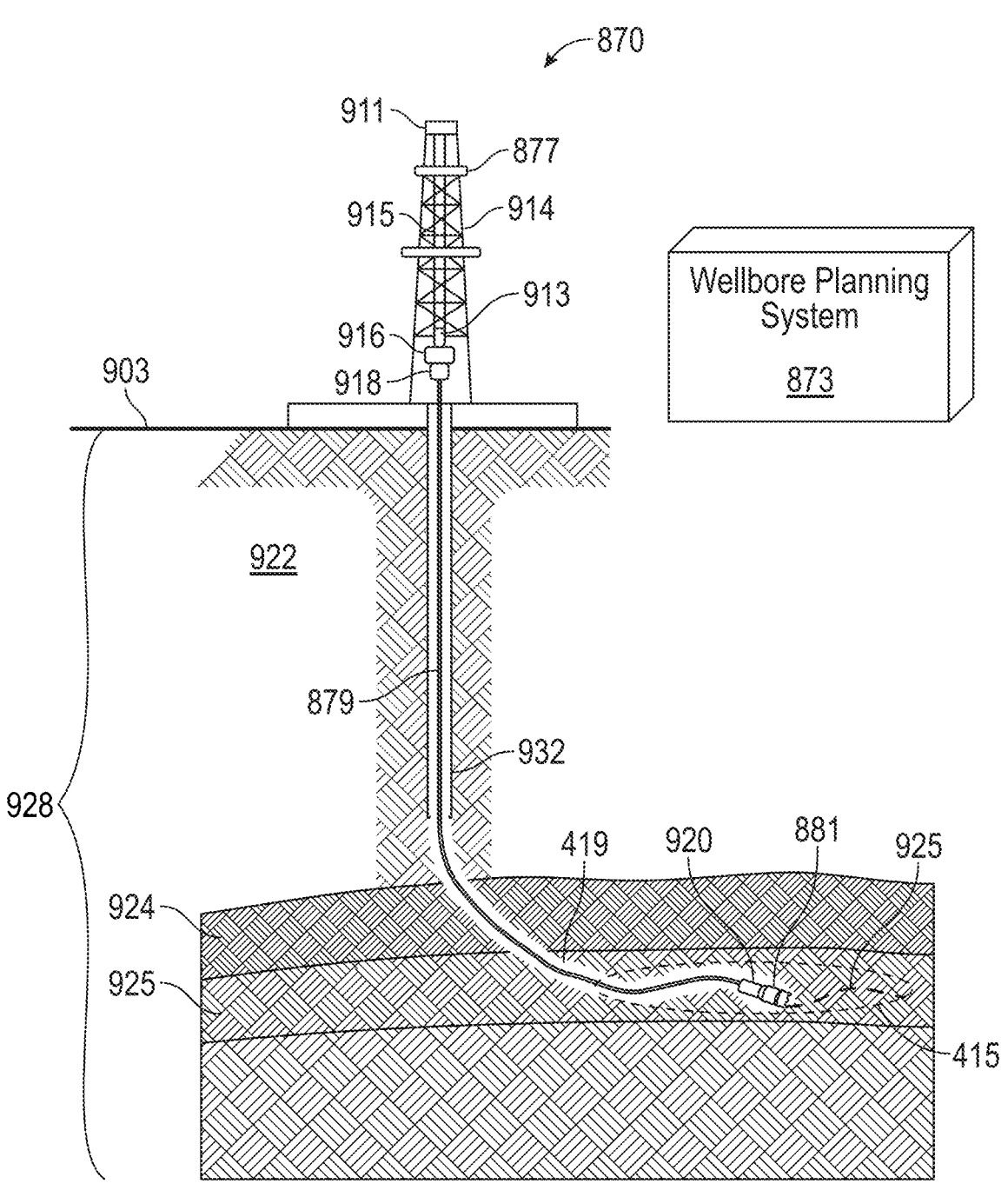
FIG. 9 depicts a well drilling site in accordance with one or more embodiments disclosed herein.

FIG. 9 depicts an example embodiment of the drilling system (870) used in FIG. 8. In this specific embodiment, the drilling target (723) is a potential hydrocarbon reservoir (925). The region of interest includes the surface of interest and a subsurface of interest (928). As shown in FIG. 9, the wellbore (727), following the wellbore trajectory (725) may be drilled by the drill bit (881) attached by the drill string (879) to the drilling rig (877) located on the surface of interest. The drilling rig (877) may include framework, such as a derrick (914) to hold drilling machinery. A crown block (911) may be mounted at the top of the derrick (914), and a traveling block (913) may hang down from the crown block (911) by means of a cable (915) or drilling line. One end of the cable (915) may be connected to a drawworks (not shown), which is a reeling device that may be used to adjust the length of the cable (915) so that the traveling block (913) may move up or down the derrick (914).

A top drive (916) provides clockwise torque via the drive shaft (918) to the drill string (879) in order to drill the wellbore (727). The drill string (879) may comprise a plurality of sections of drillpipe attached at an uphole end to the drive shaft (918) and downhole to a bottomhole assembly ("BHA") (920). The BHA (920) may include a plurality of sections of heavier drillpipe and one or more measurement-while-drilling ("MWD") tools configured to measure drilling parameters. Measured drilling parameters may include torque, weight-on-bit, drilling direction, temperature, etc. Additionally, the BHA may have one or more logging tools (e.g., logging-while-drilling ("LWD")) configured to measure parameters of the rock surrounding the wellbore (727), such as electrical resistivity, density, sonic propagation velocities, gamma-ray emission, etc. MWD tools and logging tools may include sensors and hardware to measure downhole drilling parameters, and these measurements may be transmitted to the surface (903) using any suitable telemetry system known in the art. The BHA (920) and the drill string (879) may include other drilling tools known in the art but not specifically shown.

The wellbore (727) may traverse a plurality of overburden (922) layers and one or more formations (924) to the potential hydrocarbon reservoir (925) within the subsurface of interest (928). The wellbore trajectory (725) may be a curved or a straight trajectory. All or part of the wellbore trajectory (725) may be vertical, and some parts of the wellbore trajectory (725) may be deviated or have horizontal sections. One or more portions of the wellbore (727) may be cased with casing (932) in accordance with a wellbore plan.

Typically, the wellbore plan is generated based on best available information at the time of planning from a geophysical model, geomechanical models encapsulating subterranean stress conditions, the trajectory of any existing wellbores (which it may be desirable to avoid), and the existence of other drilling hazards, such as shallow gas pockets, over-pressure zones, and active fault planes. The drilling system (870) may be used to drill the wellbore (727) along the wellbore trajectory (725) to access the potential hydrocarbon reservoir (925).

To start drilling, or "spudding in" the well, the hoisting system lowers the drill string (879) suspended from the derrick (914) towards the planned surface location of the wellbore (727). An engine or electric motor may be used to supply power to the top drive (916) to rotate the drill string (879) through the drive shaft (918). The weight of the drill string (879) combined with the rotational motion enables the drill bit (881) to bore the wellbore (727).

The drilling system (870) may be disposed at and communicate with other systems in the well environment, such as the computing system (830) and the seismic interpretation system (850) defined in the description of FIG. 8. The drilling system (870) may control at least a portion of a drilling operation by providing controls to various components of the drilling operation. In one or more embodiments, the drilling system (870) may receive well data from one or more sensors and/or logging tools arranged to measure controllable parameters of the drilling operation. During operation of the drilling system (870), the well data may include mud properties, flow rates, drill volume and penetration rates, rock physical properties, etc.

The well planning system (873) helps drilling engineers in designing casing strings and selecting appropriate tubulars based on the wellbore conditions, planned drilling operations, and regulatory requirements. It considers factors such as pressure, temperature, well depth, formation properties, and casing load capacity. Furthermore, the well planning system (873) performs torque and drag analysis to evaluate the forces and stresses acting on the drill string (879) during drilling operations. This analysis helps in identifying potential issues such as differential sticking, buckling, or limitations in the drilling equipment. The well planning system (873) may have the capability to integrate real-time drilling data, such as downhole measurements, drilling parameters, and formation evaluation results. This integration allows engineers to monitor the drilling progress, make on-the-fly adjustments to the well plan, optimize drilling efficiency, and maintain drilling safety. The well planning system (873) further allows drilling engineers to visualize and interact with wellbore data in a 3D environment. It provides a graphical representation of the planned well trajectory, existing well paths, geological formations, and potential hazards. Furthermore, the well planning system (873) provides tools for generating reports, exporting data, and documenting drilling plans and decisions. These reports can be shared with regulatory agencies, drilling contractors, and other stakeholders to ensure alignment and compliance throughout the drilling lifecycle.

Figure 10:
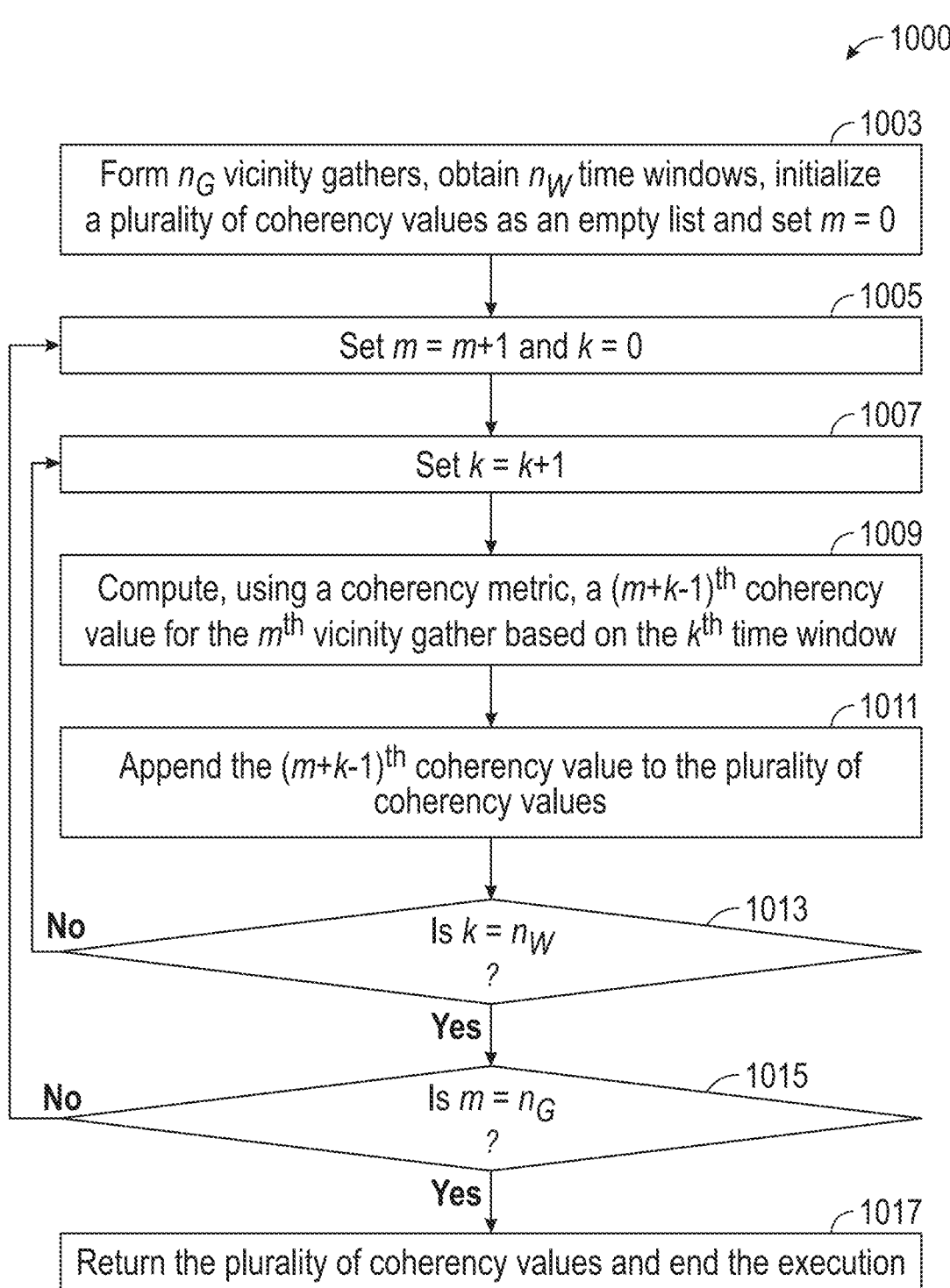
FIG. 10 depicts a flow chart of a sliding window in accordance with one or more embodiments disclosed herein.

FIG. 10 depicts a method (1000) for computing a plurality of coherency values for a seismic dataset. The method (1000) borrows elements from the system (300). For brevity, a full description of components and/or elements depicted in FIG. 10 is not provided anew for those components and/or elements that have been previously described with reference to the preceding figures. The lateral locations of all the seismic traces of the seismic dataset (303) discretize a spatial surface. The seismic dataset includes a plurality of seismic traces. Each seismic trace includes a time series of signal amplitudes recorded at discreet times discretizing the time interval $[0, T_{max}]$.

In Step 1003, a number $n_g \geq 1$ of one or more vicinity gathers is formed for the seismic dataset. The one or more vicinity gathers are formed in the same way as the one or more vicinity gathers (305) for the seismic dataset (303) in FIG. 3. Each vicinity gather within the one or more vicinity gathers includes a set of at least two neighboring seismic traces for the seismic dataset. In some implementations, each vicinity gather is a distinct seismic gather from the seismic dataset. In other implementations, each vicinity gather within the one or more vicinity gathers is formed by a translating a vicinity region to a centroid in the spatial surface. In some embodiments, translating the vicinity region to a centroid defines an aperture around the centroid, such as a circular aperture or a rectangular aperture. In Step 1003, one or more time windows are obtained in a similar fashion to the one or more time windows (313) in FIG. 3. As such, in some embodiments, the one or more time windows form a sliding time window. The number of time window within the one or more time windows is denoted as $n_w$, with $n_w \geq 1$. The number of vicinity gathers and number of time windows are further required to satisfy the condition $n_g + n_w \geq 2$. In some implementations, two or more of the one or more time windows overlap. In other implementations, the time windows withing the one or more time windows do not overlap. In Step 1003, a plurality of coherency values is initialized as an empty list and a first iterator m is initialized to 0. The first iterator m is intended to vary from 0 to the number of vicinity gathers $n_g$.

In Step 1005, the first iterator m is incremented by 1 and a second iterator, k, is initialized to 0. The second iterator k is intended to vary from 0 to the number of time windows $n_w$. In Step 1007, the second iterator k is incremented by 1.

In Step 1009, a $(m+k-1)^{th}$ coherency value is computed for the $m^{th}$ vicinity gather and the $k^{th}$ time window using a coherency metric. The coherency metric can be defined in many ways. Examples of coherency metrics include the semblance in EQs. 1-3 and EQs. 6-7 and the cross-correlation formulas in EQs. 8-10. The coherency metric measures a similarity between the seismic traces of the $m^{th}$ vicinity gather based on the $k^{th}$ time window. In Step 1011, the $(m+k-1)^{th}$ coherency value is appended to the plurality of coherency values. In Step 1013, a determination is made whether $k=n_w$. If $k \neq n_w$, the method loops back to Step 1007 where k is incremented again. If $=n_w$, the maximum number of time windows has been reached and the method continues in Step 1015. In Step 1015, a determination is made whether $m=n_g$. If $m \neq n_g$, the method loops back to Step 1005 where m is incremented again and k is re-set to 0. If $m=n_g$, the maximum number of vicinity gathers has been reached and the method continues in Step 1017. In Step 1017, the method returns the plurality of coherency values in a similar way as the system in FIG. 3 returns the plurality of coherency values (321). The execution of the method (1000) ends in Step 1017.

Figure 11:
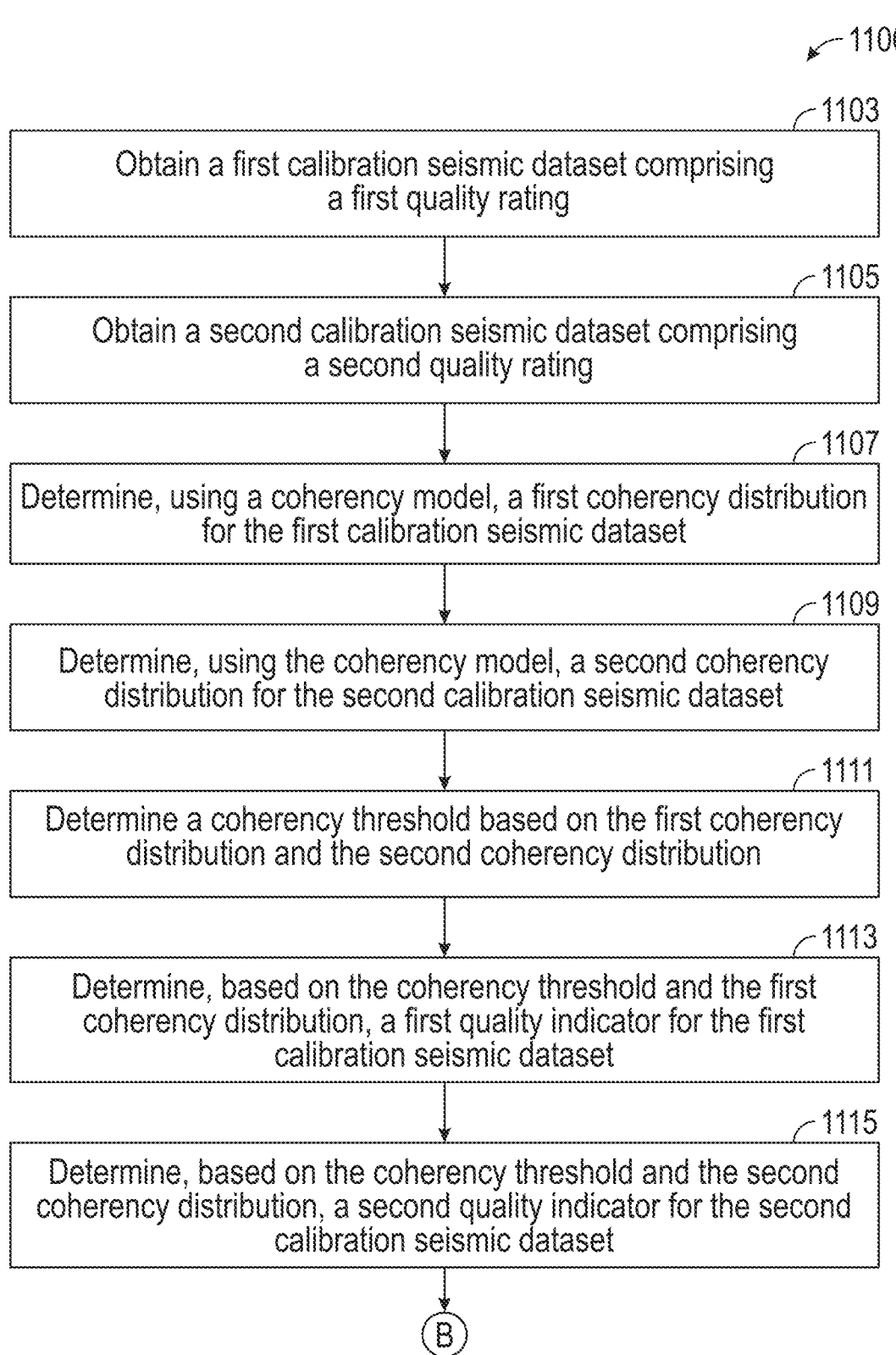
FIG. 11 depicts a flow chart for performing quality assessment of a seismic dataset in accordance with one or more embodiments disclosed herein.

FIG. 11 depicts a method (1100) for performing quality assessment of a seismic dataset, called an application seismic dataset. The application seismic dataset pertains to a region of interest. For brevity, a full description of components and/or elements depicted in FIG. 11 is not provided anew for those components and/or elements that have been previously described with reference to the preceding figures. In Step 1103, a first calibration seismic dataset is obtained. The first calibration seismic dataset includes a first plurality of seismic traces. The first calibration seismic dataset may be obtained in many ways, in a similar fashion to the first calibration seismic dataset (403) in FIG. 4. Thus, in one or more embodiments, the first calibration seismic dataset is acquired using a seismic acquisition system, such as the surface seismic acquisition system (100) in FIG. 1 or the VSP acquisition system (200) in FIG. 2. It follows that in some embodiments, the first calibration seismic dataset is a surface seismic dataset while in other embodiments, the first calibration seismic dataset is a VSP dataset. In one or more embodiments, the first calibration seismic dataset is extracted from a database of existing seismic data, rather than acquired. In some embodiments, the first calibration seismic dataset is a single seismic gather in a format known in the art, such as a shot gather, a common midpoint gather or a common receiver gather. In other embodiments, the first calibration seismic dataset includes a plurality of seismic gathers. The first calibration seismic dataset needs not be sorted and in further embodiments, the first plurality of seismic traces is not sorted as seismic gathers.

The first calibration seismic dataset further includes a first quality rating, similar to the first quality rating (405) for the first calibration seismic dataset (403) in FIG. 4. As such, the first quality rating indicates a quality of the first calibration seismic dataset. The first quality rating may be of several formats, such as, for example, a binary indicator and a numerical score. In some specific implementations, the first quality rating is a textual binary indicator equal to "high-quality" or "low-quality." The first quality rating may be defined in many ways. In one or more embodiments, the first quality rating is assigned by a skilled person, such as a data scientist or a geoscientist, performing quality control of the first calibration seismic dataset. Quality control may include, for example, a visual observation of the first calibration seismic dataset, or a quantitative analysis of the seismic traces of the first calibration seismic dataset. Quality control may include, for example, signal-to-noise analysis, a computation and observation of a frequency spectrum of the first calibration seismic dataset and an assessment of the acquisition equipment used to record the first calibration seismic dataset. In some embodiments, the first calibration seismic dataset is stored on a seismic data storage medium. The seismic data storage medium may include various data storage supports, such as a tape, a disk, a flash memory, or any combination thereof. In some embodiments, the first calibration seismic dataset is accessed using a seismic data storage reader, such as the seismic data storage reader (831) from FIG. 8. The seismic data storage reader is configured to read from the seismic data storage medium. The seismic data storage reader may be of many types, depending on the format of the seismic data storage medium. In some implementations, the seismic data storage reader includes a tape reader, a disk reader, a flash memory reader, or any combination thereof.

In Step 1105, a second calibration seismic dataset is obtained. The second calibration seismic dataset includes a second plurality of seismic traces. The second calibration seismic dataset may be obtained in many ways, in a similar fashion to the second calibration seismic dataset (411) in FIG. 4. Thus, in one or more embodiments, the second calibration seismic dataset is acquired using a seismic acquisition system, such as the surface seismic acquisition system (100) in FIG. 1 or the VSP acquisition system (200) in FIG. 2. It follows that in some embodiments, the second calibration seismic dataset is a surface seismic dataset while in other embodiments, the second calibration seismic dataset is a VSP dataset. In one or more embodiments, the second calibration seismic dataset is extracted from a database of existing seismic data, rather than acquired. In some embodiments, the second calibration seismic dataset is stored on the seismic data storage medium and accessed using the seismic data storage reader.

The first calibration seismic dataset and the second calibration seismic dataset need not be of the same type. For instance, in some implementations, the first calibration seismic dataset may be a VSP dataset and the second calibration seismic dataset may be a surface seismic dataset. However, since the first calibration seismic dataset and the second calibration seismic dataset are intended to be compared, it may be advantageous for the first calibration seismic dataset and the second calibration seismic dataset to be of the same type. Advantageously, the first calibration seismic dataset and the second calibration seismic dataset may both be VSP datasets. Advantageously, the first calibration seismic dataset and the second calibration seismic dataset may both be surface seismic datasets.

The second calibration seismic dataset further includes a second quality rating, in the same way as the first calibration seismic dataset includes a first quality rating. The second quality rating is similar to the second quality rating (413) for the second calibration seismic dataset (411) in FIG. 4. The second quality rating indicates a quality of the second calibration seismic dataset. The first quality rating and the second quality rating are of the same format and occupy a same value space. In that regard, in some implementations, the first quality rating and the second quality rating are both binary indicators that can take the same two values. In other implementations, the first quality rating and the second quality rating are both numerical scores that can take values on a same domain of numbers. Furthermore, the first quality rating and the second quality rating must have different values. As a first example, if the first quality rating and the second quality rating are both a textual binary indicator equal to "high-quality" or "low-quality", then one of the first quality rating and the second quality rating must have the value "high-quality", while the other of the first quality rating and the second quality rating must have the value "low-quality." As a second example, if the first quality rating and the second quality rating are both a numerical score, the first quality rating and the second quality rating must have a different numerical value for the numerical score.

In Step 1107, a first coherency distribution is determined for the first calibration seismic dataset. The first coherency distribution is determined using the coherency model (325) from FIG. 3. As such, the coherency model includes a coherency metric configured to measure a similarity between adjacent seismic traces. Adjacent seismic traces may be defined as seismic traces that belong to a same vicinity gather. One or more vicinity gathers may be formed in a similar fashion to the one or more vicinity gathers (305) in FIG. 3 or Step 1003 of the method (1000). The coherency model further includes one or more time windows. The one or more time windows are defined in the same way as the one or more time windows (313) in FIG. 3 and the one or more time windows from step 1003 of the method (1000). Thus, in some implementations, the one or more time windows may form a sliding time windows. For each vicinity gather among the one or more vicinity gathers and each time window among the one or more time windows, a coherency value is computed using the coherency metric. As a result, a first plurality of coherency values is computed for the first calibration seismic dataset. The coherency metric may be defined in many ways in a similar fashion to the coherency metric (311) in FIG. 3. In some implementations, the coherency metric includes a semblance. Examples of a semblance are given in EQ. 1-3 and EQs. 6-7. In some implementations, the coherency metric includes a cross-correlation. Examples of a cross-correlation formulas are given in EQs. 8-10.

The first coherency distribution is determined from the first plurality of coherency values, in the same way as the coherency distribution (323) in FIG. 3. Thus, in some implementations, the first coherency distribution is the first plurality of coherency values. In other embodiments, the first plurality of coherency values is normalized into a first plurality of normalized coherency values and the first coherency distribution is the first plurality of normalized coherency values. In some implementations, the first plurality of coherency values or the first plurality of normalized coherency values is binned as a first plurality of binned coherency values, using a set of coherency bins, and the first coherency distribution is the first plurality of binned coherency values. In Step 1109, a second coherency distribution is determined, for the second calibration seismic dataset, using the coherency model. The first coherency distribution and second coherency distribution are intended to be compared. Thus, it may be advantageous to form the first coherency distribution and second coherency distribution based on normalized coherency values.

In Step 1111, a coherency threshold is determined based on the first coherency distribution and the second coherency distribution. The coherency threshold in Step 1111 is determined in the same way as the coherency threshold (419) in FIG. 4. As such, the coherency threshold is a separator between the first calibration seismic dataset and the second calibration seismic dataset. The coherency threshold can be determined using various methods, such as, for example, a visual selection, a statistical method or an optimization method. A visual selection can be done, for example, by visually inspecting a first graph of the first coherency distribution, a second graph of the second coherency distribution, and selecting the coherency threshold as any coherency value between the peak locations of the first graph and the second graph. Examples of a statistical method includes selecting the coherency threshold as a midpoint of the modes, the medians, or the means of the first and second coherency distributions. Examples of optimization methods include selecting the coherency threshold that maximally separates the first coherency distribution and the second coherency distribution, in the sense given by EQ. 14.

In Step 1113, a first quality indicator is determined for the first calibration seismic dataset, based on the coherency threshold determined in Step 1111. The first quality indicator is determined in the same way as the quality indicator (505) resulting from the scoring model in FIG. 5. In some implementations, the quality indicator is a proportion of coherency values of the first coherency distribution that are less than or equal to the coherency threshold. In some implementations, the quality indicator is a proportion of coherency values of the first coherency distribution that are less than the coherency threshold. In some implementations, the quality indicator is a proportion of coherency values of the first coherency distribution that are greater than or equal to the coherency threshold. In some implementations, the quality indicator is a proportion of coherency values of the first coherency distribution that are greater than the coherency threshold. In Step 1115, a second quality indicator is determined for the second calibration seismic dataset, based on the coherency threshold, using again the scoring model from FIG. 5.

In Step 1117, an integrated seismic dataset to be quality-assessed is obtained, in a similar fashion to the integrated seismic dataset (703) from FIG. 7. The integrated seismic dataset pertains to a region of interest. The integrated seismic dataset includes, at least, a first application seismic dataset similar to the application seismic dataset (603) in FIG. 6. The first application seismic dataset includes a first application plurality of seismic traces. The first application seismic dataset may be obtained in many ways. In one or more embodiments, the first application seismic dataset is acquired using a seismic acquisition system, such as the surface seismic acquisition system (100) in FIG. 1 or the VSP acquisition system (200) in FIG. 2. It follows that in some embodiments, the first application seismic dataset is a surface seismic dataset while in other embodiments, the first application seismic dataset is a VSP dataset. In one or more embodiments, the first application seismic dataset is extracted from a database of existing seismic data, rather than acquired. In some embodiments, the first application seismic dataset is a single seismic gather in a format known in the art, such as a shot gather, a common midpoint gather or a common receiver gather. In other embodiments, the first application seismic dataset includes a plurality of seismic gathers. The first application seismic dataset needs not be sorted and in further embodiments, the first plurality of seismic traces is not sorted as seismic gathers. In some embodiments, the integrated seismic dataset is stored on the seismic data storage medium and accessed using the seismic data storage reader.

Quality-assessment is to be performed for the first application seismic dataset based on the first calibration seismic dataset and the second calibration seismic dataset. Thus, it may be advantageous that the first calibration seismic dataset, second calibration seismic dataset and first application seismic dataset be of a same type. For instance, in some advantageous implementations, the first calibration seismic dataset, second calibration seismic dataset and first application seismic dataset are all VSP datasets. In other advantageous implementations, the first calibration seismic dataset, second calibration seismic dataset and first application seismic dataset are all surface seismic datasets. In some implementations, the first calibration seismic dataset includes a first plurality of shot gathers, the second calibration seismic dataset includes a second plurality of shot gathers, and the first application seismic dataset includes a single shot gather.

In Step 1119, a coherency distribution, called a first application coherency distribution, is determined for the first application seismic dataset from Step 1117, using the coherency model from FIG. 3. Thus, the first application coherency distribution is determined in the same way as the coherency distribution (323). In Step 1121, a quality indicator, called a first application quality indicator, is determined for the first application seismic dataset, based on the first application coherency distribution and the coherency threshold. The first application quality indicator is determined, similarly to the first quality indicator and the second quality indicator, by using the scoring model from FIG. 5.

In Step 1123, a quality rating, called a first application quality rating, is determined for the first application seismic dataset. The first application quality rating is determined based on the first application quality indicator, the first quality indicator, the second quality indicator, the first quality rating and the second quality rating. A quality assessment is formed for the integrated seismic dataset, resulting from the quality assessment procedure. The quality assessment includes the first application quality rating. The first application quality rating in Step 1123 is determined in the same way as the application quality rating (611) in FIG. 6. In some implementations, the first application quality rating is defined based on how close the calibration quality indicator is to each of the first quality indicator and the second quality indicator. In such implementations, a first distance, denoted as $d_1$ is computed between the first application quality indicator, denoted as $I_a$, and the first quality indicator, denoted as $I_1$. A second distance, denoted as $d_2$, is computed between the first application quality indicator and the second quality indicator, denoted as $I_2$.

In implementations where the first quality rating and second quality rating are binary indicators, the first application quality rating may be assigned either the value of the first quality rating or the value of the second quality rating based on the first distance and second distance. For instance, in some implementations, the first application quality rating is assigned the value of the first quality rating if $d_1 \leq d_2$, or the value of the second quality rating if $d_1 > d_2$. In other implementations, the first application quality rating is assigned the value of the first quality rating if $d_1 < d_2$, or the value of the second quality rating if $d_1 \geq d_2$. In implementations where the first quality rating and second quality rating are numerical scores, the first application quality rating may be computed as an average of the first quality rating and the value of the second quality rating based on the first distance and second distance. Examples of averages giving an advantage to the one of the first quality rating if $d_1 < d_2$, or the second quality rating if $d_1 > d_2$ include a weighted average according to the formulas in EQs. 15 and 16.

Steps 1119, 1121 and 1123 define a quality assessment procedure for the integrated seismic dataset. In one or more embodiments, the integrated seismic dataset includes a plurality of application seismic datasets. For instance, in some implementations, the integrated seismic dataset includes a plurality of shot gathers, and each application seismic dataset within the plurality of application seismic datasets is a distinct shot gather within the plurality of shot gathers. The number of application seismic datasets of the plurality of application seismic datasets is denoted as $n_D \geq 2$. In response, the quality assessment procedure further includes repeating Steps 1119, 1121 and 1123 for each of the $n_D$ application seismic datasets, in a similar fashion to the description of FIG. 7. For each $n \leq n_D$, an $n^{th}$ application quality indicator is computed for the $n^{th}$ application seismic dataset using the scoring system in FIG. 5, resulting in $n_D$ application quality indicators. For each $n \leq n_D$, an $n^{th}$ application quality rating is computed for the $n^{th}$ application seismic dataset using the system in FIG. 6, based on the $n^{th}$ application quality indicator, the first quality rating, the first quality indicator, the second quality rating and the second quality indicator, resulting in $n_D$ application quality ratings. Generally, the quality assessment includes the $n_D$ application quality ratings. In one or more embodiments, the quality assessment is output to the seismic data storage medium using a seismic data storage writer, such as the seismic data storage writer (832) from FIG. 8. The seismic data storage writer may be of many types, depending on the format of the seismic data storage medium. In some implementations, the seismic data storage writer includes a tape writer, a disk writer, a flash memory writer, or any combination thereof.

In one or more embodiments, a pre-processed seismic dataset is obtained from the integrated seismic dataset in response to the quality assessment procedure. The pre-processed seismic dataset is determined in the same way as the pre-processed seismic dataset (719) in FIG. 7. Determining the pre-processed seismic dataset involves conducting one or more pre-processing steps for the integrated seismic dataset. In some implementations, the one or more pre-processing steps include discarding the application seismic datasets for which the application quality ratings are considered unsatisfactory. Following the systems in FIGS. 7 and 8, a subsurface property of the region of interest may be determined based on the pre-processed seismic dataset in a similar fashion to the subsurface property (721). Then, a drilling target may be identified based on the subsurface property in a similar fashion to the drilling target (723). A wellbore trajectory may be planned based on the drilling target and a wellbore may be drilled following the wellbore trajectory.

Figure 12:
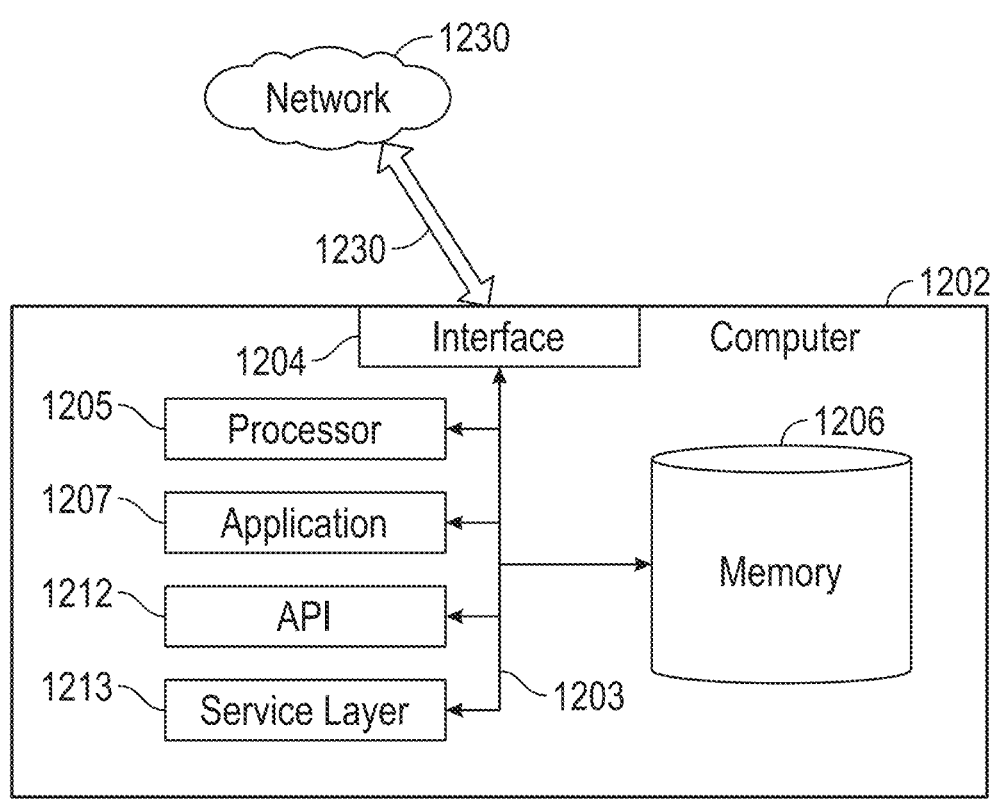
FIG. 12 depicts a schematic diagram of a computer in accordance with one or more embodiments disclosed herein.

As stated, the computations mentioned in this disclosure may be performed by a computer, such as the first computer (823) or the second computer (833) in FIG. 8. In that regard, FIG. 12 depicts a block diagram of a computer (1202) used to provide computational functionalities associated with described algorithms, methods, functions, processes, flows, and procedures as described in this disclosure, according to one or more embodiments. The illustrated computer (1202) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (1202) may include a computer that includes an input device, such as a keypad, keyboard, touch screen, or other device that can accept user information, and an output device that conveys information associated with the operation of the computer (1202), including digital data, visual, or audio information (or a combination of information), or a GUI.

The computer (1202) can serve in a role as a client, network component, a server, a database or other persistency, or any other component (or a combination of roles) of a computer system for performing the subject matter described in the instant disclosure. In some implementations, one or more components of the computer (1202) may be configured to operate within environments, including cloud-computing-based, local, global, or other environments (or a combination of environments).

At a high level, the computer (1202) is an electronic computing device operable to receive, transmit, process, store, or manage data and information associated with the described subject matter. According to some implementations, the computer (1202) may also include or be communicably coupled with an application server, e-mail server, web server, caching server, streaming data server, business intelligence (BI) server, or other server (or a combination of servers).

The computer (1202) can receive requests over network (1230) from a client application (for example, executing on another computer (1202) and responding to the received requests by processing the said requests in an appropriate software application. In addition, requests may also be sent to the computer (1202) from internal users (for example, from a command console or by other appropriate access method), external or third-parties, other automated applications, as well as any other appropriate entities, individuals, systems, or computers.

Each of the components of the computer (1202) can communicate using a system bus (1203). In some implementations, any or all of the components of the computer (1202), both hardware or software (or a combination of hardware and software), may interface with each other or the interface (1204) (or a combination of both) over the system bus (1203) using an application programming interface (API) (1212) or a service layer (1213) (or a combination of the API (1212) and service layer (1213). The API (1212) may include specifications for routines, data structures, and object classes. The API (1212) may be either computer-language independent or dependent and refer to a complete interface, a single function, or even a set of APIs. The service layer (1213) provides software services to the computer (1202) or other components (whether or not illustrated) that are communicably coupled to the computer (1202). The functionality of the computer (1202) may be accessible for all service consumers using this service layer. Software services, such as those provided by the service layer (1213), provide reusable, defined business functionalities through a defined interface. For example, the interface may be software written in JAVA, C++, or other suitable language providing data in extensible markup language (XML) format or another suitable format. While illustrated as an integrated component of the computer (1202), alternative implementations may illustrate the API (1212) or the service layer (1213) as stand-alone components in relation to other components of the computer (1202) or other components (whether or not illustrated) that are communicably coupled to the computer (1202). Moreover, any or all parts of the API (1212) or the service layer (1213) may be implemented as child or sub-modules of another software module, enterprise application, or hardware module without departing from the scope of this disclosure.

The computer (1202) includes an interface (1204). Although illustrated as a single interface (1204) in FIG. 12, two or more interfaces (1204) may be used according to particular needs, desires, or particular implementations of the computer (1202). The interface (1204) is used by the computer (1202) for communicating with other systems in a distributed environment that are connected to the network (1230). Generally, the interface (1204) includes logic encoded in software or hardware (or a combination of software and hardware) and operable to communicate with the network (1230). More specifically, the interface (1204) may include software supporting one or more communication protocols associated with communications such that the network (1230) or interface's hardware is operable to communicate physical signals within and outside of the illustrated computer (1202).

The computer (1202) includes at least one computer processor (1205). Although illustrated as a single computer processor (1205) in FIG. 12, two or more processors may be used according to particular needs, desires, or particular implementations of the computer (1202). Generally, the computer processor (1205) executes instructions and manipulates data to perform the operations of the computer (1202) and any algorithms, methods, functions, processes, flows, and procedures as described in the instant disclosure.

The computer (1202) also includes a memory (1206) that holds data for the computer (1202) or other components (or a combination of both) that can be connected to the network (1230). The memory may be a non-transitory computer readable medium. For example, memory (1206) can be a database storing data consistent with this disclosure. Although illustrated as a single memory (1206) in FIG. 12, two or more memories may be used according to particular needs, desires, or particular implementations of the computer (1202) and the described functionality. While memory (1206) is illustrated as an integral component of the computer (1202), in alternative implementations, memory (1206) can be external to the computer (1202).

The application (1207) is an algorithmic software engine providing functionality according to particular needs, desires, or particular implementations of the computer (1202), particularly with respect to functionality described in this disclosure. For example, application (1207) can serve as one or more components, modules, applications, etc. Further, although illustrated as a single application (1207), the application (1207) may be implemented as multiple applications (1207) on the computer (1202). In addition, although illustrated as integral to the computer (1202), in alternative implementations, the application (1207) can be external to the computer (1202).

There may be any number of computers such as the computer (1202) associated with, or external to, a computer system containing computer (1202), wherein each computer (1202) communicates over network (1230). Further, the term "client," "user," and other appropriate terminology may be used interchangeably as appropriate without departing from the scope of this disclosure. Moreover, this disclosure contemplates that many users may use one computer (1202), or that one user may use multiple computers such as the computer (1202).

The following examples are merely illustrative and should not be interpreted as limiting the scope of the present disclosure.

EXAMPLES

Figure 13:
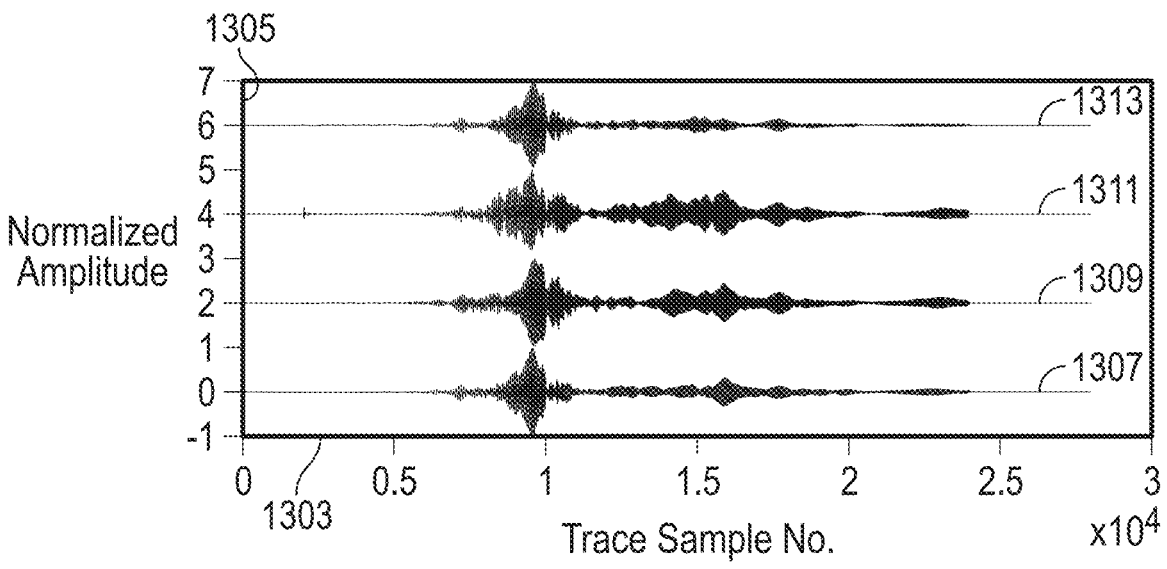
FIG. 13 displays a shot gather in accordance with one or more embodiments disclosed herein.

FIGS. 13-17B depict a specific implementation of the method (1100) and the systems defined in FIGS. 4-7. FIG. 13 depicts a graph of a first shot gather extracted from a specific example of a first calibration seismic dataset. In this specific example, the first calibration seismic dataset includes a plurality of shot gathers. Yet, FIG. 13 depicts only one of these shot gathers. The first calibration seismic dataset used in FIG. 13 is a specific example of the first calibration seismic dataset (403) from FIG. 4 and the first calibration seismic dataset from Step 1103 of the method (1100). In FIG. 13, the first calibration seismic dataset is a VSP dataset, acquired from a first VSP acquisition system similar to the VSP acquisition system (200) in FIG. 2. The first VSP acquisition system includes four seismic receivers. Accordingly, the graph in FIG. 13 includes four plots for the first calibration seismic dataset. A first plot (1307) for the first shot gather depicts a first seismic trace of the first shot gather recorded by a first seismic receiver of the first VSP acquisition system. A second plot (1309) for the first shot gather depicts a second seismic trace of the first shot gather recorded by a second seismic receiver of the first VSP acquisition system. A third plot (1311) for the first shot gather depicts a third seismic trace of the first shot gather recorded by a third seismic receiver of the first VSP acquisition system. A fourth plot (1313) for the first shot gather depicts a fourth seismic trace of the first shot gather recorded by a fourth seismic receiver of the first VSP acquisition system. Each of the four seismic traces of the first shot gather has a record length of $T_{max}$=2 8s with a sample rate of 1 ms, totaling 28001 samples. The graph in FIG. 13 includes two axes. A sample number abscissa axis (1303) measures trace sample number and a first amplitude ordinate axis (1305) measured a value of a normalized amplitude recorded at each trace sample. To fit on the same graph, the normalized amplitudes of the second seismic trace of the first shot gather were added a constant value of 2, the normalized amplitudes of the third seismic trace of the first shot gather were added a constant value of 4 and the normalized amplitudes of the fourth seismic trace of the first shot gather were added a constant value of 6.

A quality rating is defined as a textual binary indicator that may take the values "high-quality" or "low-quality." A first quality rating, equal to "high-quality", is assigned to the first calibration seismic dataset in a similar fashion to the first quality rating (405) in FIG. 4. The first quality rating is assigned by a skilled person, such as a data scientist or a geoscientist, that determines that the quality of the first calibration seismic dataset is high. The first quality rating is assigned using a data labeling system, such as the data labeling system (820) in FIG. 8. In some embodiments, the first plot (1307) for the first shot gather, second plot (1309) for the first shot gather, third plot (1311) for the first shot gather and fourth plot (1313) for the first shot gather are seen as looking highly similar and for this reason, the first quality rating takes a value equal to "high-quality."

Figure 14:
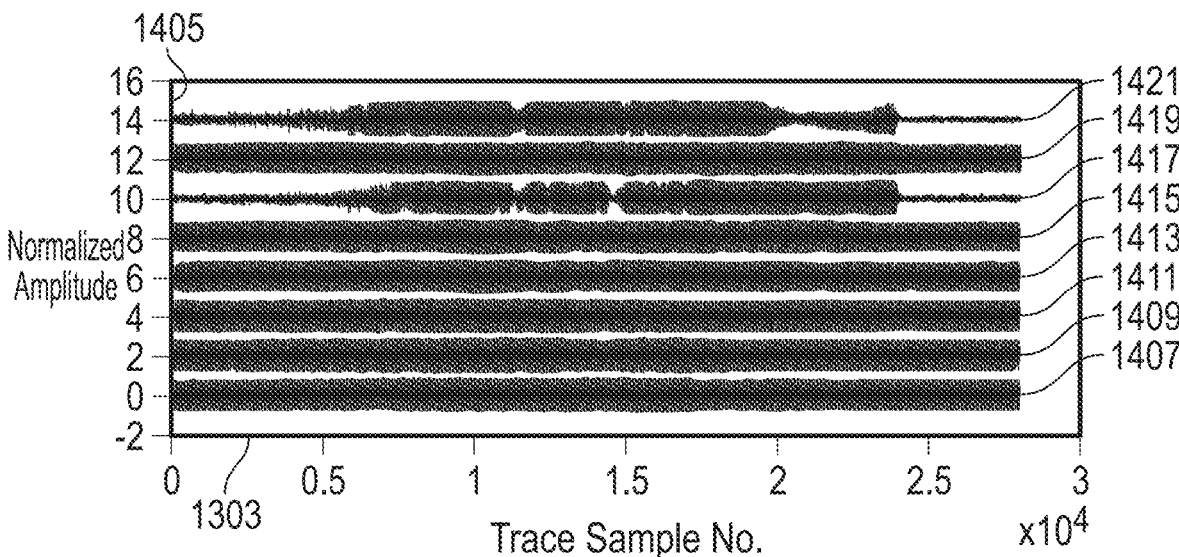
FIG. 14 displays a shot gather in accordance with one or more embodiments disclosed herein.

FIG. 14 depicts a graph of a second shot gather extracted from a specific example of a second calibration seismic dataset. In this specific example, the second calibration seismic dataset includes a plurality of shot gathers. Yet, FIG. 14 depicts only one of these shot gathers. The second calibration seismic dataset used in FIG. 14 is a specific example of the second calibration seismic dataset (411) from FIG. 4 and the first calibration seismic dataset from Step 1105 of the method (1100). In FIG. 14, the second calibration seismic dataset is a VSP dataset, acquired from a second VSP acquisition system similar to the VSP acquisition system (200) in FIG. 2.

The second VSP acquisition system includes eight seismic receivers. Accordingly, the graph in FIG. 14 includes eight plots for the second shot gather. A first plot (1407) for the second shot gather depicts a first seismic trace of the second shot gather recorded by a first seismic receiver of the second VSP acquisition system. A second plot (1409) for the second shot gather depicts a second seismic trace of the second shot gather recorded by a second seismic receiver of the second VSP acquisition system. A third plot (1411) for the second shot gather depicts a third seismic trace of the second shot gather recorded by a third seismic receiver of the second VSP acquisition system. A fourth plot (1413) for the second shot gather depicts a fourth seismic trace of the second shot gather recorded by a fourth seismic receiver of the second VSP acquisition system. A fifth plot (1415) for the second shot gather depicts a fifth seismic trace of the second shot gather recorded by a fifth seismic receiver of the second VSP acquisition system. A sixth plot (1417) for the second shot gather depicts a sixth seismic trace of the second shot gather recorded by a sixth seismic receiver of the second VSP acquisition system. A seventh plot (1419) for the second shot gather depicts a seventh seismic trace of the second shot gather recorded by a seventh seismic receiver of the second VSP acquisition system. An eighth plot (1421) for the second shot gather depicts an eighth seismic trace of the second shot gather recorded by an eighth seismic receiver of the second VSP acquisition system.

Each of the eight seismic traces of the second shot gather has a record length of $T_{max}$=2 8s with a sample rate of 1 ms, totaling 28001 samples. The graph in FIG. 14 includes two axes. The sample number abscissa axis (1303), that measures a trace sample number and a second amplitude ordinate axis (1405) that measures a value of a normalized amplitude recorded at each trace sample. To fit on the same graph, the normalized amplitudes of the second seismic trace of the second shot gather were added a constant value of 2, the normalized amplitudes of the third seismic trace of the second shot gather were added a constant value of 4, the normalized amplitudes of the fourth seismic trace of the second shot gather were added a constant value of 6, the normalized amplitudes of the fifth seismic trace of the second shot gather were added a constant value of 8, the normalized amplitudes of the sixth seismic trace of the second shot gather were added a constant value of 10, the normalized amplitudes of the seventh seismic trace of the second shot gather were added a constant value of 12 and the normalized amplitudes of the eighth seismic trace of the second shot gather were added a constant value of 14.

A second quality rating, equal to "low-quality", is assigned to the second calibration seismic dataset in a similar fashion to the second quality rating (413) in FIG. 4. In the same way as the first quality rating from FIG. 13, the second quality rating is assigned by a skilled person, such as a data scientist or a geoscientist, that determines that the quality of the second calibration seismic dataset is low. The second quality rating is assigned using a data labeling system, such as the data labeling system (820) in FIG. 8. In some embodiments, the first plot (1407) for the second calibration seismic dataset, second plot (1409) for the second calibration seismic dataset, third plot (1411) for the second calibration seismic dataset, fourth plot (1413) for the second calibration seismic dataset, fifth plot (1415) for the second calibration seismic dataset, sixth plot (1417) for the second calibration seismic dataset, seventh plot (1419) for the second calibration seismic dataset and eighth plot (1421) for the second calibration seismic dataset are seen as looking dissimilar and for this reason, the second quality rating takes a value equal to "low-quality."

Figure 15A:
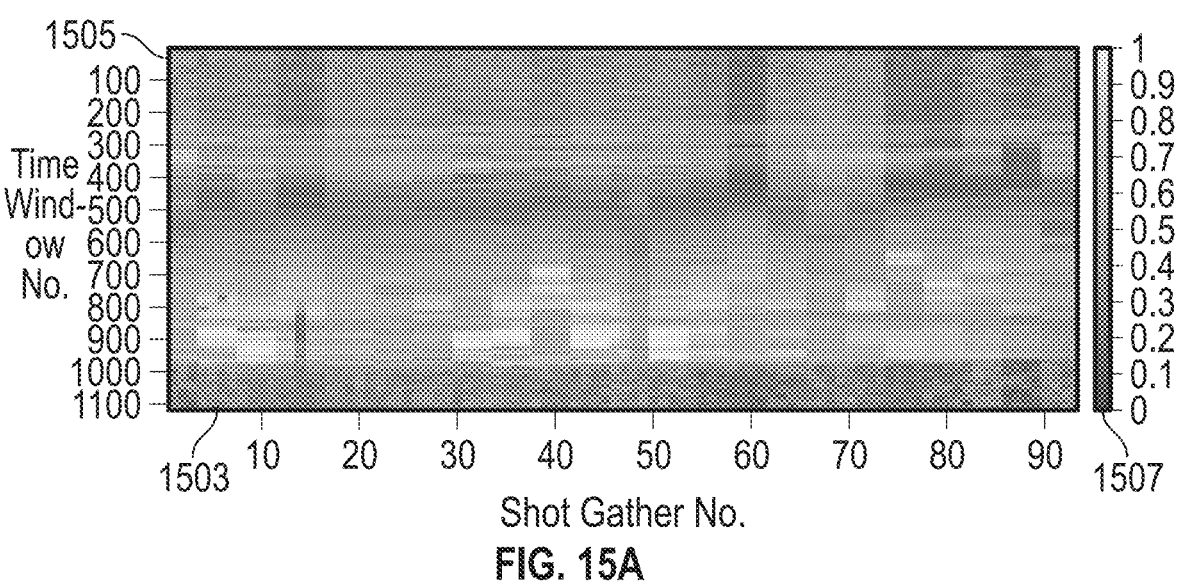
FIG. 15A displays a plurality of coherency values in accordance with one or more embodiments disclosed herein.
Figure 15B:
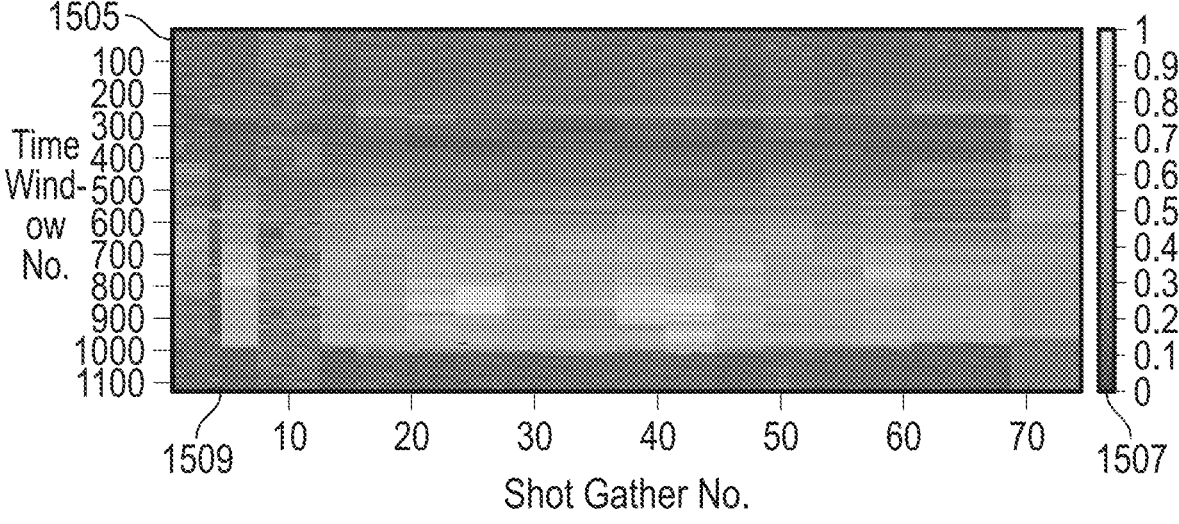
FIG. 15B displays a plurality of coherency values in accordance with one or more embodiments disclosed herein.
Figure 15C:
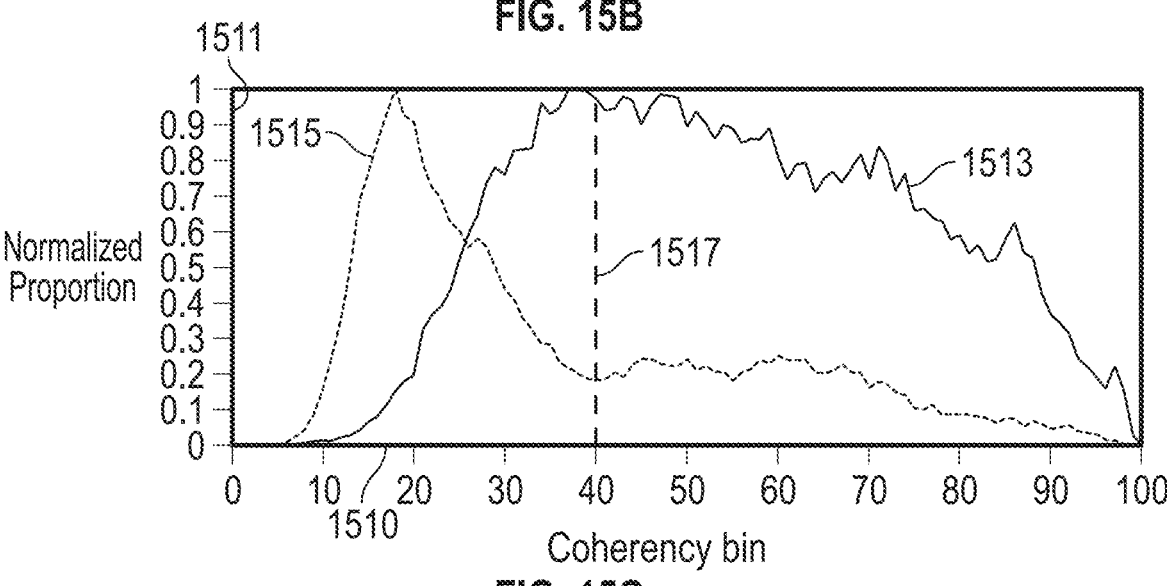
FIG. 15C displays two coherency distributions in accordance with one or more embodiments disclosed herein.

FIGS. 15A-15C display results of a coherency model applied to each of the first calibration seismic dataset and second calibration seismic dataset. The coherency model, similar to the coherency model (325) in FIG. 3, is configured to receive a seismic dataset and defined with the following parameters. Each vicinity gather is defined as a distinct shot gather of the seismic dataset. In other words, traces of a same shot gather are considered as neighboring traces in the computation of the coherency metric. In this specific example, the one or more time windows define a sliding time window with a constant window size of T=50 ms and a constant stride of $T_s$=25 ms. Thus, in this specific example, the one or more time windows include 1118 time windows $W_i=[T_{i,min},T_{i,max}]$, for i=1, . . . , 1118, each time window $W_i$ defined, in milliseconds, by $T_{i,min}$=(i−1)×25 and $T_{i,max}$=50+ (i−1)×25. The coherency metric is defined by the semblance in EQ. 7, where the average time shifts $\Delta t_m$ vary over all discreet values [−2 ms, −1 ms, 0 ms, 1 ms, 2 ms].

The coherency model computes a plurality of coherency values in a similar fashion to the plurality of coherency values (321) in FIG. 3. Precisely, the coherency model computes one coherency value for each shot gather of the seismic dataset and each of the 1188 time windows. The coherency model returns a coherency distribution from the plurality of coherency values, in a similar fashion to the coherency distribution (323) in FIG. 3. In this specific example, the coherency distribution is a plurality of binned normalized coherency values. To obtain the coherency distribution, the plurality of coherency values is normalized as a plurality of normalized coherency values, between 0 and 1. Then, the plurality of normalized coherency values is binned as a plurality of binned normalized coherency values, using 100 coherency bins, each bin spanning over a coherency range of 0.01. The 100 coherency bins are defined as $B_1$=[0,0.01] and $B_i$=]0.01 (i−1),0.01i] for i=2, . . . ,100. As previously stated, a coherency distribution may be observed on a graph. An example of a graph for a coherency distribution is a histogram. In the specific example implementation from FIGS. 13-17B, a histogram for a coherency distribution is built by computing the number of binned normalized coherency values in each coherency bin. Then, the histogram is normalized as a normalized histogram by dividing each value of the histogram by the maximum value of the histogram.

FIG. 15A depicts a first plurality of coherency values computed with the coherency model for the first calibration seismic dataset. The first plurality of coherency values is composed of one coherency value for each shot gather of the first calibration seismic dataset, for each of the 1118 time windows. The graph in FIG. 15A includes two axes. A first shot gather number abscissa axis (1503) indexes a shot gather number and a time window ordinate axis (1505) indexes a time window number. The values of the first plurality of coherency values are represented by a color from a colormap (1507). FIG. 15B depicts a second plurality of coherency values computed with the coherency model for the second calibration seismic dataset. The second plurality of coherency values is composed of one coherency value for each shot gather of the second calibration seismic dataset, for each of the 1118 time windows. The graph in FIG. 15B includes two axes. A second shot gather number abscissa axis (1509) indexes a shot gather number and the time window ordinate axis (1505) indexes the time window number.

A first coherency distribution is obtained from the coherency model for the first calibration seismic dataset. A second coherency distribution is obtained from the coherency model for the second calibration seismic dataset. FIG. 15C depicts a normalized histogram for the first coherency distribution, called a first calibration normalized histogram (1513). FIG. 15C further depicts a second calibration normalized histogram (1515) for the second coherency distribution. The first calibration normalized histogram (1513) and second calibration normalized histogram (1515) are plotted using two axes. A coherency bin abscissa axis (1510) is an index for a coherency bin within the 100 coherency bins. A distribution weight ordinate axis (1511) measures a value of each of the first calibration normalized histogram (1513) and second calibration normalized histogram (1515). In this specific example, a coherency threshold, similar to the coherency threshold (419) in FIG. 4 and Step 1111 of the method (1100), is determined using a visual selection. By observing the first calibration normalized histogram (1513) and second calibration normalized histogram (1515), the coherency threshold is selected, based on the experience of a geophysicist, as 0.4, corresponding to bin number 40. The coherency threshold of 0.4 is indicated by a dotted line (1517) in FIG. 15C. In one or more embodiments, the coherency threshold of 0.4 is seen as separating a majority of the values of the first coherency distribution and a majority of the values of the second coherency distribution.

Using the coherency threshold of 0.4, a scoring model is defined for an input coherency distribution in a similar fashion to the scoring model in FIG. 3. In this specific example, the scoring model is configured to assign, to the seismic dataset for which the input coherency distribution is computed, a quality indicator equal the proportion of coherency values of the input coherency distribution that are less than 0.4. Following Steps 1113 and 1115 of the method (1100), a first quality indicator of 0.2834 is computed for the first calibration seismic dataset and a second quality indicator of 0.6528 is computed for the second calibration seismic dataset, using the scoring model. A process is then defined to assign a quality rating, called an application quality rating, to an application seismic dataset in the same way as FIG. 6. In this specific implementation, determining the application quality rating is performed in three steps. First, an application coherency distribution is computed for the application seismic dataset using the coherency model. Then, an application quality indicator, denoted as q, is computed for the application seismic dataset using the scoring model applied to the application coherency distribution. Finally, the application quality indicator is compared with the first quality indicator of 0.2824 and the second quality indicator of 0.6528. If |q−0.2824|<|q−0.6568|, the application quality indicator is closer to the first quality indicator than is it to the second quality indicator. In such scenarios, the application quality rating is given the value of the first quality rating, namely, "high-quality." Conversely, if |q−0.2824|≥|q−0.6568|, the application quality indicator is closer to the second quality indicator than is it to the first quality indicator. In such scenarios, the application quality rating is given the value of the second quality rating, namely, "low-quality."

Figure 16A:
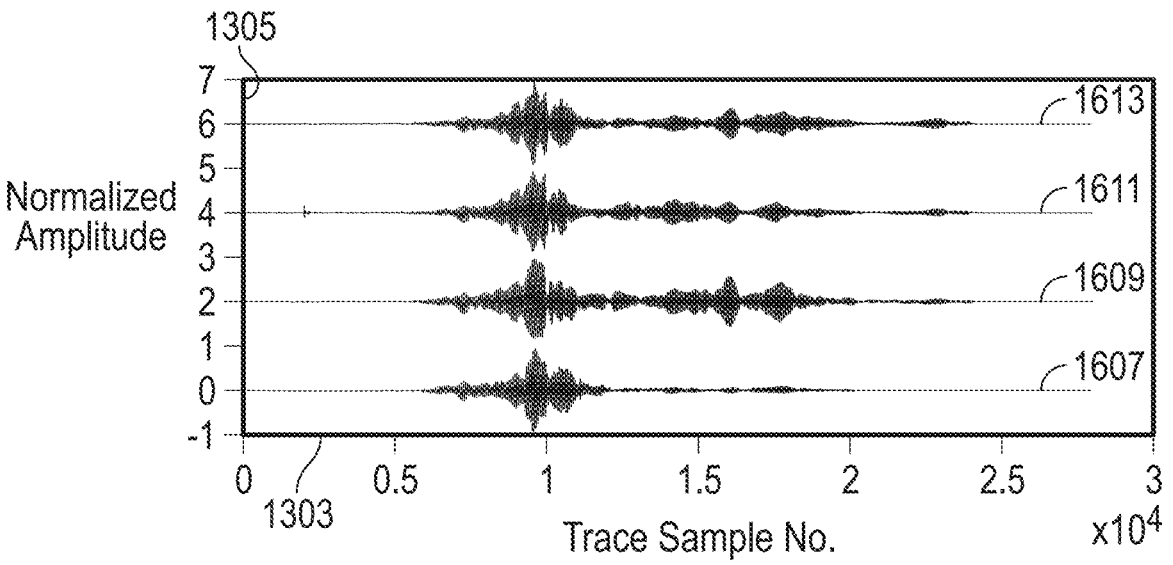
FIG. 16A displays a shot gather in accordance with one or more embodiments disclosed herein.
Figure 16B:
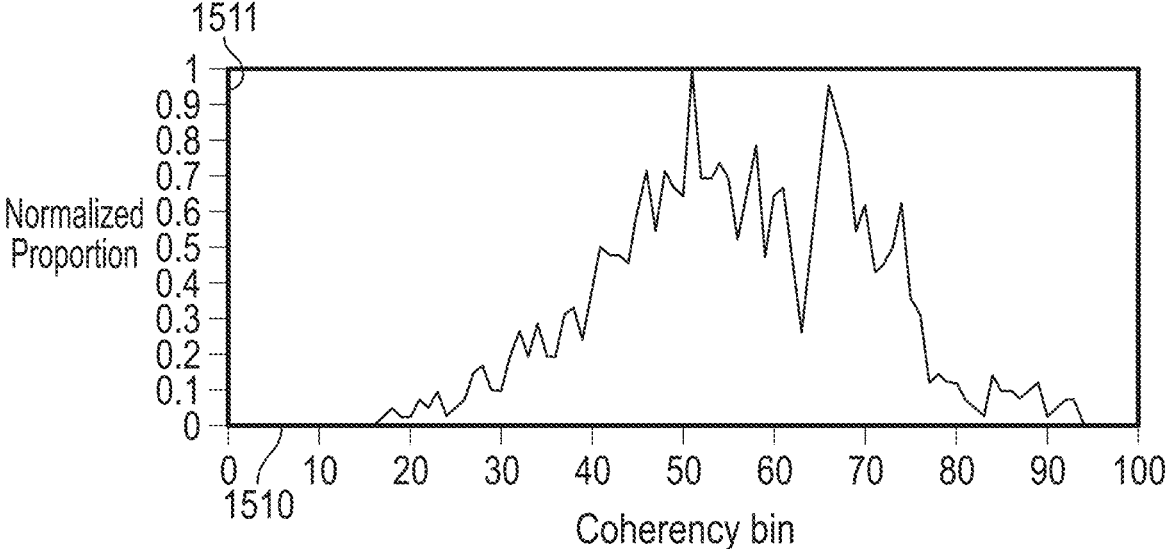
FIG. 16B displays a coherency distribution in accordance with one or more embodiments disclosed herein.

An integrated seismic dataset is acquired using a third VSP acquisition system similar to the VSP acquisition system (200) in FIG. 2. Thus, the integrated seismic dataset is a VSP dataset. The third VSP acquisition system includes four seismic receivers. In this specific example, the integrated seismic dataset includes a plurality of shot gathers. A first application seismic dataset is selected as a first shot gather of the integrated seismic dataset. FIG. 16A depicts a graph of the first application seismic dataset. Accordingly, the graph in FIG. 16A includes four plots for the first application seismic dataset, namely, one plot for each of four seismic traces acquired by each of the four seismic receivers of the third VSP acquisition system. A first plot (1607) for the first application seismic dataset depicts a first seismic trace of the first application seismic dataset, recorded by a first seismic receiver of the third VSP acquisition system. A second plot (1609) for the first application seismic dataset depicts a second seismic trace of the first application seismic dataset, recorded by a second seismic receiver of the third VSP acquisition system. A third plot (1611) for the first application seismic dataset depicts a third seismic trace of the first application seismic dataset, recorded by a third seismic receiver of the third VSP acquisition system. A fourth plot (1613) for the first application seismic dataset depicts a fourth seismic trace of the first application seismic dataset, recorded by a fourth seismic receiver of the third VSP acquisition system.

Each of the four seismic traces of the first application seismic dataset has a record length of $T_{max}$=28s with a sample rate of 1 ms, totaling 28001 samples. The graph in FIG. 16A includes two axes. The sample number abscissa axis (1303) and the first amplitude ordinate axis (1305). To fit on the same graph, the normalized amplitudes of the second plot (1609) for the first application seismic dataset were added a constant value of 2, the normalized amplitudes of the third plot (1611) for the first application seismic dataset seismic trace were added a constant value of 4 and the normalized amplitudes of the fourth plot (1613) for the first application seismic dataset were added a constant value of 6.

A first application coherency distribution is computed for the first application seismic dataset using the coherency model. A graph of the first application coherency distribution is plotted as a first application normalized histogram in FIG. 16B. Using the scoring model, a first application quality indicator of 0.1330 is computed for the first application seismic dataset. The distance between 0.1330 and the first quality indicator of 0.2824 is computed as |0.1330−0.2824|=0.1494. The distance between 0.1330 and the second quality indicator of 0.6528 is computed as |0.1330−0.6528|=0.5198. Since 0.1494<0.5198, the first application seismic dataset is assigned a first application quality rating of "high-quality."

Figure 17A:
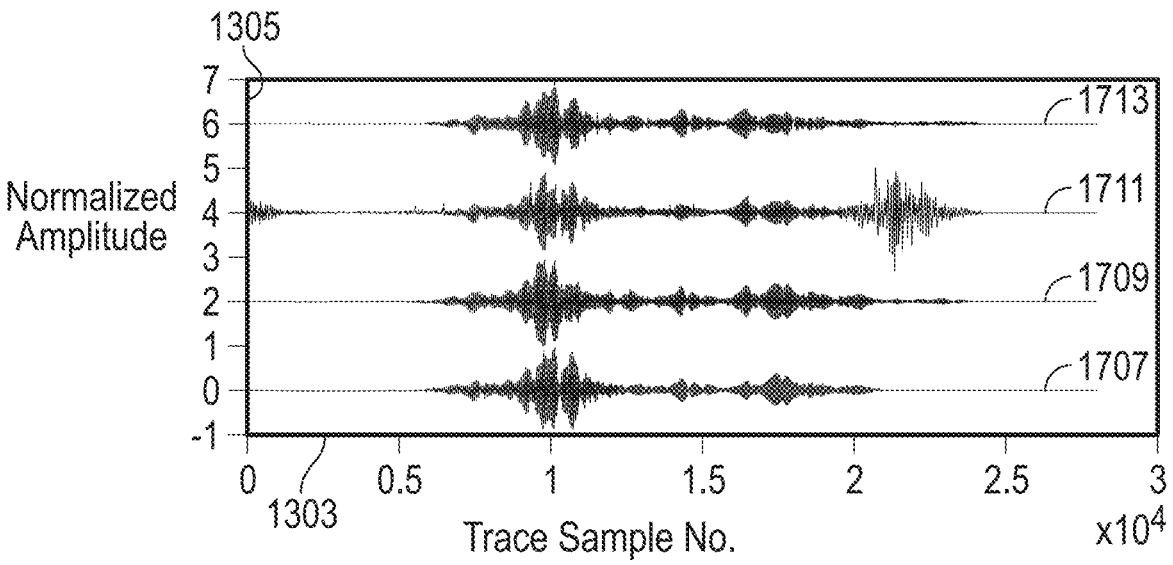
FIG. 17A displays a shot gather in accordance with one or more embodiments disclosed herein.
Figure 17B:
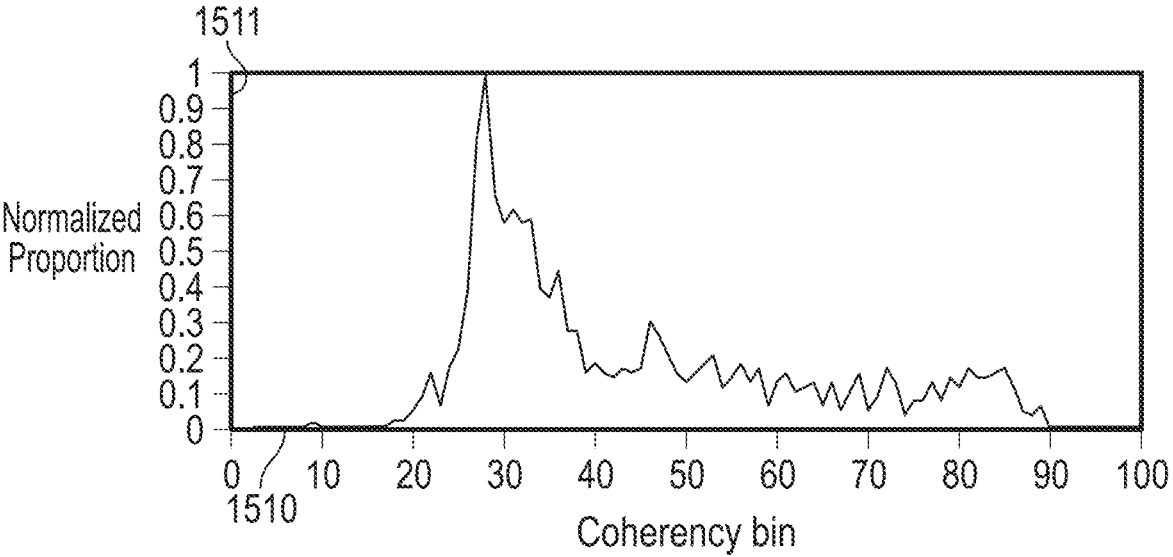
FIG. 17B displays a coherency distribution in accordance with one or more embodiments disclosed herein.

A second application seismic dataset is selected as a second shot gather of the integrated seismic dataset. FIG. 17A depicts a graph of the second application seismic dataset. The graph in FIG. 17A includes four plots for the second application seismic dataset, namely, one plot for each of four seismic traces acquired by each of the four seismic receivers of the third VSP acquisition system. A first plot (1707) for the second application seismic dataset depicts a first seismic trace of the second application seismic dataset, recorded by a first seismic receiver of the third VSP acquisition system. A second plot (1709) for the second application seismic dataset depicts a second seismic trace of the second application seismic dataset, recorded by a second seismic receiver of the third VSP acquisition system. A third plot (1711) for the second application seismic dataset depicts a third seismic trace of the second application seismic dataset, recorded by a third seismic receiver of the third VSP acquisition system. A fourth plot (1713) for the second application seismic dataset depicts a fourth seismic trace of the second application seismic dataset, recorded by a fourth seismic receiver of the third VSP acquisition system.

Each of the four seismic traces of the second application seismic dataset has a record length of $T_{max}$=28s with a sample rate of 1 ms, totaling 28001 samples. The graph in FIG. 17A includes two axes. The sample number abscissa axis (1303) and the first amplitude ordinate axis (1305). To fit on the same graph, the normalized amplitudes of the second plot (1709) for the second application seismic dataset were added a constant value of 2, the normalized amplitudes of the third plot (1711) for the second application seismic dataset seismic trace were added a constant value of 4 and the normalized amplitudes of the fourth plot (1713) for the first application seismic dataset were added a constant value of 6.

A second application distribution is computed for the second application seismic dataset using the coherency model. A graph of the second application coherency distribution is plotted as a second application normalized histogram in FIG. 16B. Using the scoring model, a second application quality indicator of 0.5536 is computed for the second application seismic dataset. The distance between 0.5536 and the first quality indicator of 0.2824 is computed as |0.5536−0.2824|=0.2712. The distance between 0.5536 and the second quality indicator of 0.6528 is computed as |0.5536−0.6528|=0.0992. Since 0.2712≥0.0992, the second application seismic dataset is assigned a second application quality rating of "low-quality."

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method, comprising:
using a seismic processing system:
    obtaining a first calibration seismic dataset comprising a first quality rating,
    obtaining a second calibration seismic dataset comprising a second quality rating;
    determining, using a coherency model, a first coherency distribution for the first calibration seismic dataset,
    determining, using the coherency model, a second coherency distribution for the second calibration seismic dataset,
    determining a coherency threshold based on the first coherency distribution and the second coherency distribution,
    determining, based on the coherency threshold and the first coherency distribution, a first quality indicator for the first calibration seismic dataset, and
    determining, based on the coherency threshold and the second coherency distribution, a second quality indicator for the second calibration seismic dataset,
acquiring, using a seismic acquisition system configured to measure a velocity of ground motion originating from seismic waves, an integrated seismic dataset comprising a plurality of seismic traces with lateral locations discretizing an acquisition surface of a region of interest, the plurality of seismic traces forming one or more application seismic datasets;
using the seismic processing system:
    conducting a quality assessment procedure comprising, for each application seismic dataset:
        determining, using the coherency model, an application coherency distribution for the application seismic dataset;
        determining, based on the coherency threshold and the application coherency distribution, an application quality indicator for the application seismic dataset; and
        determining, for the application seismic dataset, an application quality rating based on the application quality indicator, the first quality indicator, the second quality indicator, the first quality rating and the second quality rating;

determining a pre-processed seismic dataset by pre-processing the integrated seismic dataset based on the application quality rating determined for each application seismic dataset; and determining, based on the pre-processed seismic dataset, a subsurface property of the region of interest, the subsurface property comprising a migrated seismic image of the region of interest.

2. The method of claim 1, wherein:

the coherency model is configured to:

receive a seismic dataset as input;

compute, using a coherency metric, a plurality of coherency values for the seismic dataset;

normalize the plurality of coherency values based on a range of the plurality of coherency values, thereby generating a plurality of normalized coherency values; and return, as output, a coherency distribution based on the plurality of normalized coherency values; and determining a quality indicator for the seismic dataset comprises computing a proportion of the plurality of normalized coherency values that are less than the coherency threshold.

3. The method of claim 2, wherein the plurality of coherency values is computed using a sliding window over which the coherency metric is calculated.

4. The method of claim 2, wherein determining the coherency threshold comprises performing a visual selection, comprising:

plotting a first graph of the first coherency distribution;

plotting a second graph of the second coherency distribution; and selecting the coherency threshold based on a visual inspection of the first graph and the second graph.

5. The method of claim 1, wherein determining the first application quality rating comprises comparing the first application quality indicator with the first quality indicator and the second quality indicator.

6. The method of claim 1, wherein the coherency model comprises a coherency metric comprising a semblance.

7. The method of claim 1, wherein the seismic acquisition system comprises a vertical seismic profile (VSP), wherein the first calibration seismic dataset, the second calibration seismic dataset and the integrated seismic dataset are VSP datasets acquired using the VSP acquisition system.

8. The method of claim 1, further comprising:

identifying, using a seismic interpretation workstation, a drilling target based on, at least in part, the subsurface property;

planning, using a well planning system, a wellbore trajectory guided by the drilling target, and drilling, using a drilling system, a wellbore guided by the wellbore trajectory.

9. The method of claim 1, wherein pre-processing includes applying at least one pre-processing step to each application seismic dataset with an application quality rating indicating low quality.

10. The method of claim 1, wherein the quality assessment procedure is conducted in real-time while the integrated seismic dataset is being acquired.

11. A system, comprising:

a seismic acquisition system configured to measure a velocity of ground motion originating from seismic waves, and a seismic processing system, configured to:

receive, from a seismic data storage medium, a first calibration seismic dataset comprising a first quality rating;

receive, from the seismic data storage medium, a second calibration seismic dataset comprising a second quality rating; and receive, from the seismic acquisition system, an integrated seismic dataset comprising a plurality of seismic traces with lateral locations discretizing an acquisition surface of a region of interest, the plurality of seismic traces forming one or more application seismic datasets;

determine, using a coherency model, a first coherency distribution for the first calibration seismic dataset;

determine, using the coherency model, a second coherency distribution for the second calibration seismic dataset;

obtain a coherency threshold based on the first coherency distribution and the second coherency distribution;

determine, based on the coherency threshold and the first coherency distribution, a first quality indicator for the first calibration seismic dataset;

determine, based on the coherency threshold and the second coherency distribution, a second quality indicator for the second calibration seismic dataset;

conduct a quality assessment procedure comprising, for each application seismic dataset:

determining, using the coherency model, an application coherency distribution for the application seismic dataset;

determining, based on the coherency threshold and the application coherency distribution, an application quality indicator for the application seismic dataset; and determining, for the application seismic dataset, an application quality rating based on the application quality indicator, the first quality indicator, the second quality indicator, the first quality rating and the second quality rating;

determine a pre-processed seismic dataset by pre-processing the integrated seismic dataset based on the application quality rating determined for each application seismic dataset; and determine, based on the pre-processed seismic dataset, a subsurface property of the region of interest, the subsurface property comprising a migrated seismic image of the region of interest.

12. The system of claim 11, wherein:

the coherency model is configured to:

receive a seismic dataset as input;

compute, using a coherency metric, a plurality of coherency values for the seismic dataset;

normalize the plurality of coherency values based on a range of the plurality of coherency values, thereby generating a plurality of normalized coherency values; and return, as output, a coherency distribution based on the plurality of normalized coherency values; and determining a quality indicator for the seismic dataset comprises computing a proportion of the plurality of normalized coherency values that are less than the coherency threshold.

13. The system of claim 12, wherein the plurality of coherency values is computed using a sliding window over which the coherency metric is calculated.

14. The system of claim 12, wherein:

the seismic processing system is further configured to:

plot a first graph of the first coherency distribution; and plot a second graph of the second coherency distribution, and the coherency threshold is selected based on a visual inspection of the first graph and the second graph.

15. The system of claim 11, wherein determining the first application quality rating comprises comparing the first application quality indicator with the first quality indicator and the second quality indicator.

16. The system of claim 11, wherein the coherency model comprises a coherency metric comprising a semblance.

17. The system of claim 11, wherein the seismic acquisition system comprises a vertical seismic profile (VSP) acquisition system, wherein the first calibration seismic dataset, the second calibration seismic dataset and the integrated seismic dataset are VSP datasets acquired using the VSP acquisition system.

18. The system of claim 11, further comprising:

a seismic interpretation workstation configured to identify a drilling target based on, at least in part, the subsurface property;

a well planning system configured to plan a wellbore trajectory guided by the drilling target, and a drilling system configured to drill a wellbore guided by the wellbore trajectory.

19. The system of claim 11, wherein pre-processing includes applying at least one pre-processing step to each application seismic dataset with an application quality rating indicating low quality.

20. The system of claim 11, wherein the quality assessment procedure is conducted in real-time while the integrated seismic dataset is being acquired.

\* \* \* \* \*